(12) United States Patent
Tuel et al.

(10) Patent No.: US 8,070,415 B2
(45) Date of Patent: *Dec. 6, 2011

(54) METHOD AND APPARATUS FOR UNLOADING CONTAINERS

(75) Inventors: Gregory D. Tuel, Beloit, OH (US); William B. Humphrey, Homeworth, OH (US)

(73) Assignee: Bins, LLC, Columbus, OH (US)

( * ) Notice: Subject to any disclaimer, the term of this patent is extended or adjusted under 35 U.S.C. 154(b) by 486 days.

This patent is subject to a terminal disclaimer.

(21) Appl. No.: 12/218,417

(22) Filed: Jul. 15, 2008

(65) Prior Publication Data

US 2009/0238674 A1  Sep. 24, 2009

Related U.S. Application Data

(60) Provisional application No. 61/069,819, filed on Mar. 18, 2008.

(51) Int. Cl.
 *B60P 1/48* (2006.01)

(52) U.S. Cl. ........ 414/812; 414/478; 414/491; 414/547; 414/549

(58) Field of Classification Search .......... 414/478, 414/486, 491, 547, 549, 555, 556, 812
See application file for complete search history.

(56) References Cited

U.S. PATENT DOCUMENTS

| | | | |
|---|---|---|---|
| 2,290,738 A | 7/1942 | Chadwick, Jr. | |
| 2,592,993 A | 4/1952 | Adams | |
| 2,741,383 A * | 4/1956 | Leckert | 414/484 |
| 2,838,191 A | 6/1958 | Schramm | |
| 3,057,490 A | 10/1962 | Sauer | |
| 3,130,847 A * | 4/1964 | Dempster et al. | 414/491 |
| 3,200,975 A | 8/1965 | Chase | |
| 3,325,118 A | 6/1967 | Hall | |
| 3,830,384 A * | 8/1974 | Barber | 414/556 |
| 3,834,563 A | 9/1974 | Teti | |

(Continued)

FOREIGN PATENT DOCUMENTS

DE  3425428 A1 * 1/1986 ............ 414/549

(Continued)

OTHER PUBLICATIONS

Information printed from web search of garbage trucks & commercial trucks—heavy-duty trucks for sale, dated Nov. 20, 2007 http://www.trucks.co.

*Primary Examiner* — James Keenan

(74) *Attorney, Agent, or Firm* — Porter, Wright, Morris & Arthur, LLP

(57) ABSTRACT

A rear loading cargo carrying wheeled vehicle includes a pair of container lifts for moving shipping containers between a container support platform on the vehicle and an unloaded position behind the vehicle. Each lift typically includes a pivot arm pivotally mounted on the vehicle, a telescoping arm telescopically mounted on the pivot arm, and a container engaging support member mounted on the telescoping arm for engaging and supporting the containers. A platform lift is provided for lowering the platform during the loading operation to provide greater stability. The container support platform includes a forward section and tail section which is movable relative to the forward section to provide greater clearance for loading and unloading the container. Guide walls along either side of the platform guide misaligned containers onto the platform. The container lifts are configured for loading and unloading one or more containers onto and from the platform.

17 Claims, 51 Drawing Sheets

U.S. PATENT DOCUMENTS

| | | | |
|---|---|---|---|
| 4,101,081 A * | 7/1978 | Ritter et al. | 241/101.74 |
| 4,239,275 A * | 12/1980 | Horneys et al. | 414/478 |
| 4,260,315 A * | 4/1981 | Bouffard | 414/469 |
| 4,355,942 A * | 10/1982 | Rolfe | 414/555 |
| 4,509,894 A * | 4/1985 | Rolfe | 414/555 |
| 4,529,349 A | 7/1985 | Lutz | |
| 4,547,118 A | 10/1985 | Pittenger | |
| 4,597,712 A * | 7/1986 | Smith | 414/549 |
| 4,679,979 A * | 7/1987 | Rasmussen | 414/812 |
| 4,687,402 A | 8/1987 | Zatylny | |
| 4,880,346 A * | 11/1989 | Brassette | 414/486 |
| 4,934,898 A | 6/1990 | Galbreath | |
| 5,213,466 A | 5/1993 | Bubik | |
| 5,246,330 A * | 9/1993 | Marmur et al. | 414/494 |
| 5,281,078 A | 1/1994 | Mills, Jr. | |
| 5,460,473 A * | 10/1995 | LaMora et al. | 414/494 |
| 5,520,489 A | 5/1996 | Butcher et al. | |
| 5,688,100 A | 11/1997 | Wunder et al. | |
| 5,803,699 A | 9/1998 | Pinkston | |
| 5,827,037 A * | 10/1998 | Wilson, Jr. | 414/556 |
| 6,071,062 A | 6/2000 | Warhurst et al. | |
| 6,155,770 A | 12/2000 | Warhurst | |
| 6,276,888 B1 | 8/2001 | Rubio | |
| 6,283,699 B1 | 9/2001 | Simpson | |
| 6,375,409 B1 * | 4/2002 | Hovens et al. | 414/812 |
| 6,435,806 B1 | 8/2002 | Rinderknecht | |
| 6,457,931 B1 | 10/2002 | Chapman | |
| 6,565,307 B1 | 5/2003 | Niemela | |
| 6,705,823 B2 | 3/2004 | Bohata | |
| 6,799,935 B1 | 10/2004 | Grollitsch | |
| 7,037,062 B2 * | 5/2006 | Oliver | 414/478 |
| 7,074,004 B2 | 7/2006 | Lockamy et al. | |
| 7,112,030 B2 | 9/2006 | Renziehausen | |
| 7,942,621 B2 * | 5/2011 | Bain et al. | 414/498 |
| 2001/0038777 A1 | 11/2001 | Cassell, Jr. | |
| 2004/0126216 A1 | 7/2004 | Rinderknecht | |
| 2006/0181063 A1 | 8/2006 | Eddings | |
| 2006/0245879 A1 | 11/2006 | Lockamy et al. | |
| 2007/0071586 A1 * | 3/2007 | Born et al. | 414/549 |
| 2007/0092365 A1 | 4/2007 | Filiatreault | |
| 2007/0212205 A1 | 9/2007 | Lowecki | |
| 2008/0279666 A1 | 11/2008 | Rathbun et al. | |
| 2008/0317570 A1 | 12/2008 | Bain et al. | |
| 2009/0236897 A1 | 9/2009 | Tuel et al. | |
| 2009/0238673 A1 * | 9/2009 | Tuel et al. | 414/812 |

FOREIGN PATENT DOCUMENTS

| | | | |
|---|---|---|---|
| DE | 3616642 A1 * | 11/1987 | 414/549 |
| DE | 3624247 A1 * | 1/1988 | 414/549 |
| DE | 3815307 A1 * | 11/1989 | 414/555 |
| EP | 0328878 A2 * | 8/1989 | 414/549 |
| JP | 4-328039 A * | 11/1992 | 414/491 |

* cited by examiner

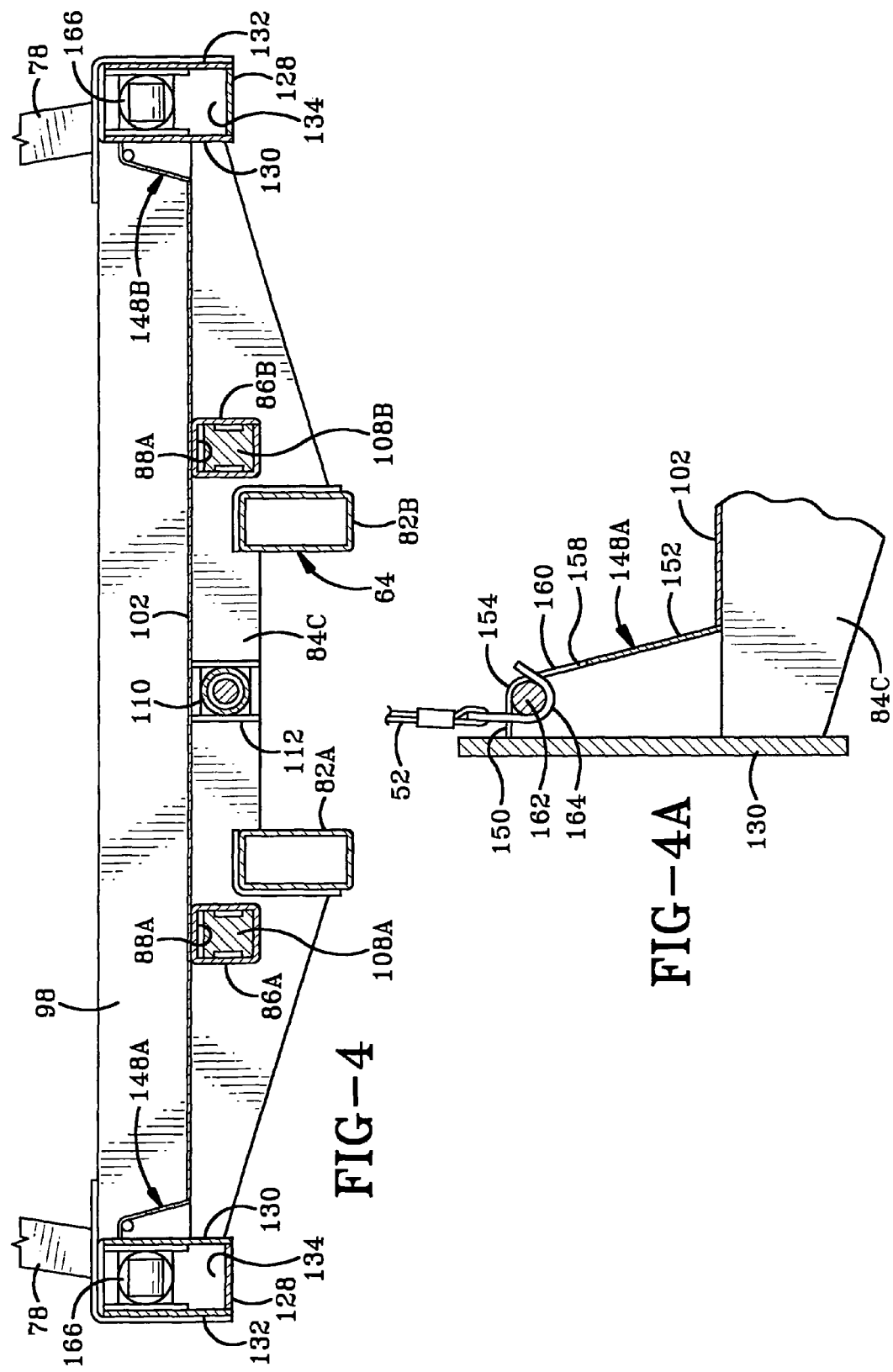

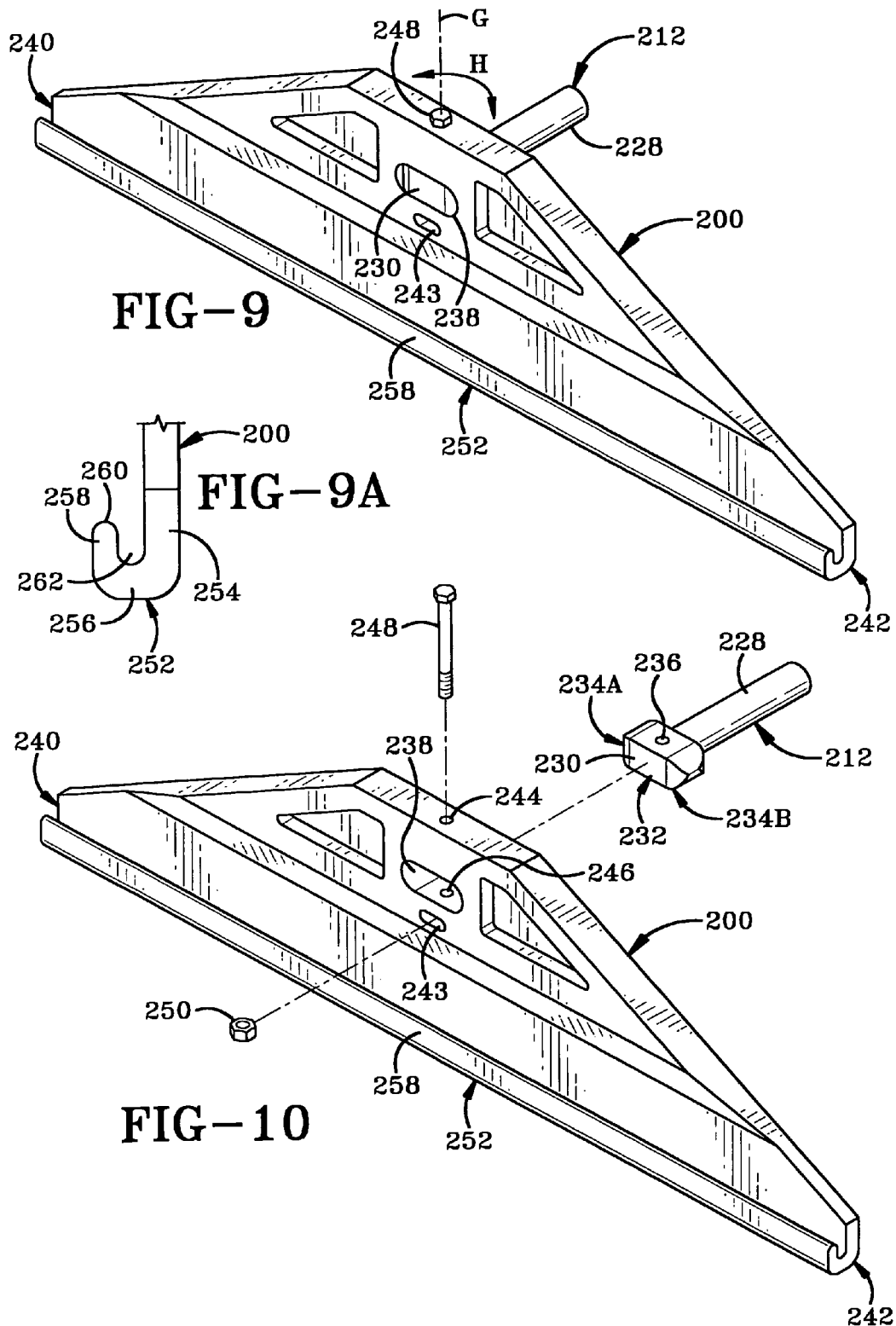

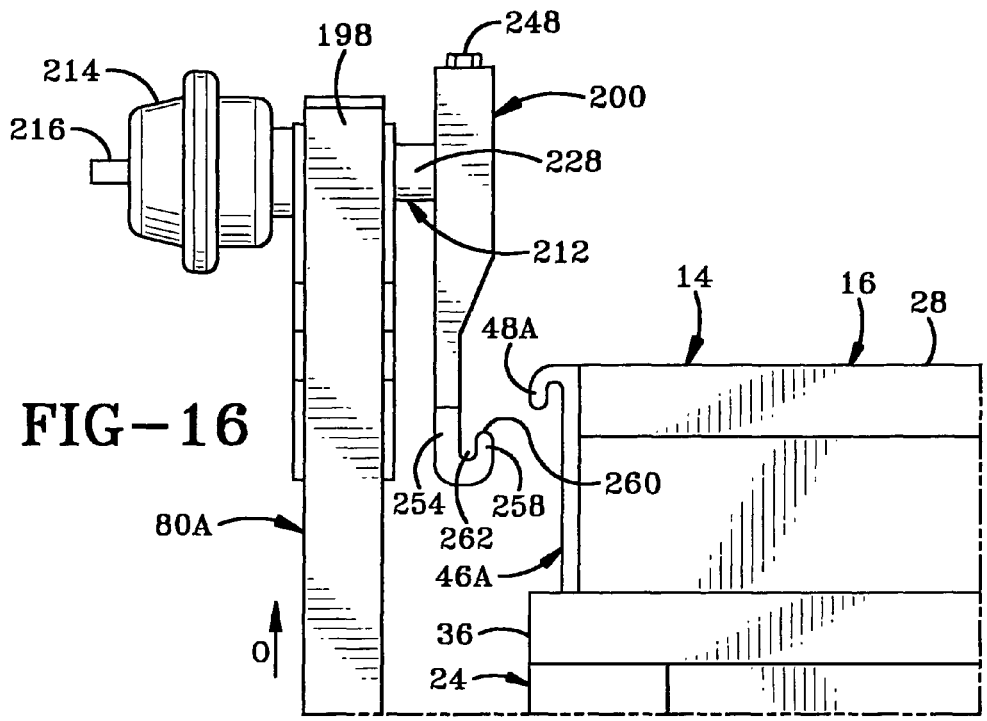
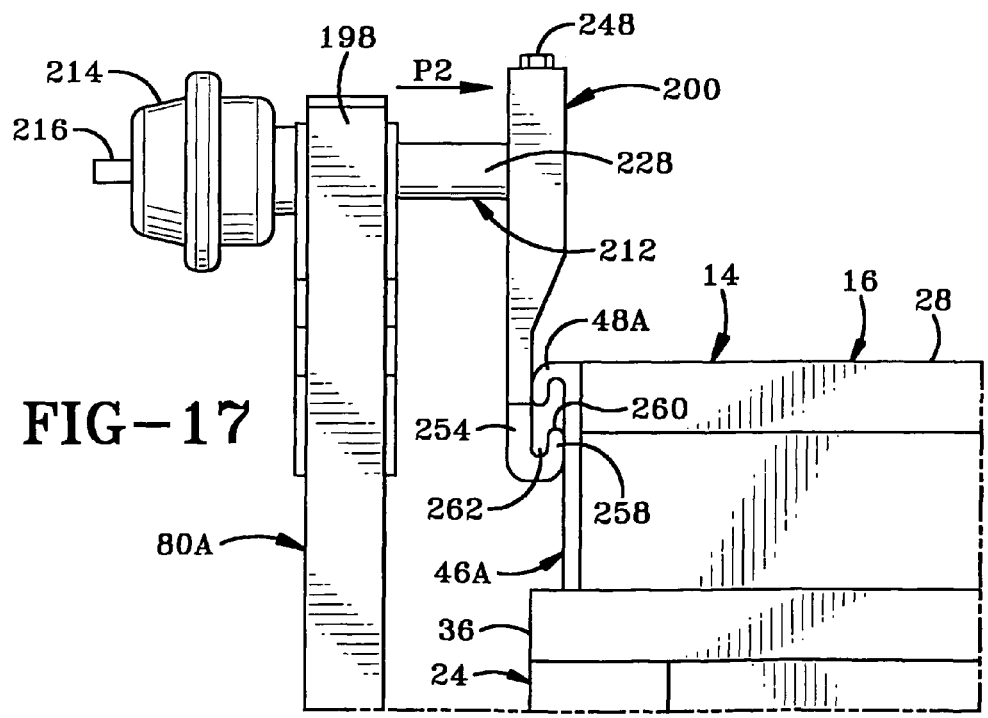

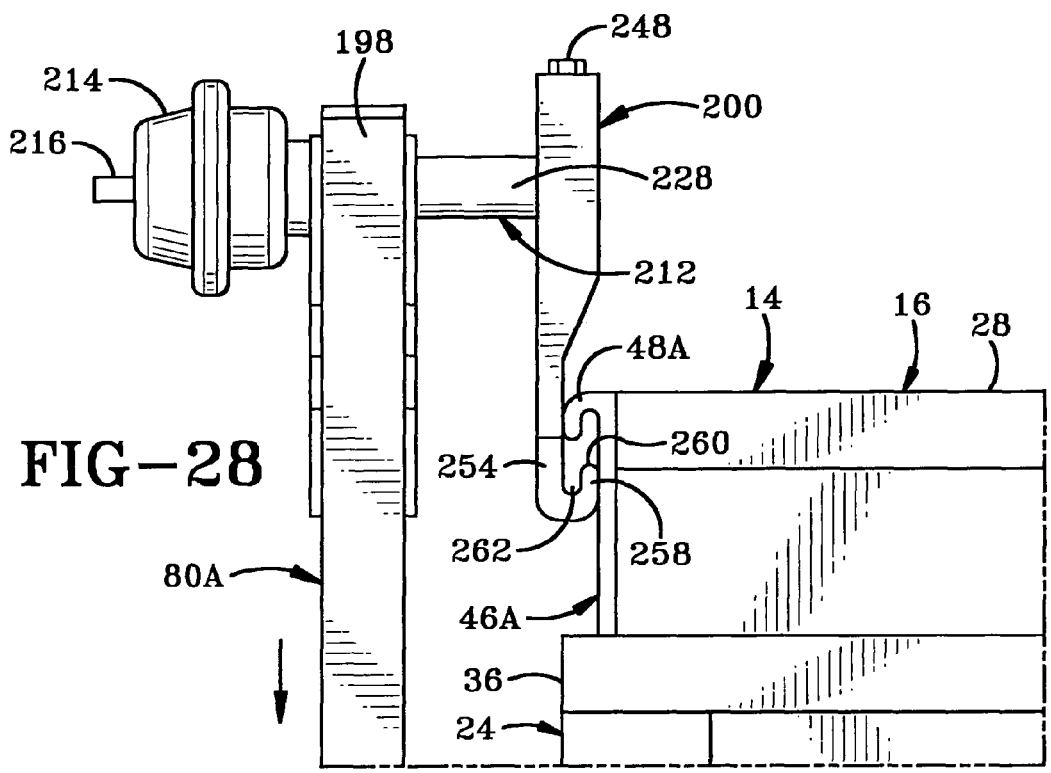
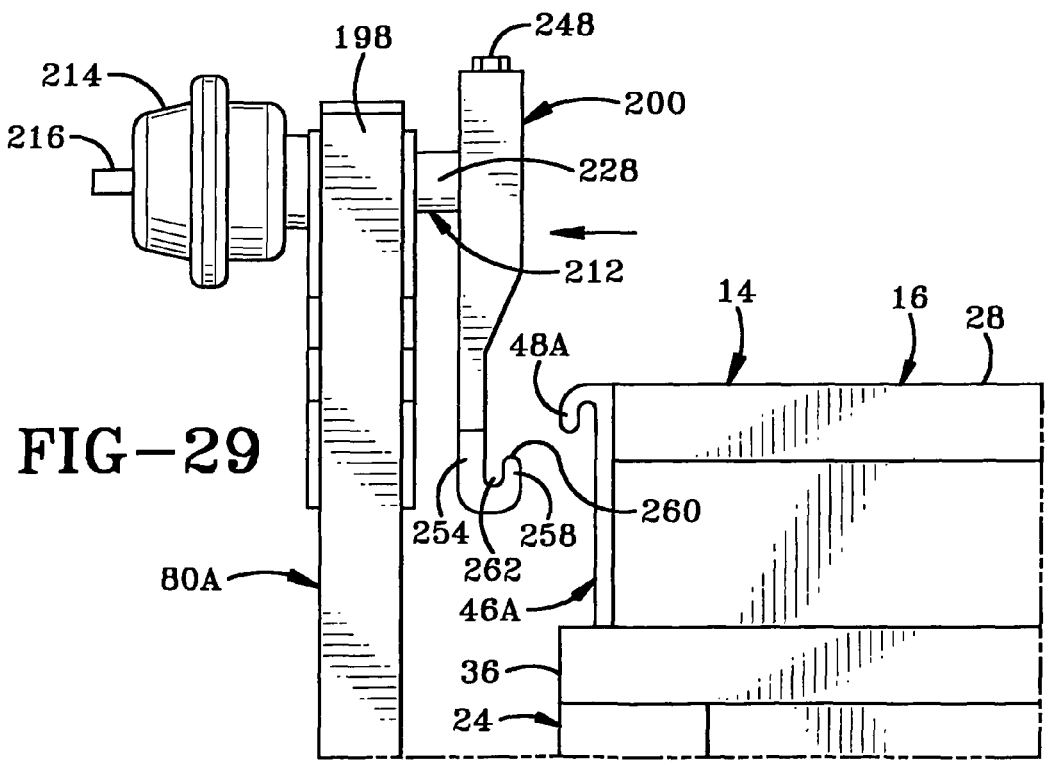

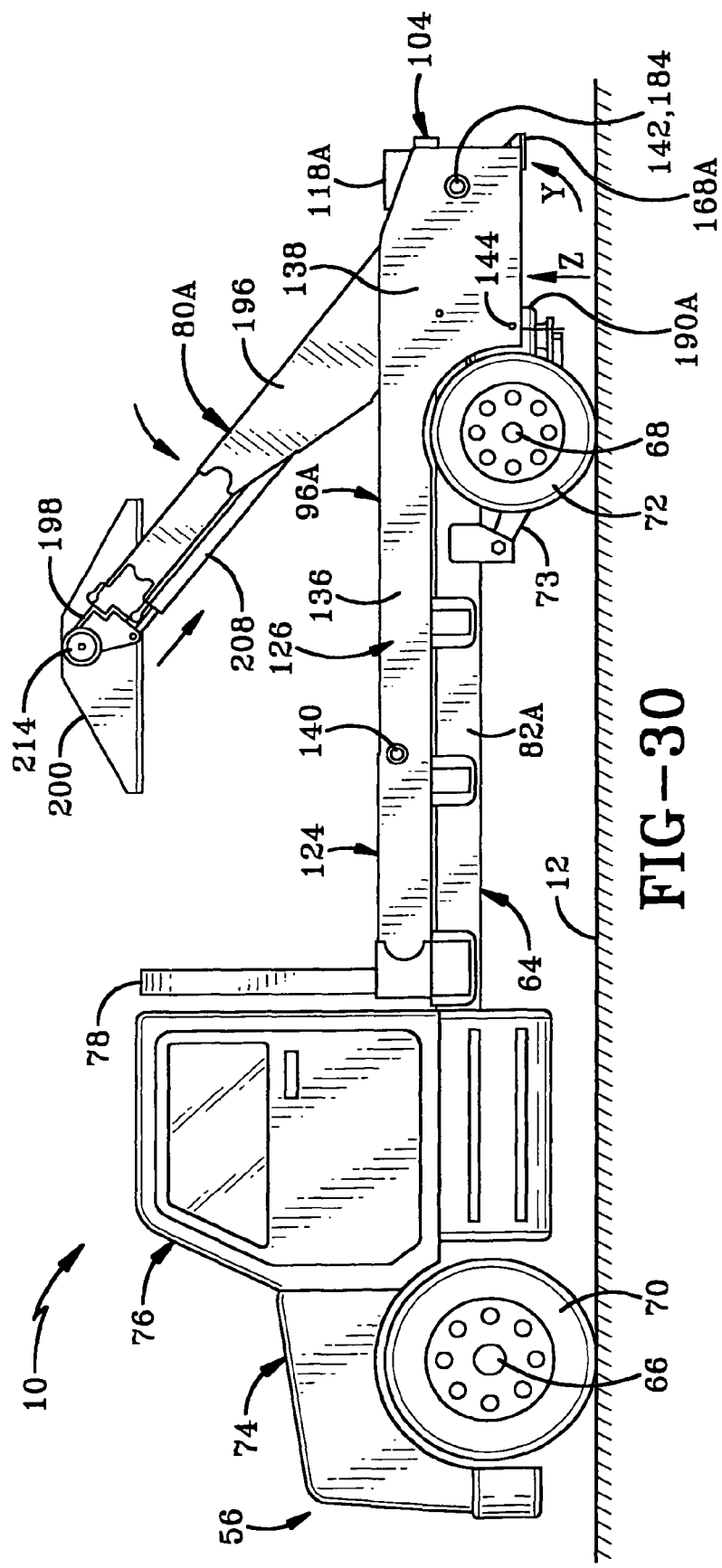

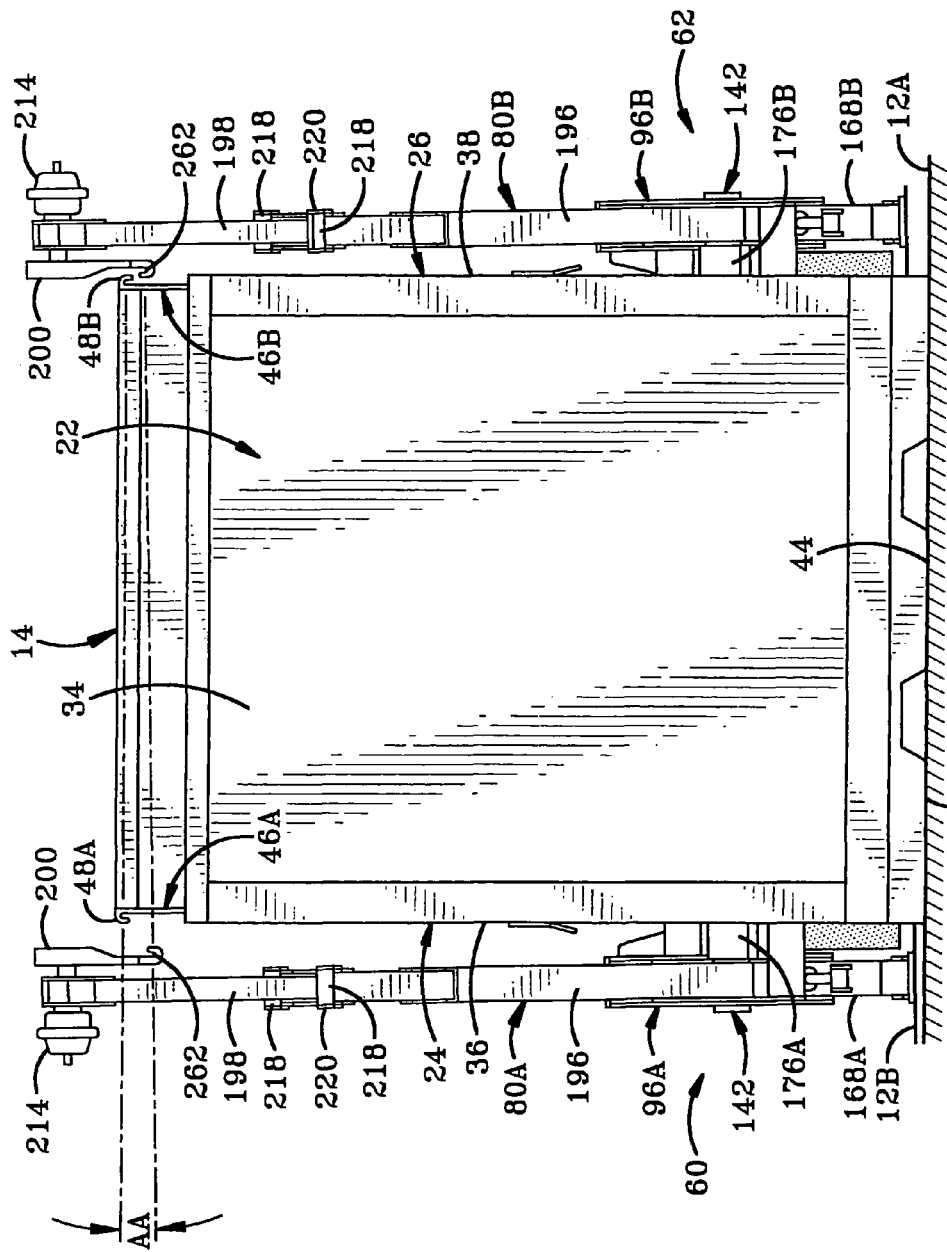

METHOD AND APPARATUS FOR UNLOADING CONTAINERS

CROSS REFERENCE RELATED TO APPLICATIONS

This application claims priority from U.S. Provisional Application Ser. No. 61/069,819, filed Mar. 18, 2008; the disclosure of which is incorporated herein by reference.

BACKGROUND OF THE INVENTION

1. Technical Field

The present invention relates generally to cargo carrying vehicles. More particularly, the present invention relates to such vehicles having an on-board loading and unloading mechanism for loading containers onto the vehicle and unloading the containers therefrom. Specifically, the present invention relates to rear loading vehicles in which the containers are unloaded in a rearward direction.

2. Background Information

Within the vast field of cargo transportation, there are a host of vehicles and loading mechanisms for loading and unloading cargo from various vehicles. It is well known to use forklifts or other vehicles which are separate from the transportation vehicle which carries a container or other cargo from place to place. However, the use of such separate vehicles or loading mechanisms which are separate from the cargo carrying vehicle typically requires that a forklift or other such loading mechanism is available at the delivery location of the container or cargo. Thus, there is a substantial advantage of having a loading mechanism which is mounted on the cargo carrying vehicle so that the cargo may be unloaded at any delivery location regardless of whether there is a separate loading and unloading mechanism at the delivery site.

A variety of vehicles having onboard loading and unloading mechanisms are known in the art including side loading vehicles in which the cargo is moved from the vehicle to an unloading location to the side of the vehicle, as well as rear loading vehicles in which the cargo is removed to the rear of the vehicle. One of the drawbacks of side loading vehicles is the need for space to the side of the vehicle for unloading the cargo. In many instances, such space is simply unavailable. In other circumstances, it is problematic to unload cargo to the side of the vehicle, for instance when the vehicle must be parked on a roadway in order to load or unload the cargo and thus may be parked in a traffic lane and thus obstruct the flow of traffic. Another problematic area for side loaders is associated with a single width driveway whereby the cargo carrying vehicle would either be parked on the driveway and be required to unload the cargo onto the ground beside the driveway, or be parked on the ground beside the driveway to unload the cargo onto the driveway. Either scenario may cause problems especially where the ground is not very firm or is at an unsuitable angle for loading and unloading.

Roll-off systems fall within the rear loading category. These vehicles typically utilize a container which has wheels along the bottom of each side so that the wheels allow the container to roll off of a support platform of the vehicle. More particularly, the support platform is pivoted relative to the frame of the vehicle in order to facilitate the container rolling off of the platform onto the ground. One of the drawbacks of roll-off systems is the need for the vehicle to move forward during the unloading operation. More particularly, the platform is tilted so that the container rolls rearwardly until its rear end contacts the ground, at which time the vehicle is moved forward in order to allow the front end of the container to be lowered as it rolls off the platform until the container is fully unloaded. The need for the vehicle to move forward during this process requires additional space in order to unload the container. In addition, these containers are typically formed with sides that angle inwardly at the bottom to accommodate the wheels thereon, thus reducing the amount of cargo carrying space within the container.

Another rear loading apparatus which is commercially in use is described in U.S. Pat. No. 6,071,062 granted to Warhurst et al. and U.S. Pat. No. 6,155,770 granted to Warhurst. These two patents disclose a vehicle which carries a removable carriage and lift mechanism which itself lifts a container off of the vehicle and is independently operated to carry the container away from the vehicle. While this configuration allows the carriage to travel with the cargo carrying vehicle, the carriage must be completely removed from the vehicle in order to unload the container from the vehicle. The carriage thus requires a separate set of wheels and a motor for driving its movement on the wheels while carrying the container. During the unloading process, the carriage is also expanded axially or side to side so that it becomes wider than the cargo carrying vehicle in order to provide clearance to move rearwardly relative to the vehicle. The carriage thus requires additional side to side space during operation.

More recent rear loading vehicles are described in U.S. Pat. No. 7,074,004 granted to Lockamy et al. The Lockamy patent describes two embodiments for loading and unloading a container from a vehicle with an onboard loading and unloading mechanism. In one embodiment, a powered lift mechanism is positioned on the vehicle forward of the container which is loaded thereon. A pair of L-shaped arms is pivotally mounted on the lift mechanism with one leg of the L-shape extending downwardly from the pivot and the second leg of the L-shape extending rearwardly from adjacent the front of the container to adjacent the rear of the container. When the vehicle is traveling, these arms are pivoted inwardly toward one another, and are pivoted outwardly during the unloading operation. Flexible suspension members such as chains are hung from the pivot arms for supporting the container during the loading and unloading operation. With the container secured to the pivot arms via the chains or the like, the lift mechanism lifts the container and then moves rearwardly along a track so that the container is positioned rearwardly of the vehicle and then lowered. The other embodiment basically utilizes a carriage on which a pair of longitudinal beams of the carriage is telescopically mounted on a respective pair of longitudinal beams of the vehicle so that the carriage is movable rearwardly relative to the vehicle in order to move the container rearwardly therewith. A pair of wheels is mounted adjacent the rear of the carriage in order to support the carriage as it moves rearwardly. A lift mechanism on the carriage is also provided for raising and lowering the container via chains or the like from which the container is suspended.

While these various systems serve their purpose, there is a need in the art for a simple and cost effective rear loading vehicle which is simple to operate and which falls within a weight class which may be driven by an operator holding a driver's license for a passenger vehicle.

BRIEF SUMMARY OF THE INVENTION

The present method comprising the steps of lifting with a container lift assembly mounted on a wheeled vehicle a first container from one of a first loaded position atop a container support platform of the wheeled vehicle and a first unloaded position behind the vehicle; moving the first container with the container lift assembly from the one of the first loaded position to the other of the first unloaded position; lifting with the container lift assembly a second container from one of a second loaded position atop the platform forward of the first loaded position and a second unloaded position behind the vehicle; and moving the second container with the container lift assembly from the one of the second loaded position to the other of the second unloaded position.

The present invention also includes a method comprising the steps of moving a tail section of a container support platform of a wheeled vehicle relative to a forward section of the container support platform from a home position space to a non-home position space; and moving a container with an onboard container lift assembly through the home position space while the tail section is in the non-home position space.

The present invention also includes a method comprising the steps of seating a container at a loaded position atop forward and tail sections of a container support platform of a wheeled vehicle wherein the tail section is movable relative to the forward section; and operating an onboard container lift assembly in one of a loading direction to move the container from an unloaded position behind the vehicle to the loaded position and an unloading direction to move the container from the loaded position to the unloaded position.

BRIEF DESCRIPTION OF THE SEVERAL VIEWS OF THE DRAWINGS

FIG. 4 is a sectional view taken along line 4-4 of FIG. 3A.

FIG. 4A is an enlarged sectional view of a portion of FIG. 4 showing the lower hook of a tie-down strap engaging the tie-down bar.

FIG. 9 is an enlarged perspective view of the container support assembly of the lift.

FIG. 9A is an enlarged end view of the hook portion of one of the hook members.

FIG. 10 is an exploded perspective view of the container support assembly.

FIG. 16 is an enlarged rear elevational view of the upper portion of the left container lift showing the container lift support hook having moved upwardly to a position adjacent container mounting rail or hook.

FIG. 17 is similar to FIG. 16 and shows the hook actuator having moved the container support hook inwardly below the container support rail.

FIG. 28 is similar to FIGS. 16 and 17 and shows the container lift support hook being lowered out of engagement with the container support rail.

FIG. 29 is similar to FIG. 28 and shows the hook actuator moving the support hook outwardly away from the container.

FIG. 30 is a side elevational view of the vehicle with the container lift moved forward and retracted to its traveling position without the container on the support platform of the vehicle.

FIG. 31 is a rear elevational view of the vehicle having backed up in preparation to lift a container from the ground wherein the container is tilted relative to the vehicle so that the lift support hooks are not properly aligned with the container support rails.

DETAILED DESCRIPTION OF THE INVENTION

Figure 1:
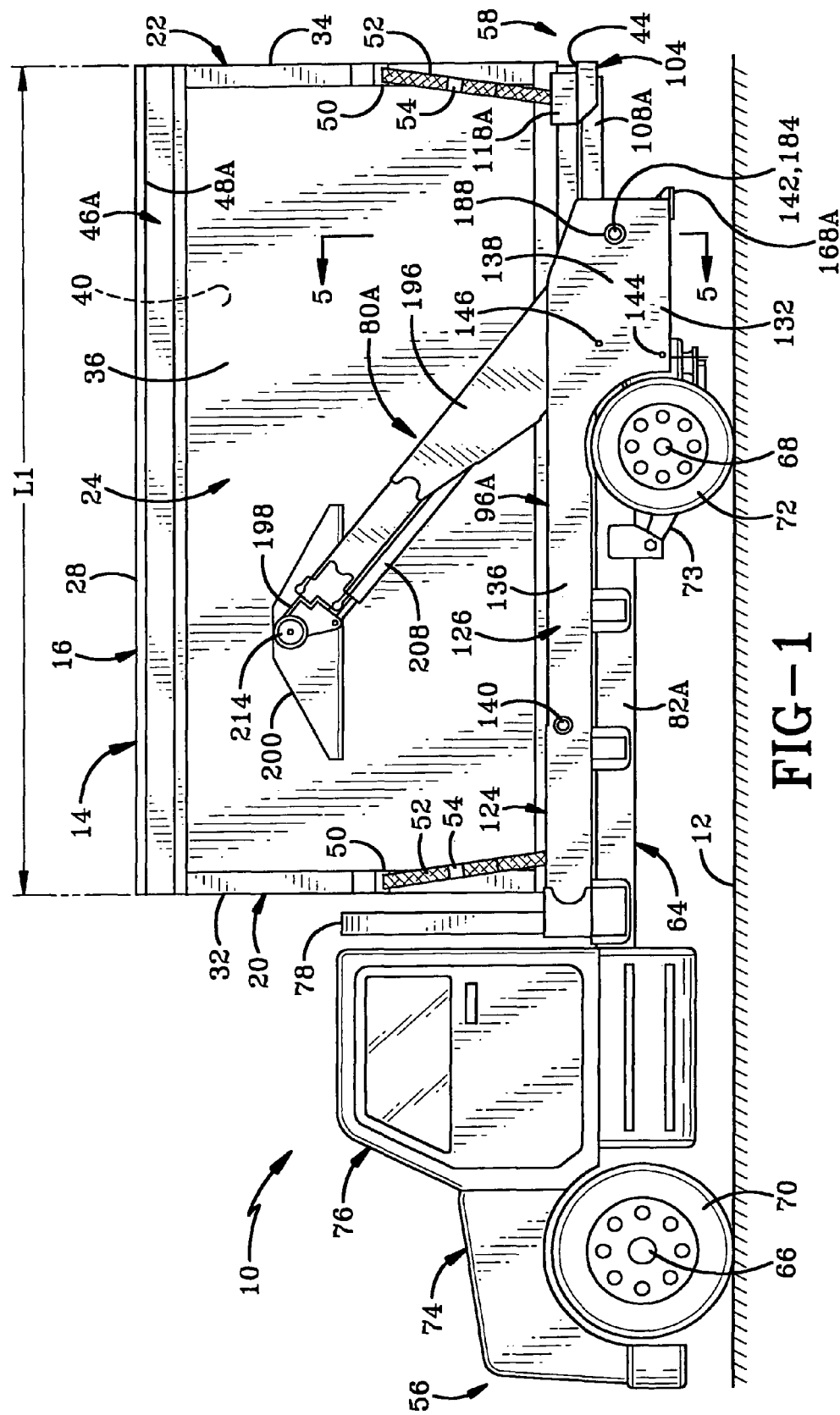
FIG. 1 is a side elevational view of a first embodiment of the vehicle of the present invention.
Figure 27:
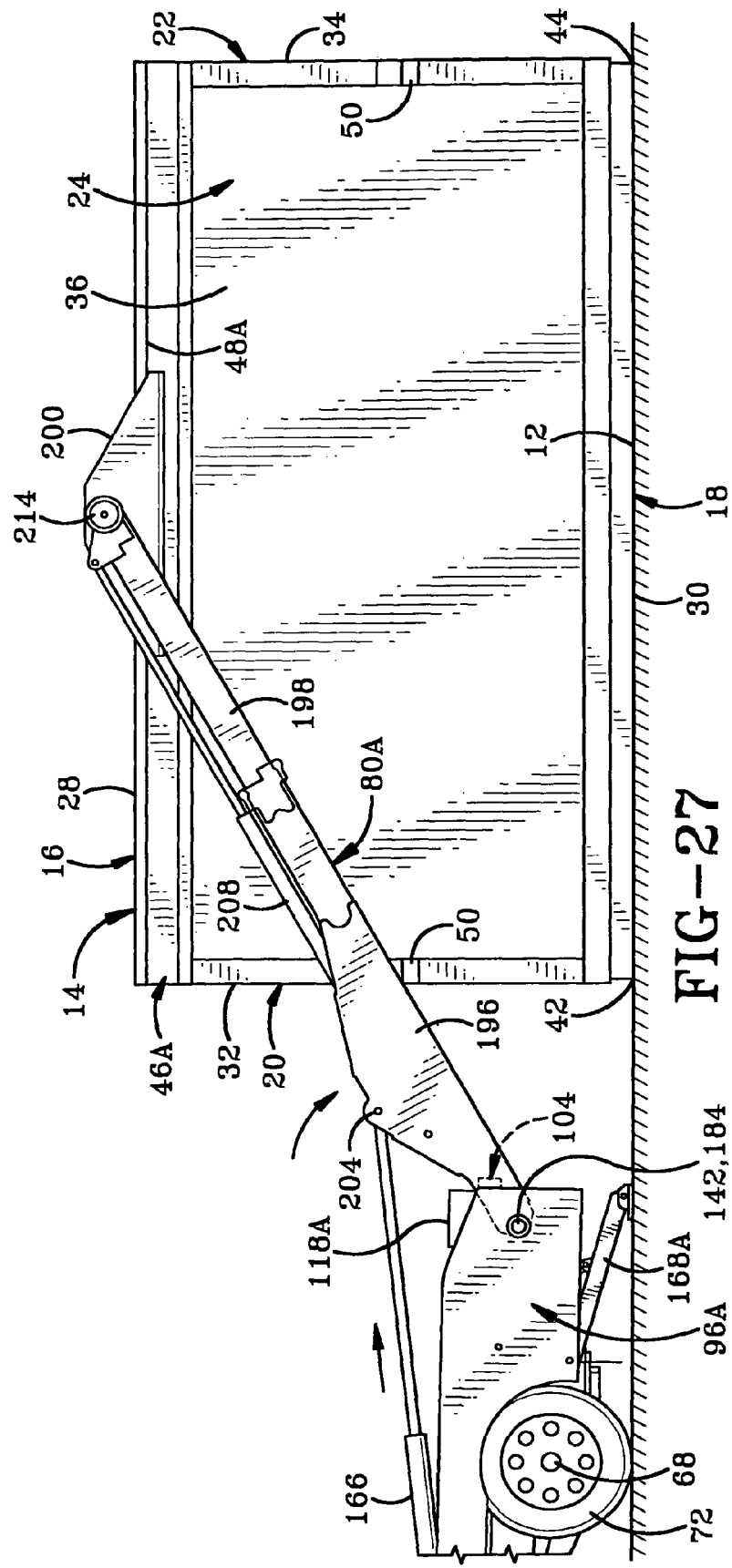
FIG. 27 is similar to FIG. 26 and shows the container having been lowered to the ground behind the vehicle.
Figure 32:
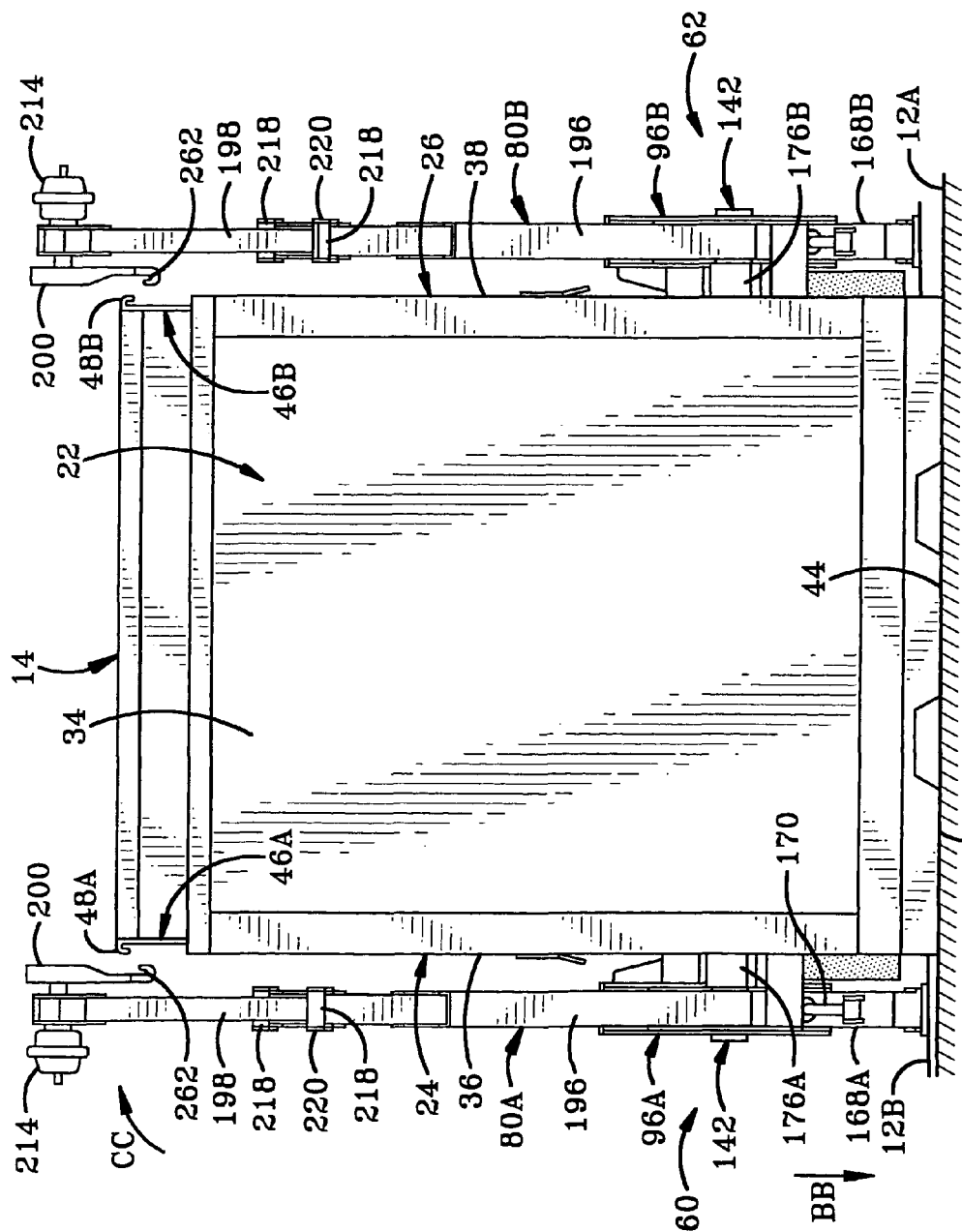
FIG. 32 is similar to FIG. 31 and shows the left stabilizer having been operated to tilt the vehicle into proper alignment with the container.
Figure 40:
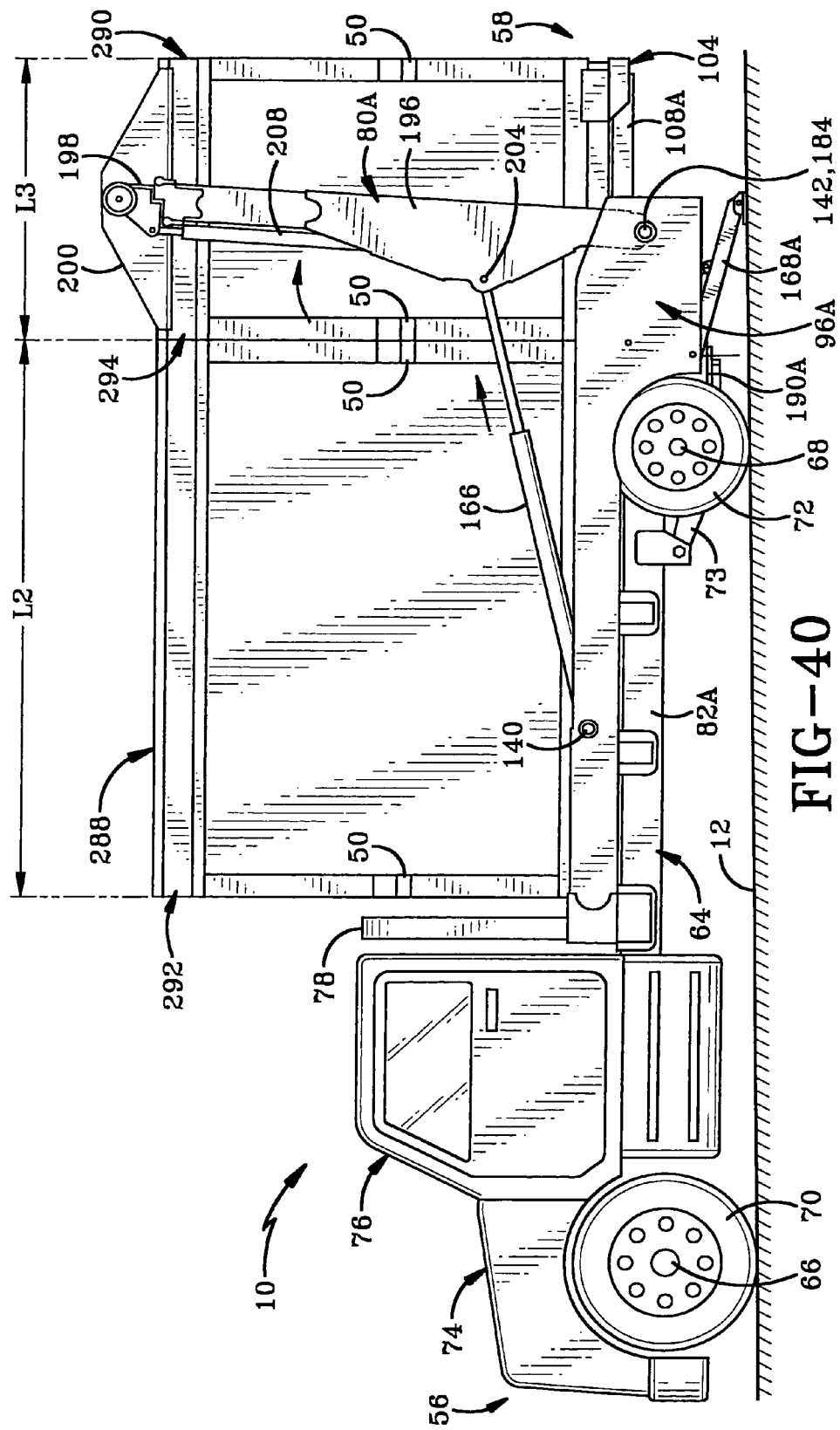
FIG. 40 is a side elevational view of the vehicle of the first embodiment with a pair of containers seated thereon.

A first embodiment of the vehicle of the present invention is shown generally at 10 in FIG. 1; and a second embodiment of the vehicle is shown generally at 300 in FIG. 40. Each of the vehicles 10 and 300 is in the form of a motorized wheeled land vehicle which is configured to be driven along the ground 12 typically on paved roadways or other paved surfaces. Each of these vehicles is a cargo carrying vehicle and is particularly configured for carrying a container 14 and includes an onboard loading and unloading mechanism for loading container 14 onto its support platform, as represented by the loaded position shown in FIG. 1, and unloading container 14 to an unloaded position behind the vehicle, as represented in FIG. 27. These vehicles are thus rear loading vehicles.

Figure 2:
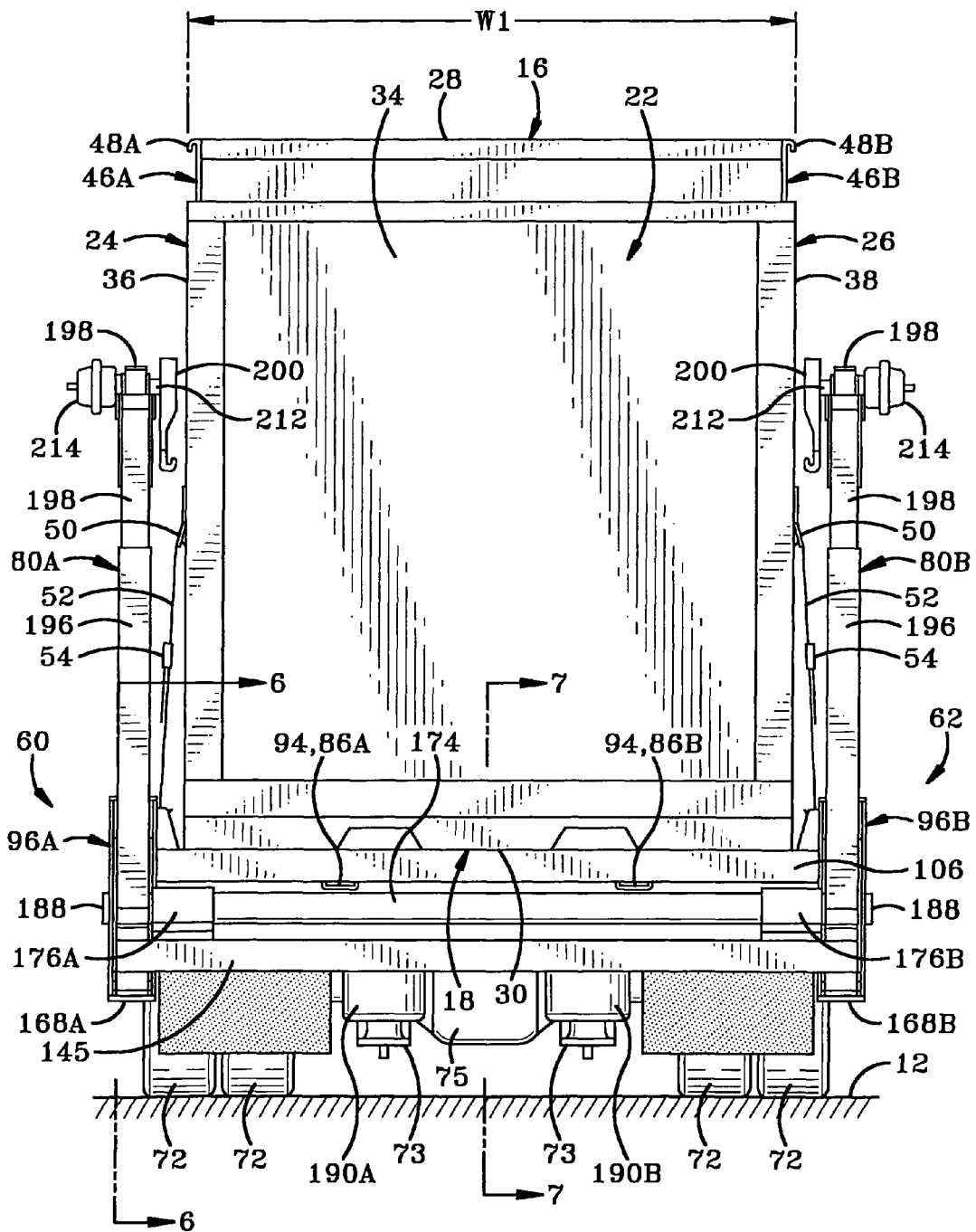
FIG. 2 is a rear elevational view of the vehicle.

Referring to FIGS. 1 and 2, container 14 is first described before further detailing vehicle 10. Container 14 has a top and bottom 16 and 18, a front and rear 20 and 22 defining there between a longitudinal direction of container 14, and left and right sides 24 and 26 defining there between an axial direction of container 14. Front 20 and rear 22 define there between a length L1 of container 14 with left and right sides 24 and 26 defining there between widths W1 of container 14. While length L1 may vary substantially, it is typically on the order of about 16 to 16 1/12 feet in the exemplary embodiment. Width W1 may also vary but in the exemplary embodiment it is typically on the order of about 7 feet. While width W1 can easily be less than this, in the exemplary embodiment it is typically not more than 7 or 7.5 feet in order for vehicle 10 to stay within the maximum width requirements as defined by the United States Department of Transportation, which is 102 inches or 8.5 feet.

Figure 25:
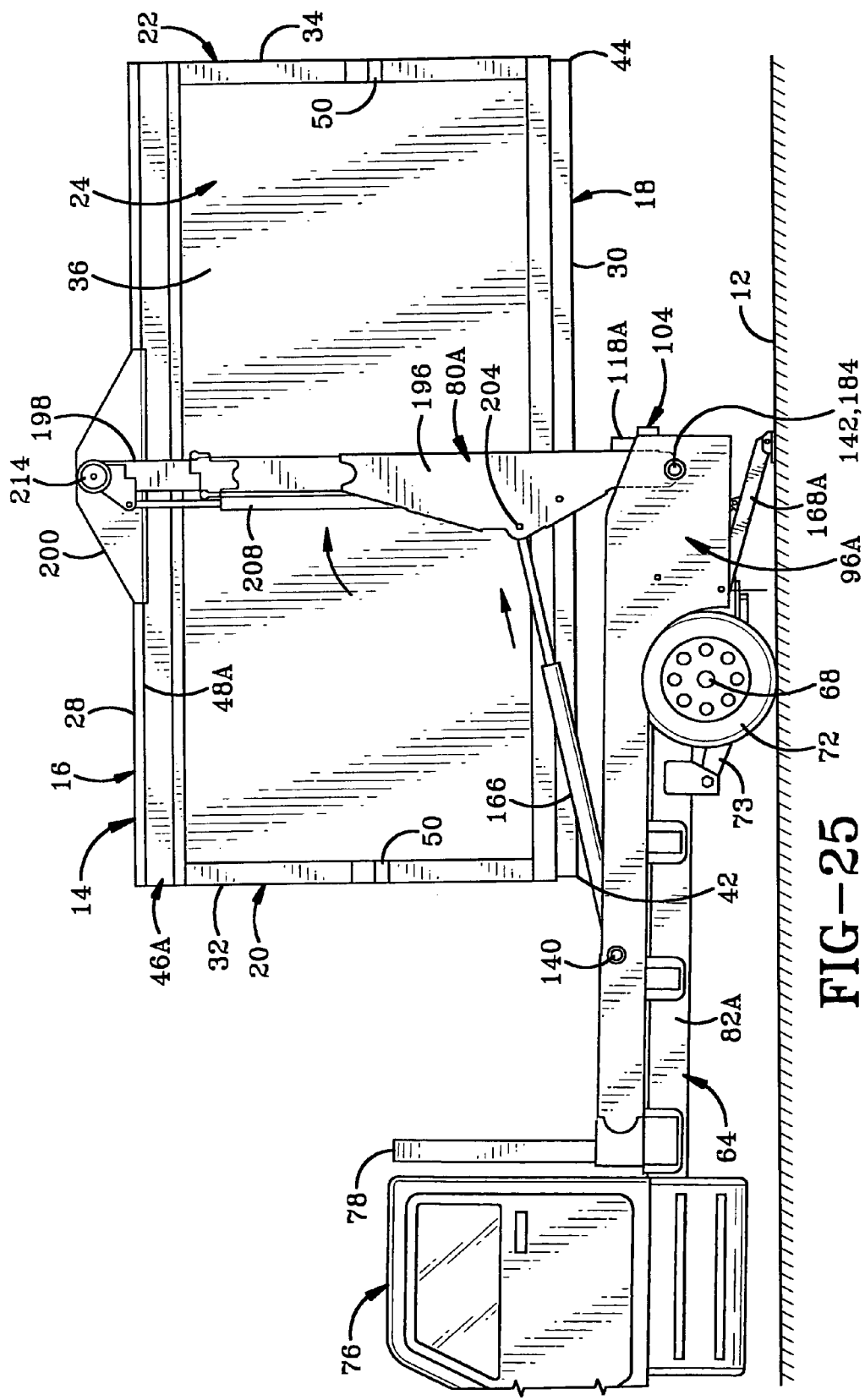
FIG. 25 is similar to FIG. 23 and shows the rearward movement of the container lift and container with the pivot arms in a substantially vertical orientation.

Referring to FIGS. 1, 2 and 25, container 14 has rectangular top and bottom walls 28 and 30, square or rectangular front and rear walls 32 and 34, and left and right rectangular sidewalls 36 and 38 whereby said walls of container 14 define therewithin an interior storage chamber 40 in which cargo may be stored or carried. Rear wall 34 includes an openable and closable door typically in the form of a roll up garage style door. As best shown in FIG. 25, the front of bottom wall 30 and the bottom of front wall 32 intersect at a substantially horizontal axially extending lower front corner 42 which extends substantially from left side 24 to right side 26. Likewise, the rear of bottom wall 30 and the bottom of rear wall 34 intersect a substantially horizontal axially extending lower rear corner 44. Container 14 further includes longitudinal container support rails 46A and 46B respectively at the top left and top right of container 14. Support rails 46A and 46B respectively include hooks 48A and 48B which extend outwardly and downwardly away from one another to a terminal lower edge. Rails 46 extend from front 20 to rear 22 of container 14 in the exemplary embodiment. Each hook 48 forms a downwardly opening channel extending from front 20 to rear 22 of container 14. Container 14 further includes tie down mounts 50 adjacent the front and rear of each of sidewalls 36 and 38 configured for attaching a strap 52 or another flexible tie down member for tying container 14 down on vehicle 10. Each of the tie down members includes a tightening mechanism 54 for tightening the straps.

With continued reference to FIGS. 1 and 2, vehicle 10 is described in greater detail. Vehicle 10 has a front 56 and a rear 58 defining there between a longitudinal direction of vehicle 10 which is the same longitudinal direction of container 14. Vehicle 10 also has left and right sides 60 and 62 defining there between an axial direction of vehicle 10 which is the same as the axial direction of container 14. Vehicle 10 generally travels forward or reverse in the longitudinal direction. Vehicle 10 has a rigid chassis or frame 64 on which are mounted front and rear axles 66 and 68. A pair of front wheels 70 are rotatably mounted on axle 66 adjacent front 56 of vehicle 10, and four rear wheels 72 are rotatably mounted on rear axle 68 in pairs on either side of vehicle 10. It is noted that rear wheels 72 have a diameter which is significantly smaller than that of front wheel 70. Rear axle 68 is more particularly mounted on movable suspension members in the form of pivot arms 73 of the rear suspension of vehicle 10 whereby axle 68, arms 73, and wheels 72 are pivotally movable relative to frame 64. Vehicle 10 includes an internal combustion engine within the engine compartment 74 adjacent front 56 and provides the power for driving vehicle 10 on its wheels 70 and 72 via a transaxle 75 (FIG. 2). Vehicle 10 further includes a cab 76 in which the driver sits for driving vehicle 10. A rigid inverted U-shaped bar 78 is mounted behind cab 76 to protect cab 76 and its passengers from forwarding sliding cargo in case of sudden stops. Vehicle 10 includes a hydraulic system including a hydraulic reservoir and pump 77 shown diagrammatically in FIG. 3, along with associated hydraulic lines (not shown). Vehicle 10 further includes an air compressor 79 to provide a source of compressed air as discussed further below. Hydraulic pump 77 and air compressor 79 are powered by engine 74. Vehicle 10 further includes a loading and unloading mechanism in the form of a lift assembly which includes left and right lifts 80A and 80B which are respectively mounted along left and right sides 60 and 62 of vehicle 10. Lift 80B is a mirror image of lift 80A whereby only lift 80A will be described in detail except for any particular references which need to be made to lift 80B.

Vehicle 10 includes a flatbed disposed behind cab 76 which provides a container support platform on which container 14 is seated in the loaded position. The support platform and underlying structure of frame 64 is described with primary reference to FIGS. 3 and 3A. U-shaped bar 78 is rigidly connected to extends upwardly from the front of the flatbed or support platform. Frame 64 includes first and second axially spaced longitudinal primary structural members 82A and 82B which extends from in front of the flatbed to adjacent its rear end. Several cross beams 84A-D are rigidly connected to and extend perpendicular to longitudinal beams 82 and axially outward thereof in opposite directions from adjacent left side 60 and to adjacent right side 62. Crossbar 84A serves as the front crossbar while crossbar 84D serves as the rear crossbar with crossbars 84B and 84C spaced longitudinally there between.

First and second rigid longitudinal slide tubes 86A and 86B are connected at their front ends to crossbar 84C and extend rearwardly therefrom to a rigid connection with crossbar 84D adjacent their rear ends, which extend rearwardly of crossbar 84D. Tubes 86A and 86B respectively define longitudinally elongated passages 88A and 88B extending from their front to their rear ends. An actuator-mounting crossbar 90 is rigidly connected to and extends between slide tubes 86A and 86B intermediate crossbars 84C and 84D. A cut-out 92 (best seen in FIGS. 6-7) is formed in each of tubes 86 which extends forward from its rear end and downwardly from its top to provide a support projection 94 which extends rearwardly from the bottom portion of the tubular portion of each slide tube 86. Left and right rigid longitudinal side rails 96A and 96B respectively extend along left and right sides 60 and 62 and are rigidly connected atop crossbars 84A-D adjacent their respective opposed ends and extend upwardly therefrom as well as axially outwardly therefrom. At the front of the support platform, a front cross rail 98 (FIG. 4) extends perpendicularly between and is rigidly connected to side rails 96A and 96B adjacent their front ends. Front cross rail 98 is disposed below inverted U-shape bar 78 and extends upwardly of cross bars 84. Rigidly adjacent the rear of the support platform and forward of crossbar 84D, a pair of shorter crossbars 100A and 100B are respectively rigidly connected to tubes 86A and 86B and extend axially outwardly therefrom to a rigid connection with respective side rails 96A and 96B.

Figure 3:
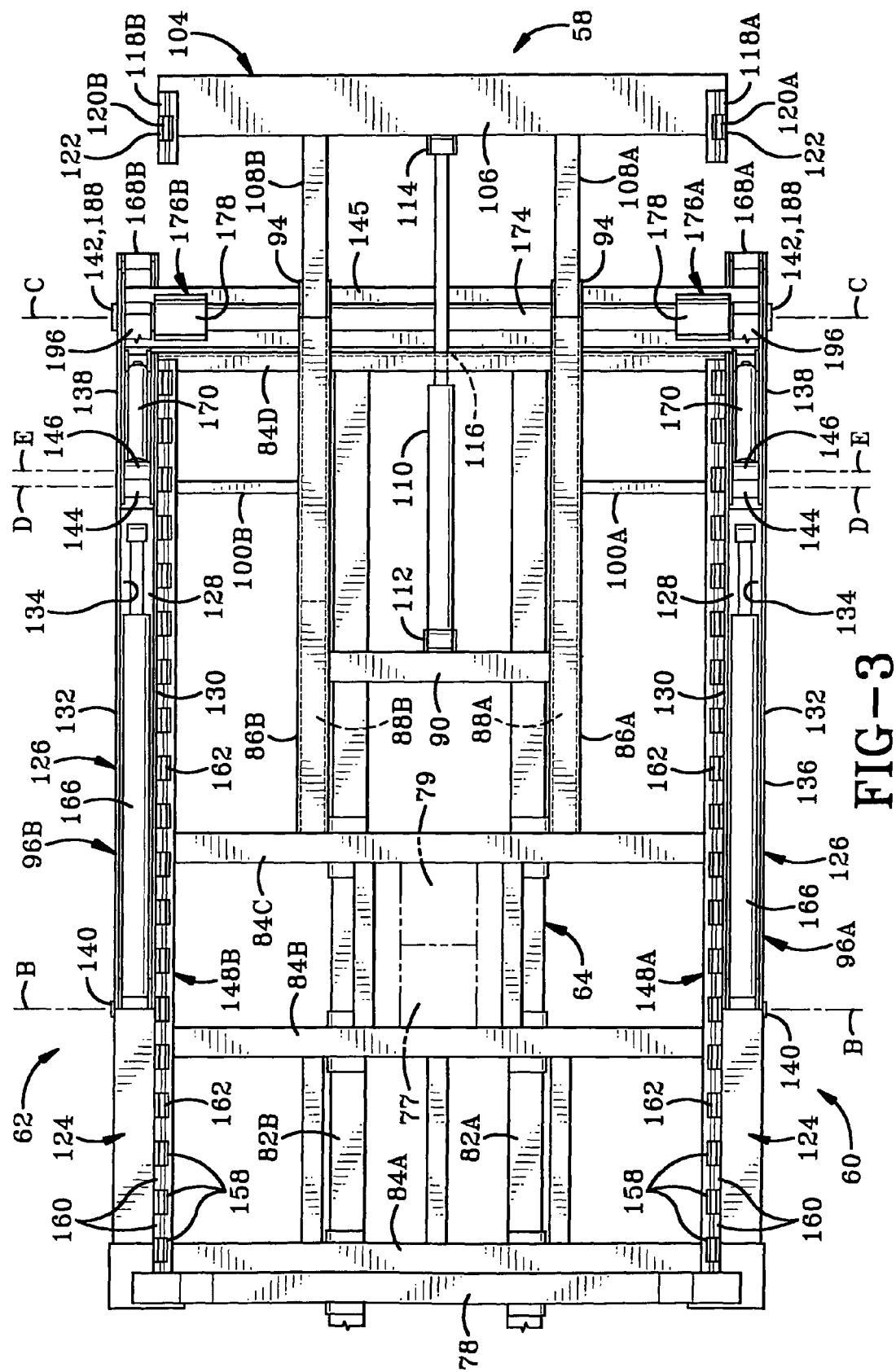
FIG. 3 is a top plan view of the framework of the vehicle behind its cab with the floor of the support platform removed and portions of the container lift removed.
Figure 3A:
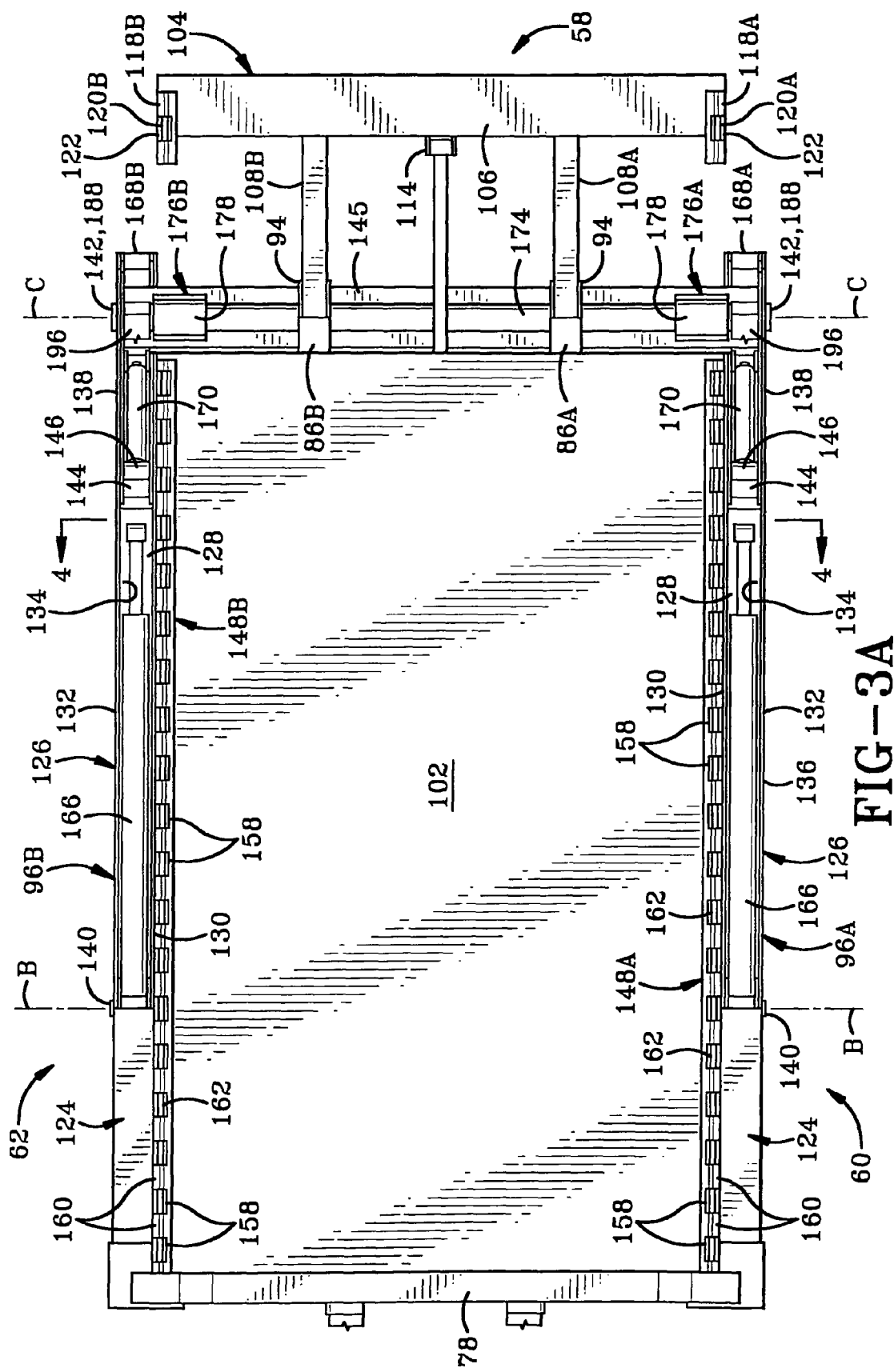
FIG. 3A is similar to FIG. 3 and shows the flat rectangular floor of the container support platform installed.
Figure 5:
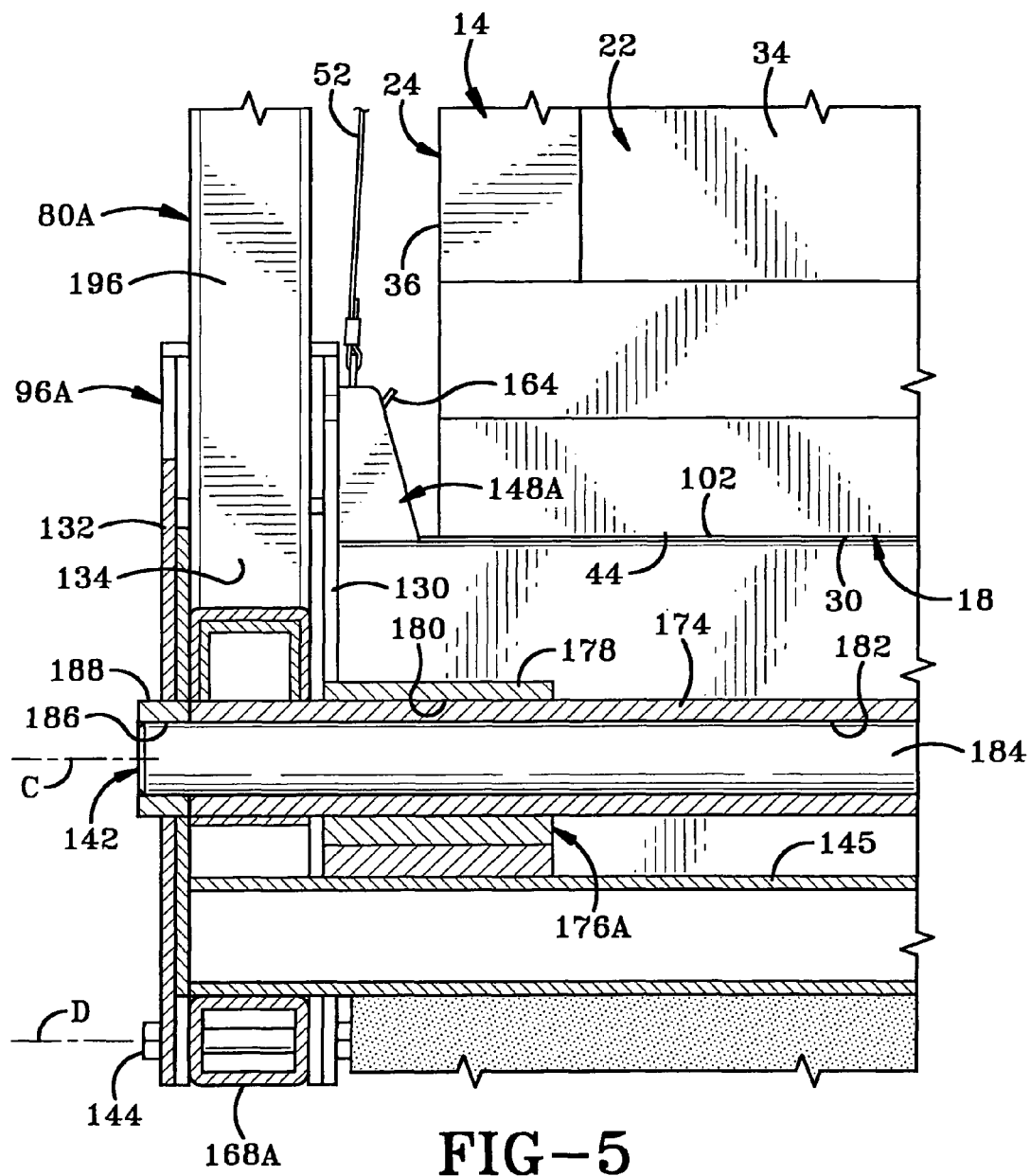
FIG. 5 is a sectional view taken along line 5-5 of FIG. 1 showing the pivot tube and the lower portion of the left container lift.

As shown in FIG. 3A, the front section of the container support platform includes a flat horizontal floor 102 secured atop cross bars 84, 90 and 100 and atop tubes 86. Floor 102 extends in a continuous manner from side rail 96A to side rail 96B in the axial direction and longitudinally from adjacent front cross rail 98 to rear crossbar 84D to form a rectangular configuration. The upper surface of floor 102 forms nearly all of the container support surface of the forward section of the support platform. The support platform further includes a rigid tail section 104 which is directly behind and slidably movable relative to the front or forward support section between a rearward or extended position (shown in FIGS. 1 and 3 and in solid lines in FIG. 7) and a forward or retracted position (shown in dashed lines in FIG. 7). In the exemplary embodiment, the movement of tail section 104 (arrow A in FIG. 7) is longitudinal and substantially horizontal when the support platform is in a horizontal orientation. In the rearward position of tail section 104, the support platform is typically as long as or longer than length L1 of container 14, while in the forward position, the support platform length is less than length L1.

Tail section 104 includes a rigid container support crossbar 106 which defines the rearmost portion of tail section 104 and the support platform and has a flat upwardly facing container support surface on which the bottom of container 14 adjacent to its rear is seated. This upper surface of crossbar 106 is directly behind and substantially coplanar with the upper surface of floor 102 in the rearward and forward positions of tail section 104. A pair of rigid parallel slide rails 108A and 108B are rigidly connected to extend forward perpendicularly from support cross bar 106 and are slidably received within slide tubes 86A and 86B so that tubes 86 and rails 108 together form a telescoping arm configuration. Axial end portions of crossbar 106 extend axially outwardly respectively beyond rails 108A and 108B to terminal ends which are disposed axially inward a short distance relative to side rails 96A and 96B respectively. In the forward position of tail section 104, it is disposed in its entirety directly between side rails 96A and 96B with crossbar 106 adjacent the rear of side rails 96 and seated on support projections 94 of slide tubes 86. In the forward position, crossbar 106 is thus typically at least partially forward of the rear ends of side rails 96 and preferably entirely forward thereof. A tail section hydraulic linear actuator 110 is pivotally connected at its front and rear ends respectively to mounts 112 and 114 which are secured respectively centrally to cross bars 90 and 106. The piston of actuator 110 passes through an axially centered hole 116 formed through cross bar 84D to allow piston 116 to slide back and forth therethrough. Rigid tapered guide walls 118A and 18B are secured to extend upwardly from support cross bar 106 adjacent its opposed terminal ends and are respectively spaced axially outwardly of rails 108A and 108B. Rigid tie down bars 120A and 120B are secured to guide walls 118 and are exposed within respective cut outs 122 formed in guide walls 118. Portions of guide walls 118 extend forward of the front edge of cross bar 106 to respective terminal ends.

Side rails 96A and 96B are now described in greater detail with primary reference to FIGS. 1 and 3. Each side rail 96 includes a front tubular section 124 extending from the front of the support platform to a rear end from which the remainder of side rail 96 extends rearwardly as an upwardly opening channel section 126. Each channel section 126 has a flat bottom wall 128 with inner and outer sidewalls 130 and 132 rigidly connected to an extending upwardly therefrom to define there between a longitudinally elongated upwardly opening channel 134 which communicates with the passage of tubular section 124. Walls 128, 130 and 132 are typically formed of heavy duty flat metal plates. Sidewalls 130 and 132 are substantially vertical and form a forward narrower section 136 and a rearward vertically wider section 138 connected to the rear end of narrower section 136 and extending downwardly and rearwardly therefrom.

Adjacent the intersection of the rear of tubular section 124 and the front of channel 126, an actuator mount includes a pivot 140 extending between and connected to inner and outer sidewalls 130 and 132 whereby pivots 140 define an axially extending pivot axis B (FIG. 3) which is horizontal and perpendicular to side rails 96A and 96B. Pivot 140 serves as a front actuator pivot. Adjacent the rear end of each side rail 96, another pivot 142 is mounted on wider section 138 and serves as a pivot arm pivot whereby pivots 142 define a pivot axis C which is parallel to pivot axis B. Pivots 142 and axis C are disposed rearward of the rear suspension, including axle 68, wheels 72 and pivot arm 74. Pivots 142 and axis C are also disposed below the upwardly facing container support surface of the support platform or floor 102 on which container 14 is seated when loaded on vehicle 10. Another pivot 144 extends between and is connected to inner and outer sidewalls 130 and 132 intermediate pivots 140 and 142 adjacent the lower front portion of wider section 138 a short distance behind wheels 72. Pivots 144 define another pivot axis D passing therethrough which is parallel to and lower than either of axes B and C. Pivots 144 serve as stabilizer pivots. Actuator pivot 146 also extends between and is connected to inner and outer walls 130 and 132 of wider section 138 a short distance rearward of pivot 144. Pivot 146 is also higher than pivot 144, slightly higher than pivot 142 and somewhat lower than pivot 140. A rear cross beam 145 extends perpendicularly between and is connected to the outer sidewall 132 of side rails 148A and 148B adjacent the rear end thereof. As shown in FIGS. 2 and 3, cross beam 145 is spaced downwardly directly below rear portions of slide tubes 86 rearwardly of and adjacent rear cross bar 84D.

Figure 24:
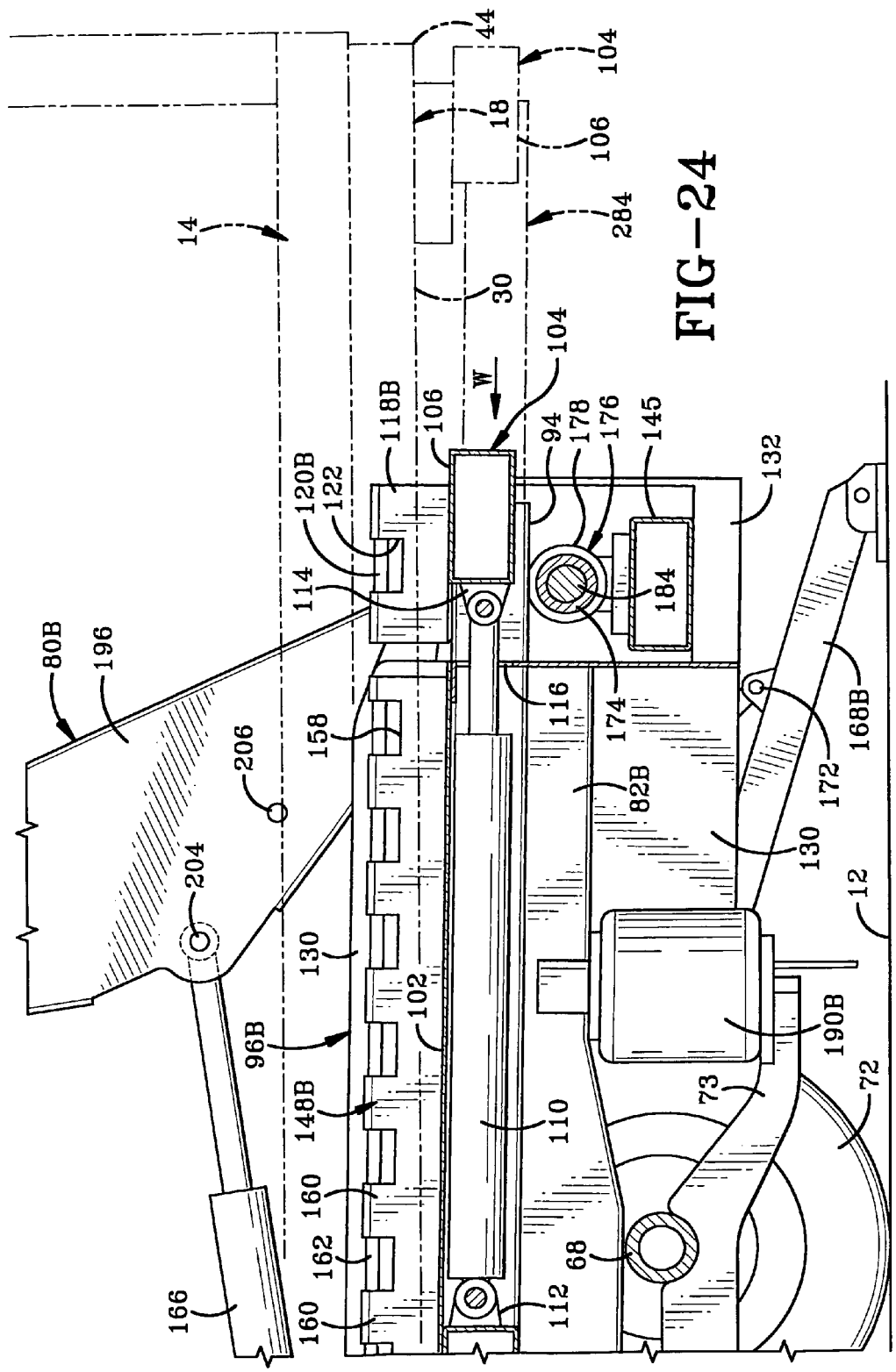
FIG. 24 is similar to FIG. 13 and shows the tail section actuator being operated to move the tail section of the support platform forward.

Side rails 96A and 96B further include respective rigid tapered guide walls 148A and 148B which are respectively connected to and extend inwardly from inner walls 130. Guide walls 148A and 148B are thus disposed adjacent and axially inward respectively of actuators 166 and pivot arms 196 of lifts 80A and 80B. Each of guide walls 148 extends from adjacent front cross rail 98 to adjacent rear cross bar 84D. As shown in FIG. 4A, each guide wall 148 includes a top wall 150 which is connected and extends inwardly from inner sidewall 130 generally horizontally and a tapered sidewall 152 which is connected to top wall 150 via an arcuate transition 154 and angles relative to vertical inwardly and downwardly away from inner sidewall 130 to a rigid connection with the top of cross bars 84 along with one side or edge of floor 102. The horizontal upper surface of floor 102 and wall 152 define therebetween an angle of about 105° in the exemplary embodiment. Said angle usually ranges from 95° to 135°, more typically from 95° to 115° or 120°, and most typically from 100° to 110° or 115°. Multiple longitudinally spaced cut outs 158 are formed in each guide rail 148 extending from inner sidewall 130 and into the upper portion of tapered wall 152. Thus, each guide wall 148 includes multiple connector tabs 160 each of which is disposed between an adjacent pair of cut outs 158 and is rigidly connected to inner sidewall 130. Each cut out 158 typically has a longitudinal length of about 1 to 4 inches or so and in the exemplary embodiment there are about 20 cut outs formed in each guide wall 148. A cylindrical tie down rod or bar 162 extends the full length of each guide wall 148 and is rigidly secured thereto at the concave surface of each arcuate transition 154 between inner sidewall 130 and tapered sidewall 152. Each cut out 158 thus provides access to a respective segment of tie down bar 162 so that a hook 164 (FIG. 4A) or other connector connected to strap 52 may be secured thereto. As shown in FIG. 3, tie down bars 120A and 120B are respectively aligned with tie down bars 162 as viewed from above. Tapered guide walls 118A and 118B are likewise aligned with guide walls 148A and 148B. As further clarified in FIG. 24, the tie down bars 120 are horizontally aligned with tie down bars 162 and more particularly are collinear. FIG. 24 also shows that the tapered wall 118 is horizontally aligned with tapered wall 148B. FIG. 24 further shows that the top of cross bar 106 is level with the top of floor 102 so that these upper surfaces are substantially coplanar and at the same height when the support platform is horizontal.

Figure 6:
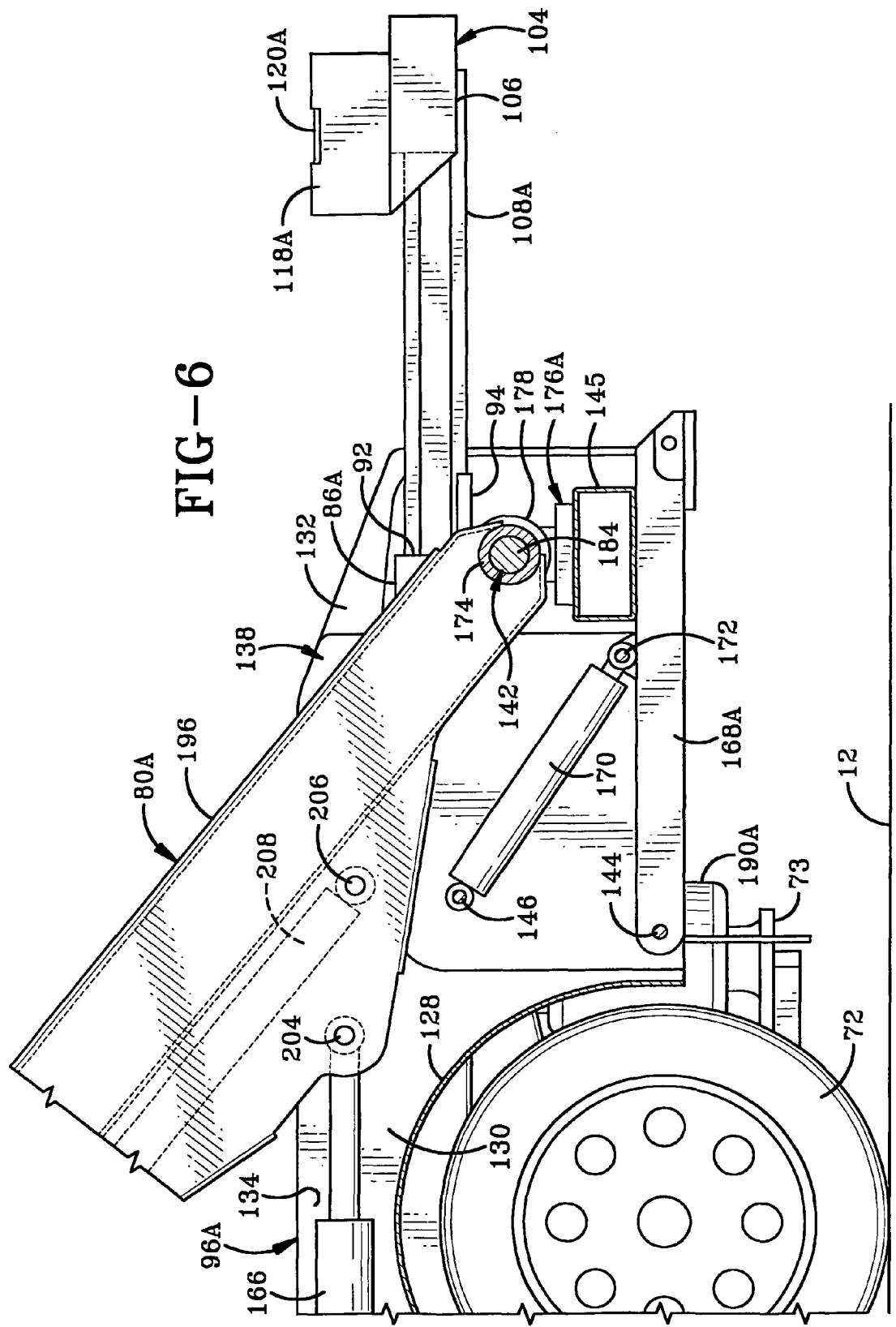
FIG. 6 is a sectional view taken along line 6-6 of FIG. 2 showing portions of the left container lift and the left stabilizer in its raised position.
Figure 14:
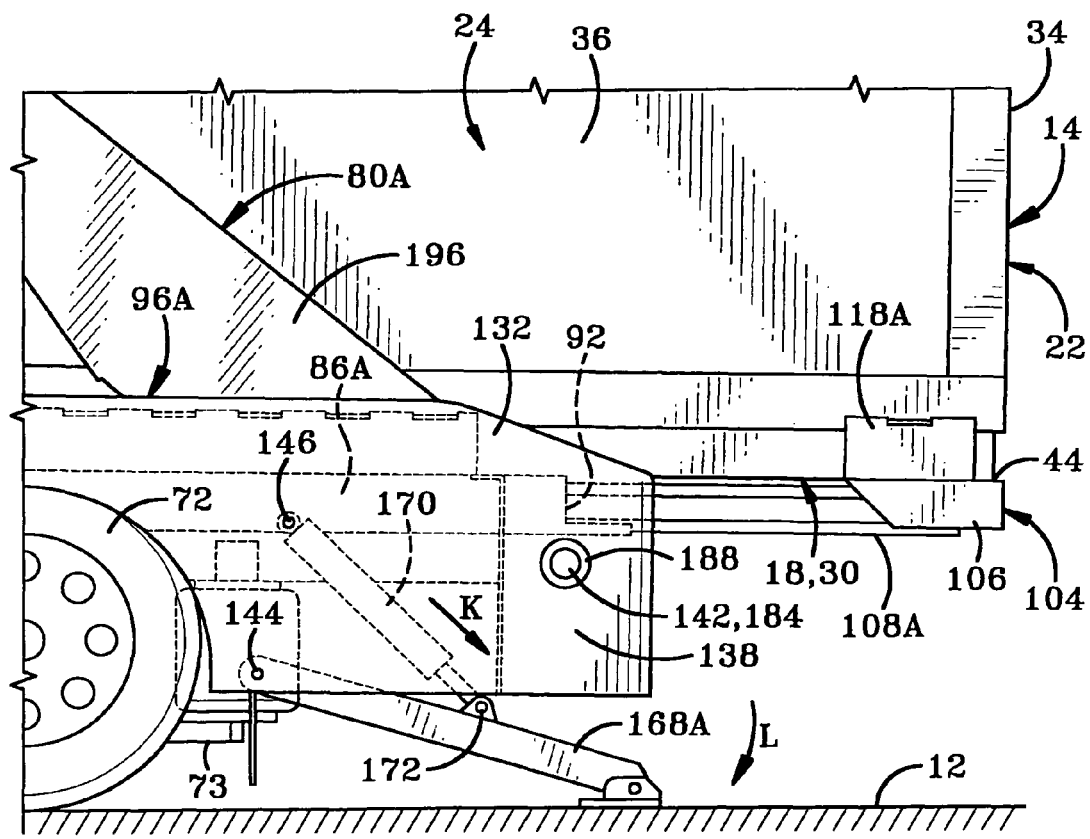
FIG. 14 is an enlarged side elevational view of the rear portion of the vehicle showing the left stabilizer having been lowered into contact with the ground.

Each of side rails 96A and 96B serves in part as a housing and mounting structure for various portions of the respective container lifts 80 and other components. For instance, a pivot arm 166 is pivotally connected adjacent its front end at pivot 140 and extends rearwardly therefrom. Actuator 166 in its fully retracted home position (FIG. 3) is substantially horizontal and completely disposed within channel 128 of the respective side rail 96 below the upper ends of sidewalls 130 and 132. In the exemplary embodiment, actuator 166 is a hydraulic piston cylinder combination serving as a linear actuator. As will be discussed in greater detail below and as shown in FIG. 6, each lift 80 is pivotally connected at pivot 142 to pivot about axle C (FIG. 3). Stabilizers 168A and 168B are respectively pivotally connected at pivots 144 and are pivotal between a raised position (FIG. 6) in which the stabilizer extends rearwardly and substantially horizontally from pivot 144 to a lowered position (FIG. 14) in which the stabilizer angles downwardly and rearwardly from pivot 144 so that the free end or foot of the stabilizer contacts ground 12. A stabilizer actuator 170 in the form of a hydraulic piston cylinder combination is pivotally connected at pivot 146 adjacent one end thereof and pivotally connected at its opposite end at a pivot mount of the respective stabilizer 168 at another pivot 172 (FIG. 6) about an axis which is parallel to axes B, C, D and E.

Referring now to FIGS. 2, 3, 5 and 6, container lift 80A and 80B are interconnected by a rigid pivot tube 174 which is pivotally mounted about axis C via a pair of mounting members 176A and a 176B which are rigidly secured to and extend upwardly from cross beam 145 adjacent its opposed ends. Each mounting member 176 includes a cylindrical collar 176 defining a cylindrical passage 180 which receives therein a portion of pivot tube 174 adjacent its opposed ends. Respective end portions of pivot tube 174 extend axially outwardly beyond the respective collars 178 and provide a location at which lifts 80 are respectively rigidly secured to pivot tube 174. Pivot tube 174 defines an axially elongated cylindrical passage 182 extending from end to end for receiving therein a rigid reinforcing rod 184 which extends all the way through passage 182 and outwardly beyond either end a short distance to be received within a cylindrical passage 186 of a cylindrical collar 188 rigidly connected to outer wall 132 of the respective side rail 96. Pivot tube 174 ensures that each container lifts 80 pivots in unison about axis C.

Figure 7:
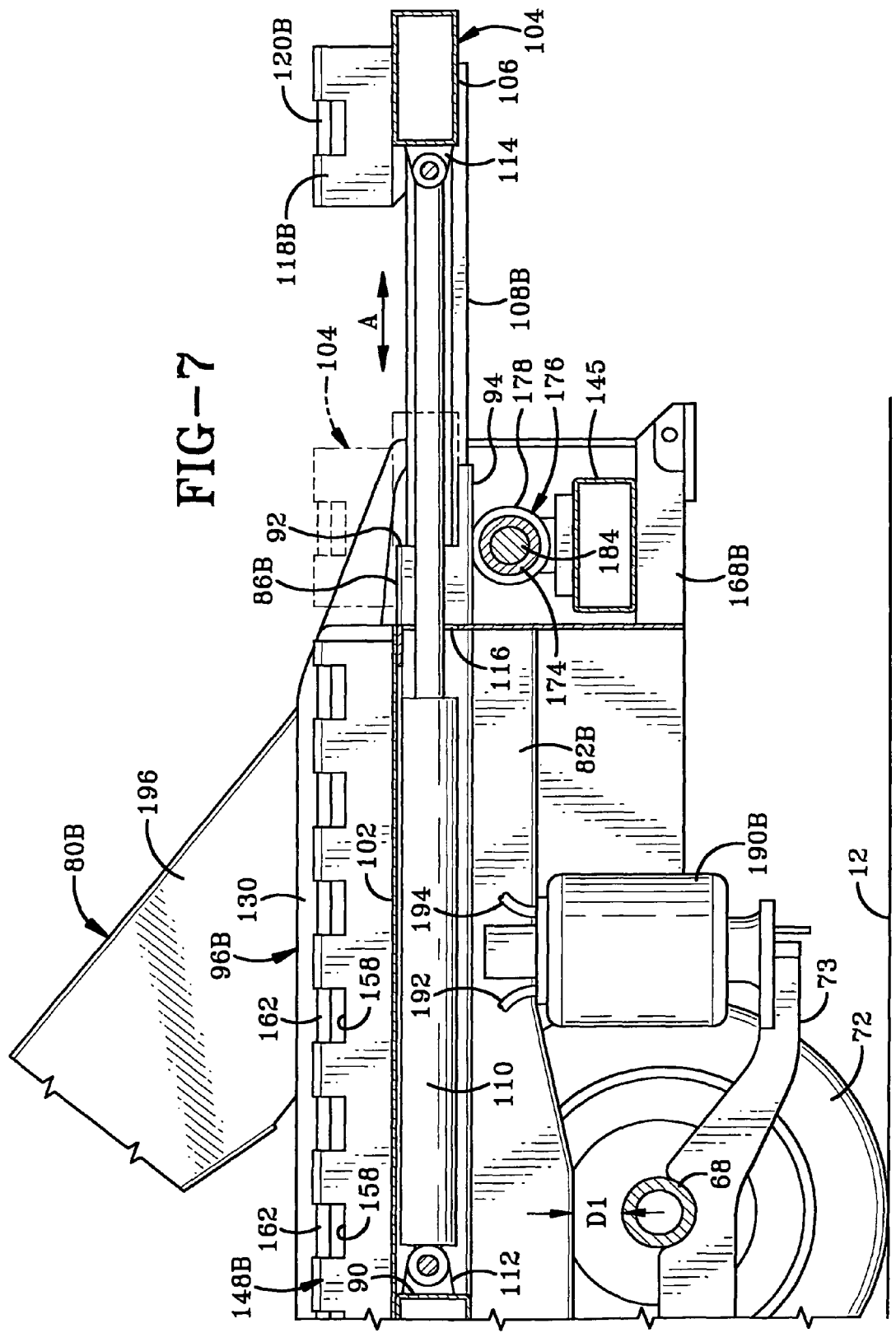
FIG. 7 is a sectional view taken along line 7-7 of FIG. 2 showing the right air spring, the tail section actuator and associated structure.

Vehicle 10 further includes a container support platform lift which is disposed below the support platform and in the exemplary embodiment is a pneumatic lift comprising first and second air springs 190A and 190B (FIG. 2). As shown in FIG. 7, each air spring 190 is seated on a respective pivot arm 73 adjacent its rear end and extends upwardly therefrom to a connection with one of primary longitudinal beams 82. Air springs 190 thus have a dual purpose in providing a lift mechanism and serving as shock absorbing suspension members of the rear suspension. Each air spring is provided with an air inlet 192 which comprises an inlet valve and is in fluid communication with air compressor 79 and its associates tank of compressed air to provide for the inflation of air spring 190. Each air spring 190 further includes an air outlet 194 comprising an exhaust valve which may be controlled to deflate the air spring. Valves 192 and 194 preferably include an electronic control for controlling the opening and closing of the valve.

Figure 8:
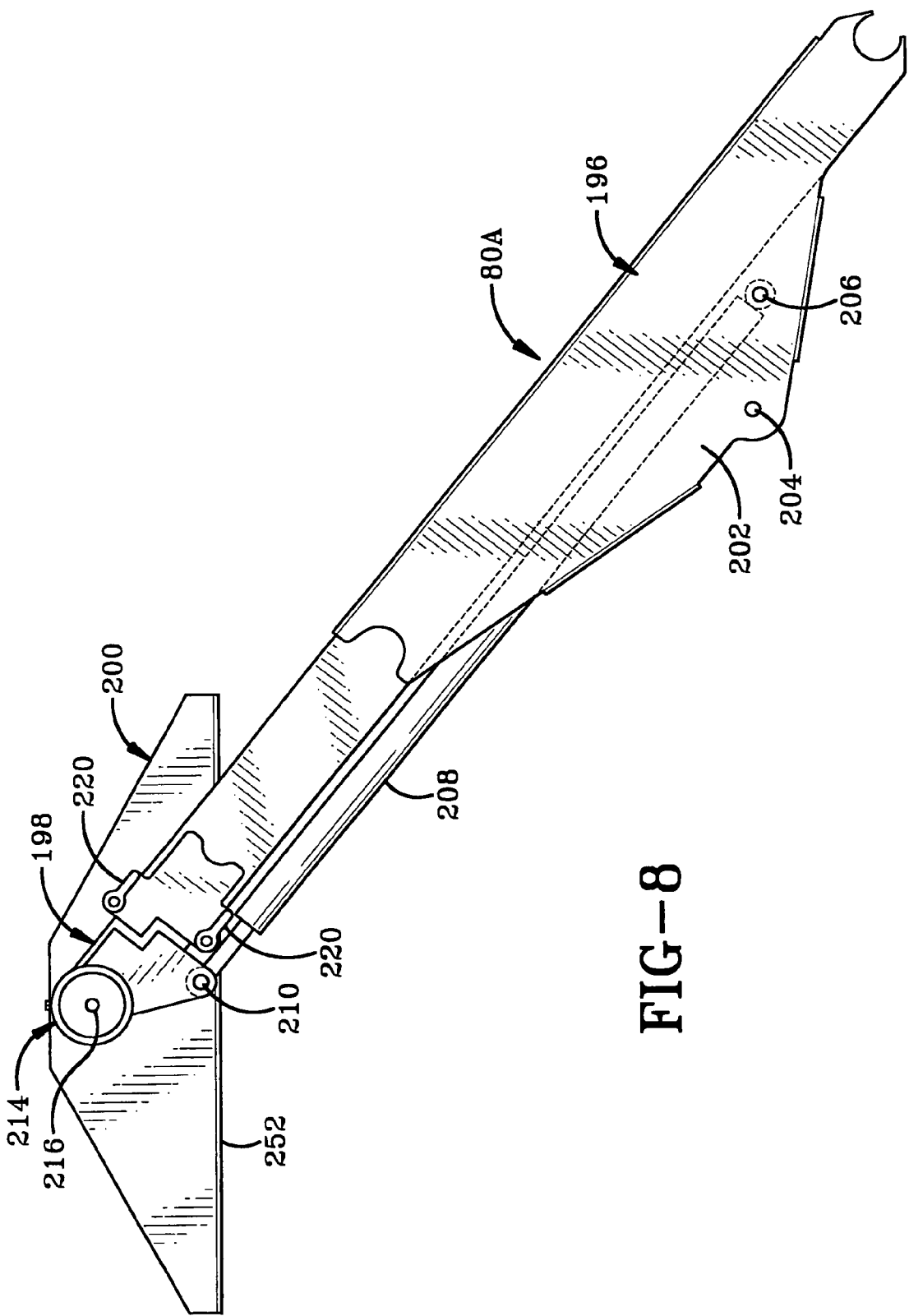
FIG. 8 is an enlarged side elevational view of the left container lift shown removed from the vehicle.
Figure 8A:
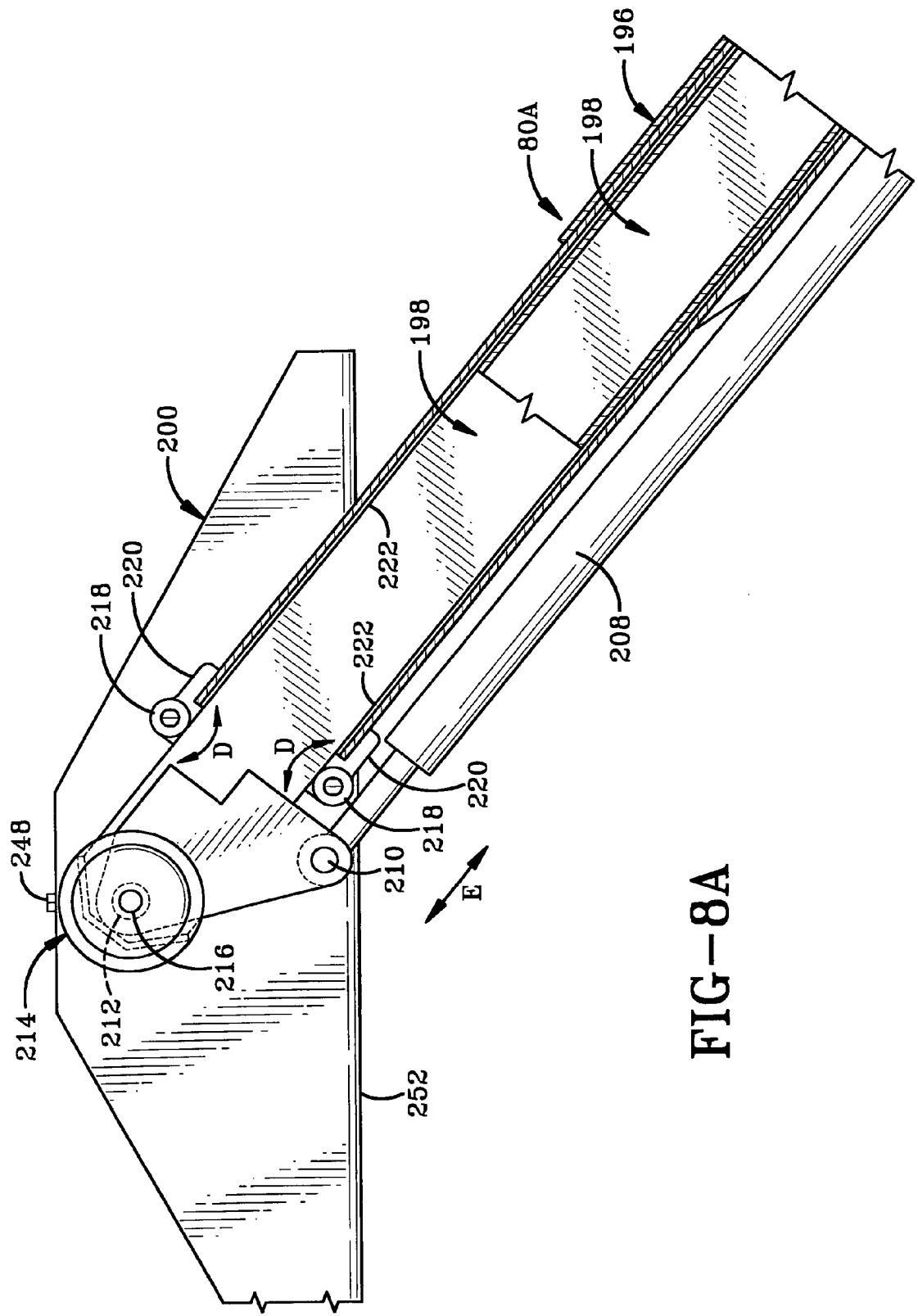
FIG. 8A is an enlarged side elevational view of the upper portion of the left container lift with portions shown in section.
Figure 8B:
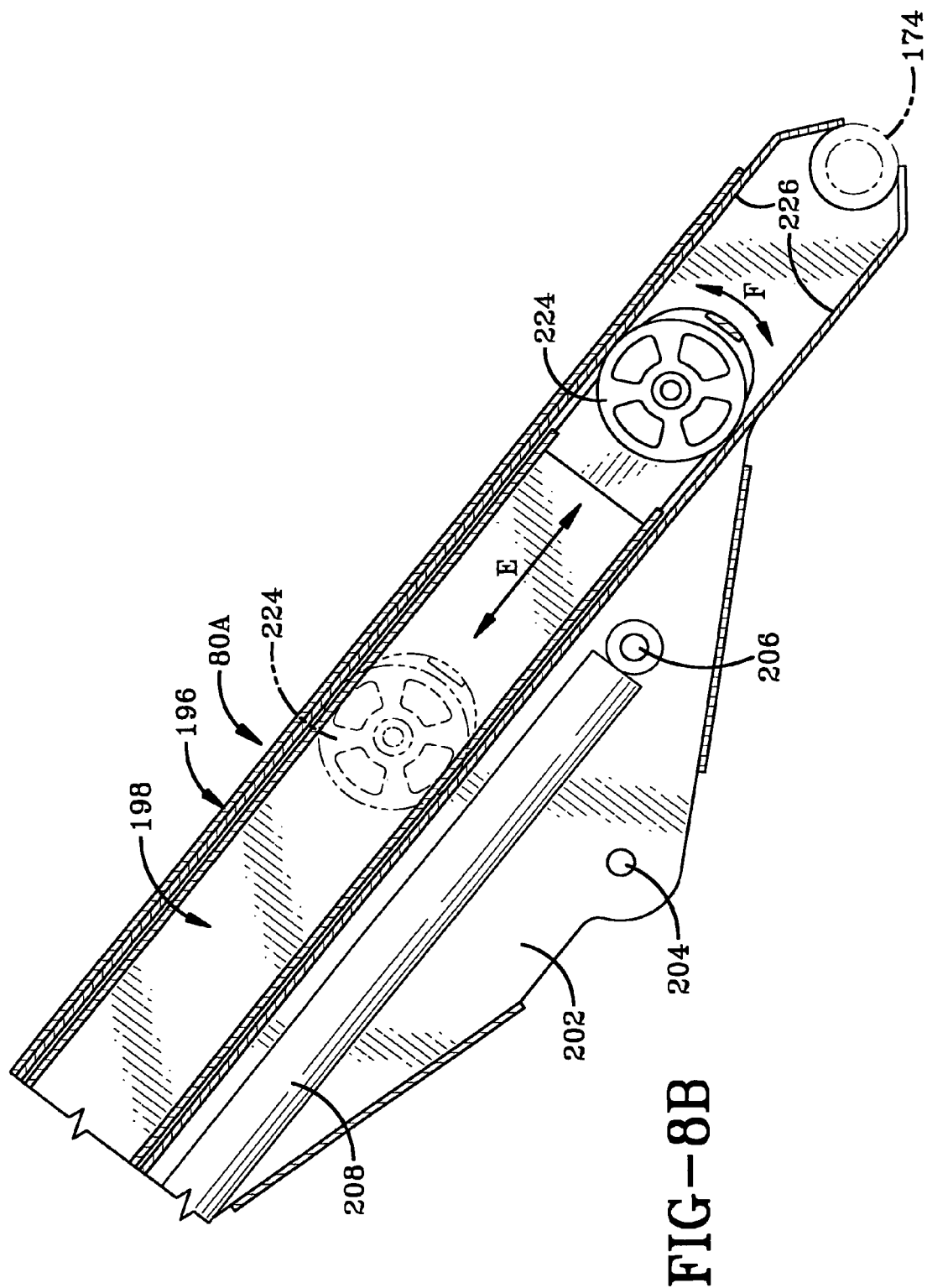
FIG. 8B is an enlarged sectional view taken from the side of the lower portion of the left container lift.

Container lift 80 is now described with primary reference to FIGS. 8-8B. Each container lift 80 includes a rigid pivot arm 196 which is rigidly connected adjacent its lower end to pivot tube 174 (FIGS. 5, 6), a rigid telescoping arm 198 which is slidably received in pivot arm 196 and a rigid container lift engaging member or hook member 200 which is pivotally mounted adjacent the upper or outer free end of telescoping arm 198. Pivot arm 196 includes a generally triangular actuator mounting flange 202 which carries a pivot 204 and a pivot 206 which is spaced rearwardly of pivot 204 in the home position shown in FIG. 1 and 8. As shown in FIG. 6, the piston of actuator 166 adjacent its rear end is pivotally connected at pivot 204 whereby the piston is pivotable relative to pivot arm 196 about an axis passing through pivot 204 which is parallel to the previously noted axes B-E. A telescoping arm actuator 208 is pivotally connected adjacent one end thereof at pivot 206 and adjacent its opposite end at a pivot 210, which is carried by the upper or outer free end of telescoping arm 198. In the exemplary embodiment, actuator 208 is a linear hydraulic piston cylinder combination which is powered by hydraulic pump 77 (FIG. 3). Hook member 200 is pivotally connected by a pivot in the form of a rigid support arm 212 which is pivotally mounted adjacent the upper end of telescoping arm 198 to pivot about an axis which passes through arm 198 and is parallel to the previously mentioned axes B-E. Pivot arm 212 is also slidably received within an opening in arm 198 and axially movable therein along the axis about which it pivots. A pneumatic axial actuator 214 is secured adjacent the upper end of telescoping arm 198 for driving the axial movement of support arm 212 along with hook member 200. Actuator 214 includes a port 216 which is in fluid communication with air compressor 79 (FIG. 3). A pair of rollers 218 are rotatably mounted (arrows D) via a pair of roller mounts 220 on the outer end of pivot arm 196 so that the cylindrical outer surfaces of rollers 218 respectively rollingly engage opposed outer surfaces 222 of telescoping arm 198 during extension and retraction thereof (arrow E). Referring now to FIG. 8B, a single roller 224 is rotatably mounted (arrow F) on telescoping arm 198 adjacent its inner or lower end within the interior chamber or passage of the tubular pivot arm 196. The cylindrical outer surface of roller 224 rollingly engages one of opposed inner surfaces 226 of opposed sidewalls of arm 196 during the extension or retraction of telescoping arm 198. Roller 224 has a diameter which is slightly less than the normal distance between inner surfaces 226 roller 224 so that roller 224 rollingly engages only one of surfaces 226 depending on the angle at which pivot arm 196 is disposed. Preferably, the use of rollers 218 and 224 substantially minimizes or eliminates the sliding engagement between the outer surface of telescoping arm 198 and the inner surface of pivot arm 196.

As shown in FIGS. 9 and 10, support arm 212 is generally hammer shaped and has a cylindrical post 228 with an enlarged head 230 connected at one end of post 228. Head 230 includes a central portion 232 having a square or rectangular cross section, and front and rear tapered end portions 234A and 234B connected to central portion 232 and extending respectively forward and rearwardly therefrom. A vertical through hole 236 is formed in the center of central portion 232. Head 230 is received within a longitudinally elongated through hole 238 formed in the upper portion of hook member 200 centrally between its front and rear ends 240 and 242. Another through hole 243 is formed in member 200 below hole 238 and likewise extends from side to side. A vertical hole 244 is formed in member 200 extending downwardly from its upper end to communicate with hole 238. A second vertical hole 246 is formed in hook member 200 vertically aligned with hole 244 and extending downwardly from hole 238 to hole 243. When head 230 of support arm 212 is received in hole 238, vertical holes 244 and 246 are aligned with vertical hole 236 for receiving therethrough a bolt 248 which serves as a pivot and threadedly engages a nut 250 disposed within hole 243 to secure hook member 200 on support arm 212. Hook member 200 is thus pivotable about vertical axis G as indicated at arrow H. Hook member 200 is weight balanced relative to its pivotal connection with post 228 so that the straight lower end 252 thereof tends to remain horizontal regardless of the angle of pivot arm 196 during its pivotal movement about the horizontal axis of post 228.

Hook member 200 is configured as a generally triangular and substantially flat member which lies substantially along a vertical longitudinal plane. Adjacent lower end 252, hook member 200 includes a J-shaped hook which extends in a continuous manner from end 240 to end 242 and includes an upwardly extending outer leg 254, a base 256 connected to the outer leg 254 and extending inwardly therefrom and an inner leg 258 connected to base 256 and extending upwardly therefrom to a terminal upper end 260 wherein legs 254 and 258 are axially spaced from one another to define there between an upwardly opening channel 262.

Each lift 80 is effectively pivotally cantilevered from pivot tube 174, which serves as the sole axially extending interconnection between lifts 80A and 80B. In the exemplary embodiment, the only other interconnection between each lift 80 and the frame of vehicle 10 is supplied by actuator 166 via its pivotal connections to pivot arm 196 and rail 96. Each lift 80 thus extends upwardly to a free end defined generally by the upper free end of telescoping arm 198 and hook member 200 so that lifts 80A and 80B define therebetween a container receiving space directly above the container support platform for receiving therein container 14. Thus, there is no interconnecting member which extends axially from lift 80A to lift 80B above the container support platform. The space between lifts 80A and 80B is thus completely open when container 14 is not disposed therein and opens upwardly behind U-shaped bar 78 without obstruction and rearwardly above the container support platform without obstruction.

Figure 11:
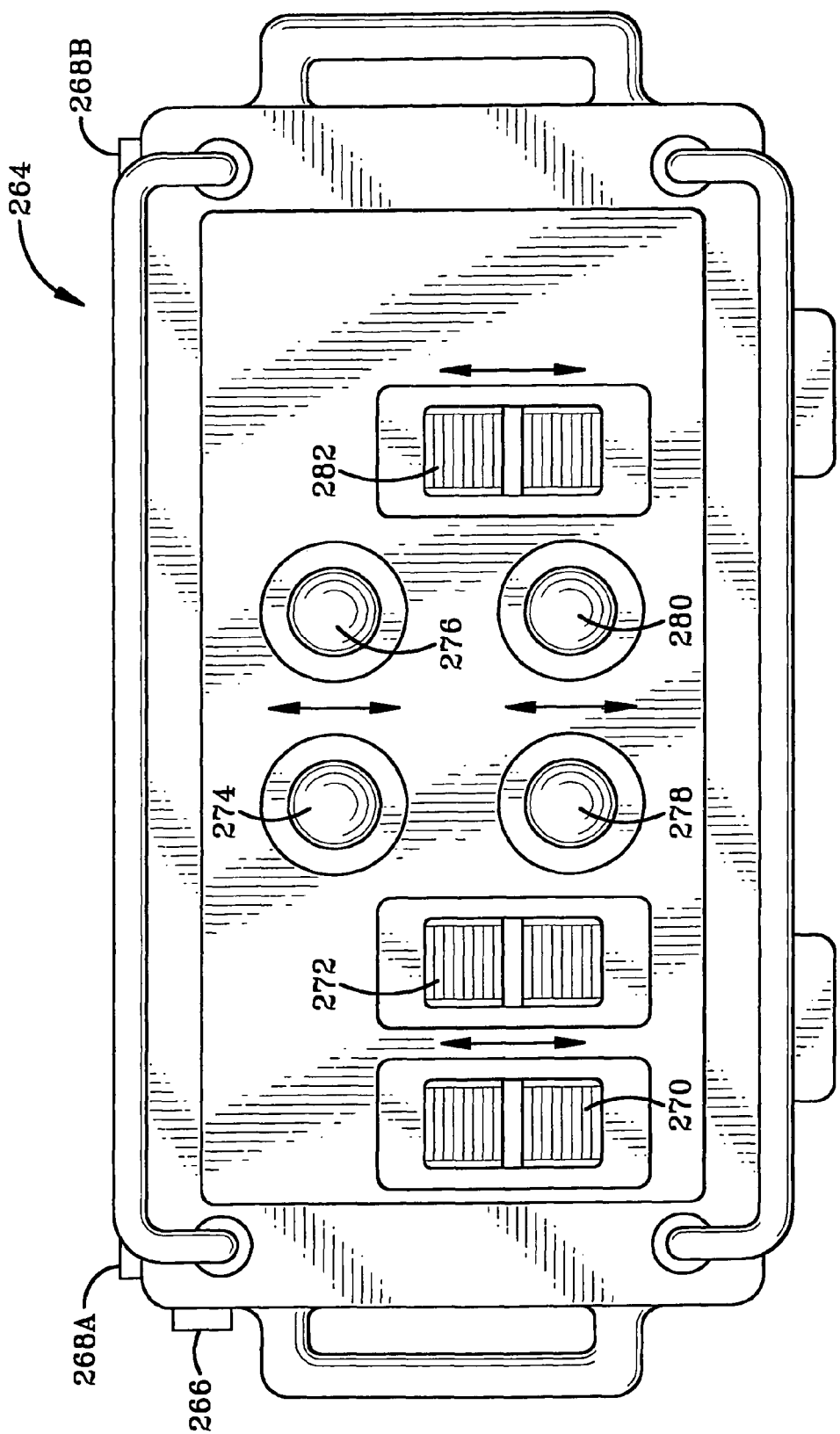
FIG. 11 is a top plan view of the first embodiment of the remote control.

FIG. 11 shows a remote control 264 for remotely or wirelessly controlling the various operations which are utilized in loading and unloading container 14 onto and off of vehicle 10. Remote control 264 includes a housing which includes a battery compartment for housing a battery which is in electrical communication with appropriate electronic circuitry used in controlling various operations of vehicle 10. Mounted on the housing is an on/off switch 266 for turning remote control 264 on and off. In addition, left and right safety switches 268A and 268B are mounted on the housing and are configured to allow remote control only if one of the safety switches is depressed. Various other switches are mounted on the housing for controlling the various operations of vehicle 10 and are in electrical communication with the circuitry within the housing of remote control 264. Remote control 264 further includes an antenna for transmitting signals to the receiver on vehicle 10 wherein specific radio frequency signals are produced in accordance with the movement of the below described switches. These operating switches include a telescoping arm switch 270, a pivot arm switch 272, left and right stabilizer switches 274 and 276, a tail section switch 278, an air spring switch 280 and a hook member switch 282. Each of these switches is a three-way switch including a neutral centered position and moves between three positions as indicated generally by the arrows in FIG. 11. Thus, switch 270 is manually operable to move between two positions which respectively extend and retract actuators 208 and telescoping arms 198 (FIG. 8) with the neutral position of the switch maintaining arms 198 in a stopped or still position relative to pivot arms 196. Likewise, switch 272 is manually operable to control the extension and retraction of actuators 166 (FIG. 3), which respectively drives the rearward and forward pivotal movement of pivot arms 196 about axis C. Switches 274 and 276 respectively control the extension and retraction of stabilizer actuators 170 (FIG. 6), which respectively drive the pivotal lowering and raising of stabilizers 168A and 168B. Switch 278 controls the extension and retraction of actuator 110 (FIG. 7), which respectively drives the rearward and forward movement of tail section 104 relative to the forward section of the support platform. Switch 280 is operated to control the inflation and deflation of air springs 190 (FIGS. 2, 7) to respectively control the lowering and raising of the frame of the support platform adjacent rear axle 68. More particularly, switch 280 may control air compressor 79 (FIG. 3) and/or air inlet valve 192 so that pressurized air is forced into air springs 190 to provide the raising movement. Switch 280 may be also used to control the outlet valve 194 to allow air to be exhausted from within each of springs 190 to create the deflation and lowering movement. Switch 282 is used to operate pneumatic actuators 214 in order to move hook member 200 in the axial direction inwardly toward container 14 and outwardly to disengage from rails 46. Remote control 264 thus wirelessly communicates the various signals created by the manual manipulation of its various switches to the receiver on vehicle 10, which is in the electrical communication with the various electronic controls which are used to operate the hydraulic pump, the air compressor, the various hydraulic valves and air valves necessary to effect the operation of the various actuators and the air springs.

Figure 12:
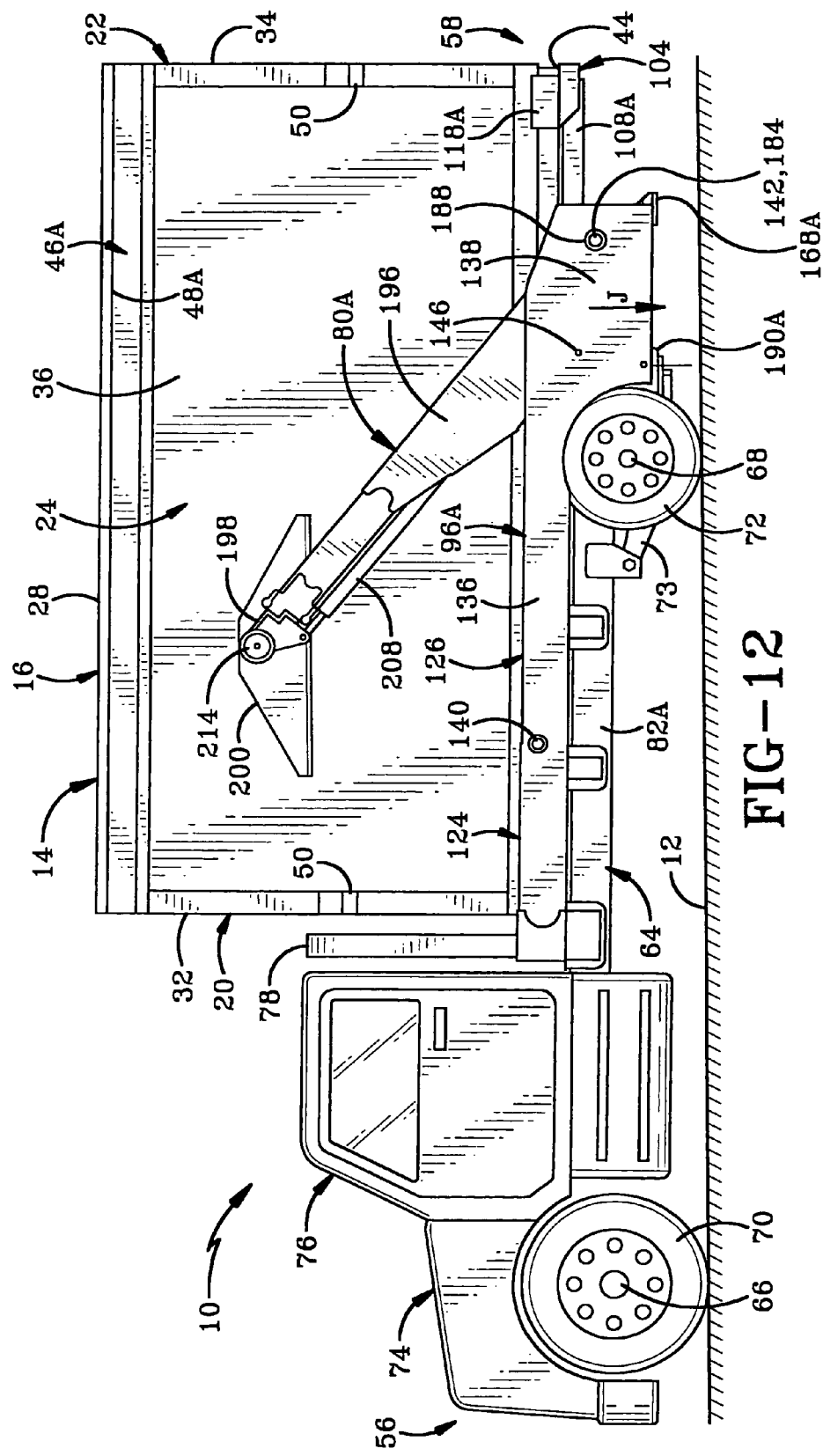
FIG. 12 is a side elevational view of the vehicle similar to FIG. 1 showing the rear of the vehicle being lowered.
Figure 13:
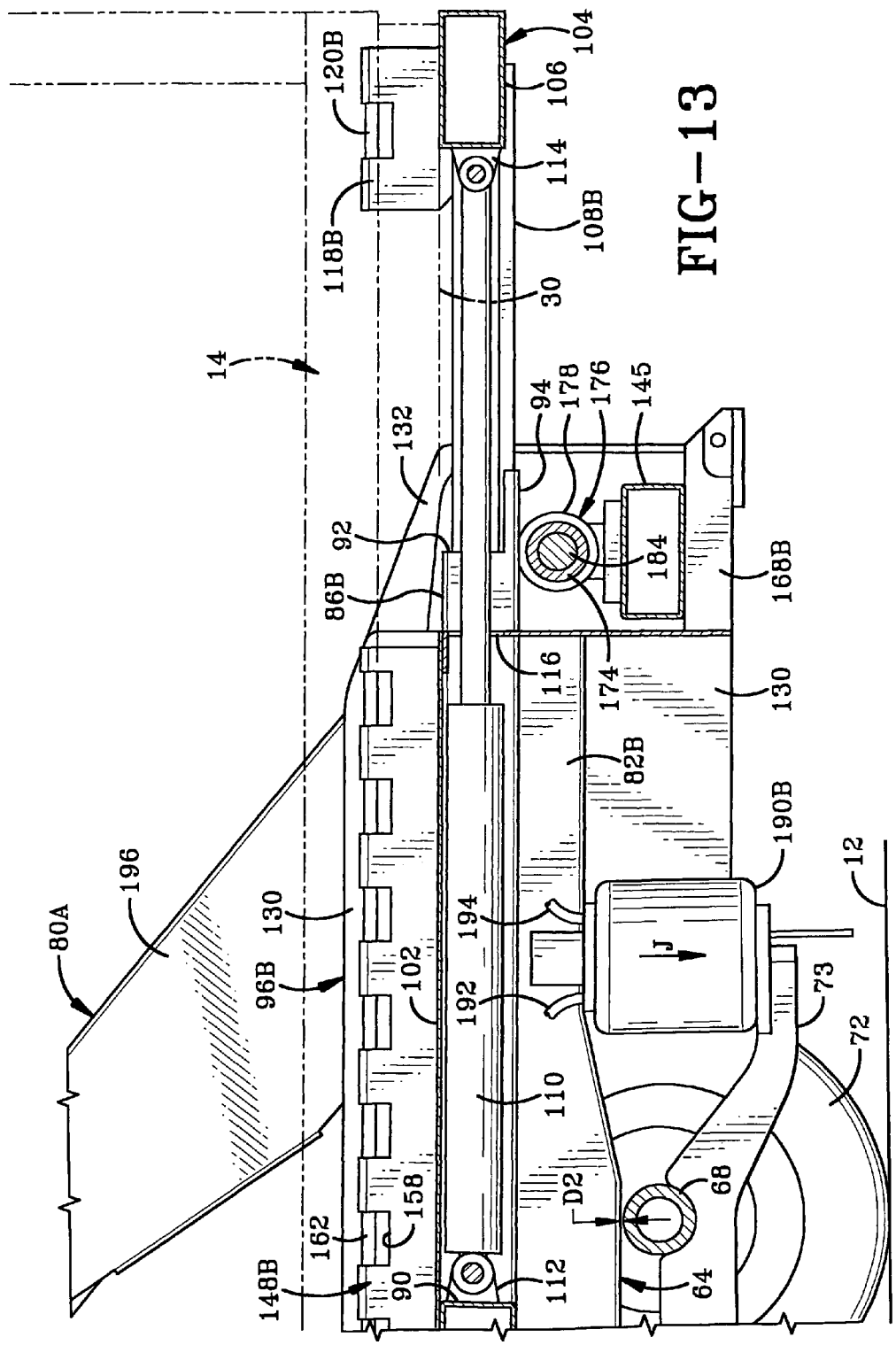
FIG. 13 is a view similar to FIG. 7 showing the right air spring having been deflated to lower the rear end of the vehicle.

The unloading operation of vehicle 10 is now described with reference to FIGS. 12-30. Vehicle 10 will be driven forward or backed up in order to position itself forward of an unloading position to which container 14 is to be unloaded. Engine 74 of vehicle 10 will be operated to power the hydraulic and pneumatic systems to operate the movement of lifts 80, tail section 104, stabilizers 168 and air springs 190. Although reference may not be made from this point on to the use of remote control 264, it will be understood that remote control 264 would typically be used in controlling the various operations described hereafter. FIGS. 12 and 13 show container 14 seated on the support platform with the rear end of container 14 seated on the upwardly facing surface of tail section 104. Container 14 is in an upright position with its top and bottom in a substantially horizontal orientation. To increase the stability of vehicle 10 and to reduce the vertical distance that container 14 must be lowered during the unloading process, air springs 190 are deflated to lower the support platform and container 14 as indicated at arrows J. More particularly, the entire vehicle other than rear wheels 72 and the rear suspension including pivot arm 73 and rear axle 68 is pivoted along with container 14 about front axle 66 and thus about an axially extending axis which passes through axle 66 and is substantially horizontal. This pivotal movement thus includes the engine and engine compartment 74, cab 76, frame or chassis 64, lifts 80 and the entire container support platform including tail section 104, stabilizers 168, the associated actuators and so forth. This pivotal movement thus occurs about an axis which is forward of cab 76, the entire support platform, the container and the lifts etc. This lowering movement thus also represents the reduction of the vertical distance between rear axle 68 and the various components directly there above, such as rails 82 of frame 64, the container support platform, the container and other components which are above and generally longitudinally aligned with axle 68. This reduction in vertical distance is illustrated by distance D1 in FIG. 7 and distance D2 in FIG. 13. More particularly, distance D1 represents the vertical distance between the top of axle 68 and the bottom of the portion of rail 82 disposed directly there above in the raised position while distance D2 represents the analogous distance in the lowered position of air springs 190. Air springs 190 thus serve a dual purpose in providing a pneumatic lift or actuator for lowering and raising the container support platform relative to rear axle 68 and the ground, and as a shock absorbing mechanism for the rear suspension.

Figure 15:
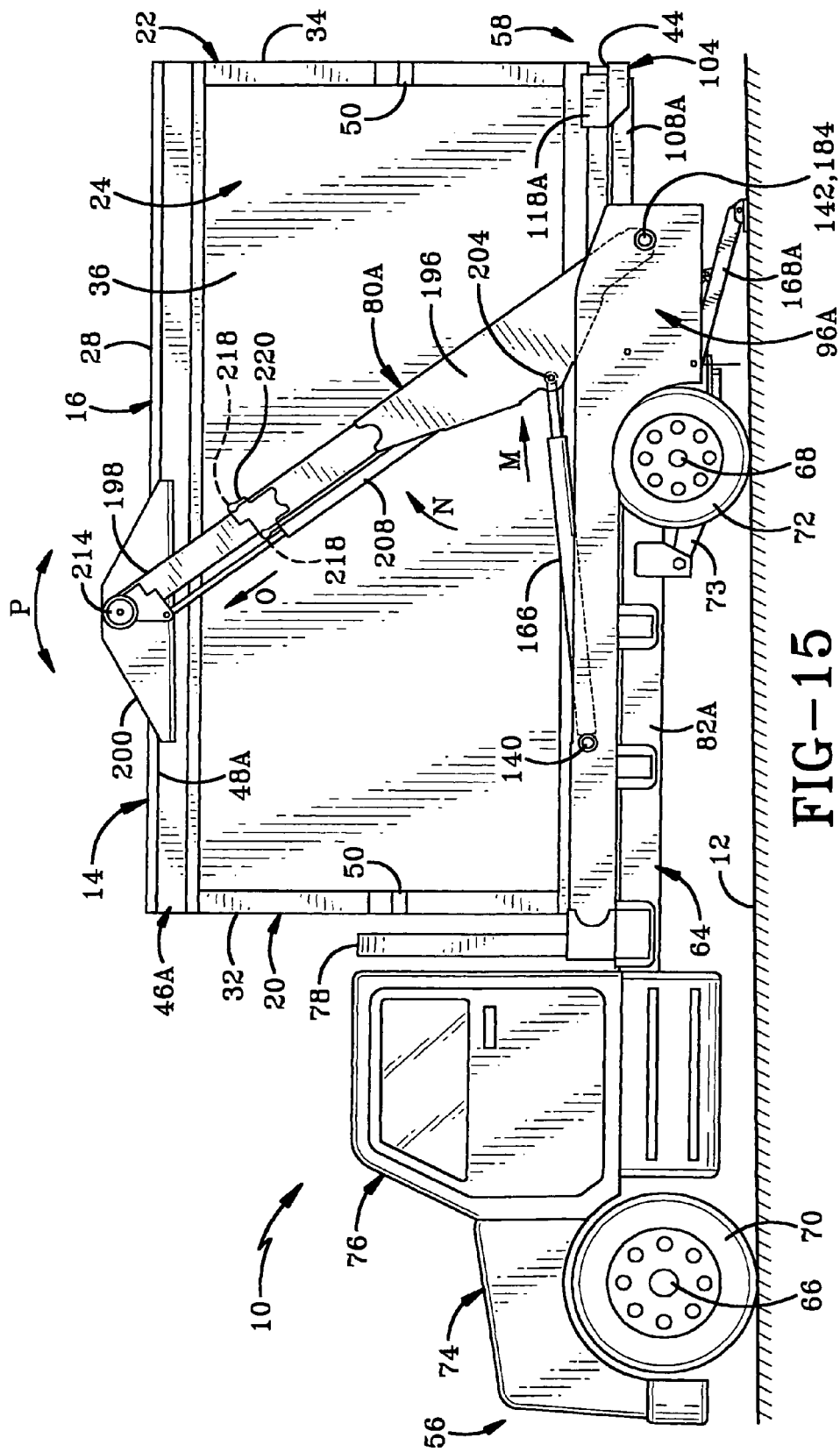
FIG. 15 is side elevational view of the vehicle showing the container lift at an initial stage of operation in its unloading capacity.
Figure 18:
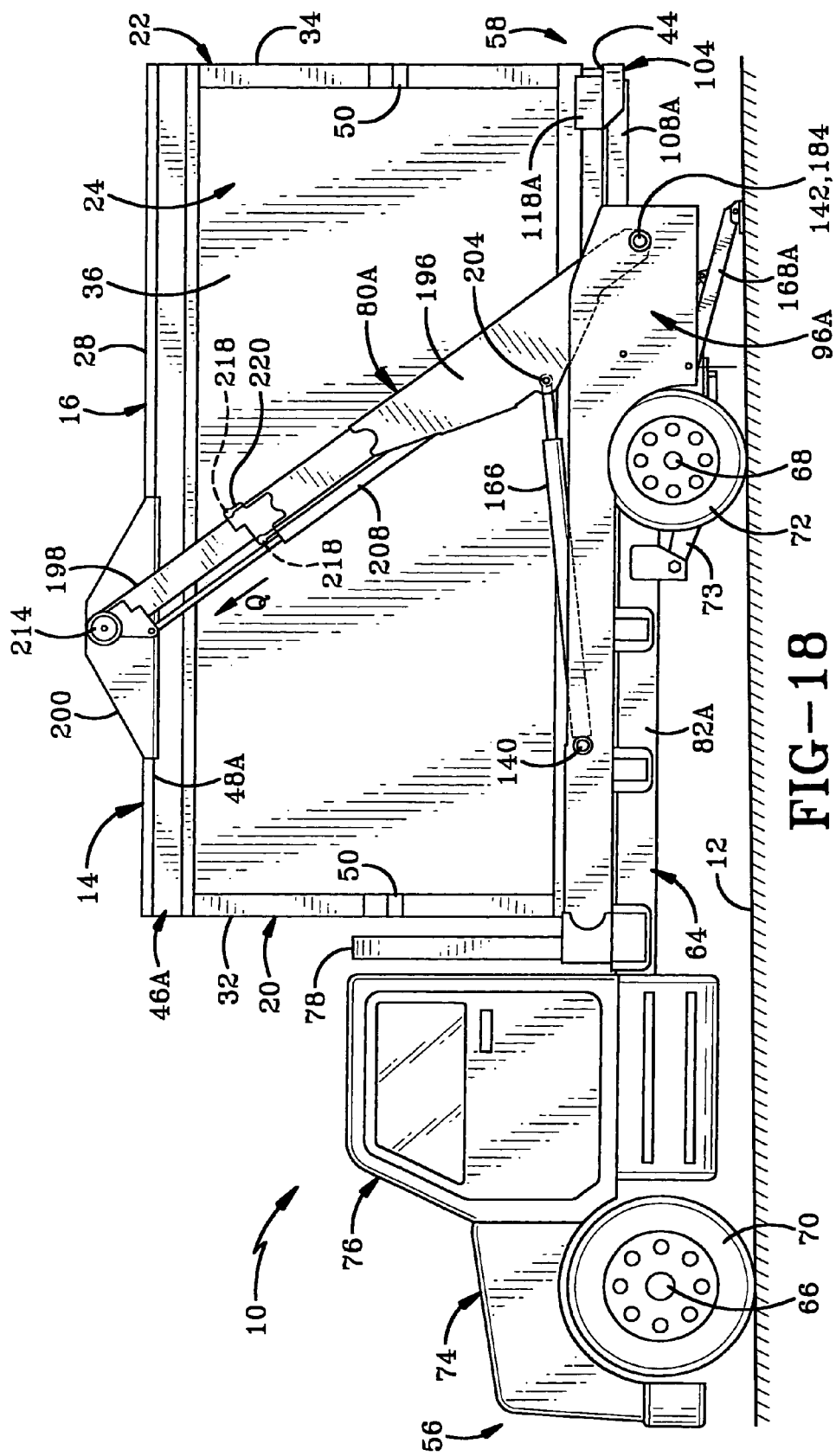
FIG. 18 is similar to FIG. 15 and shows the container lift support hook having moved upwardly into engagement with the container support rail.
Figure 19:
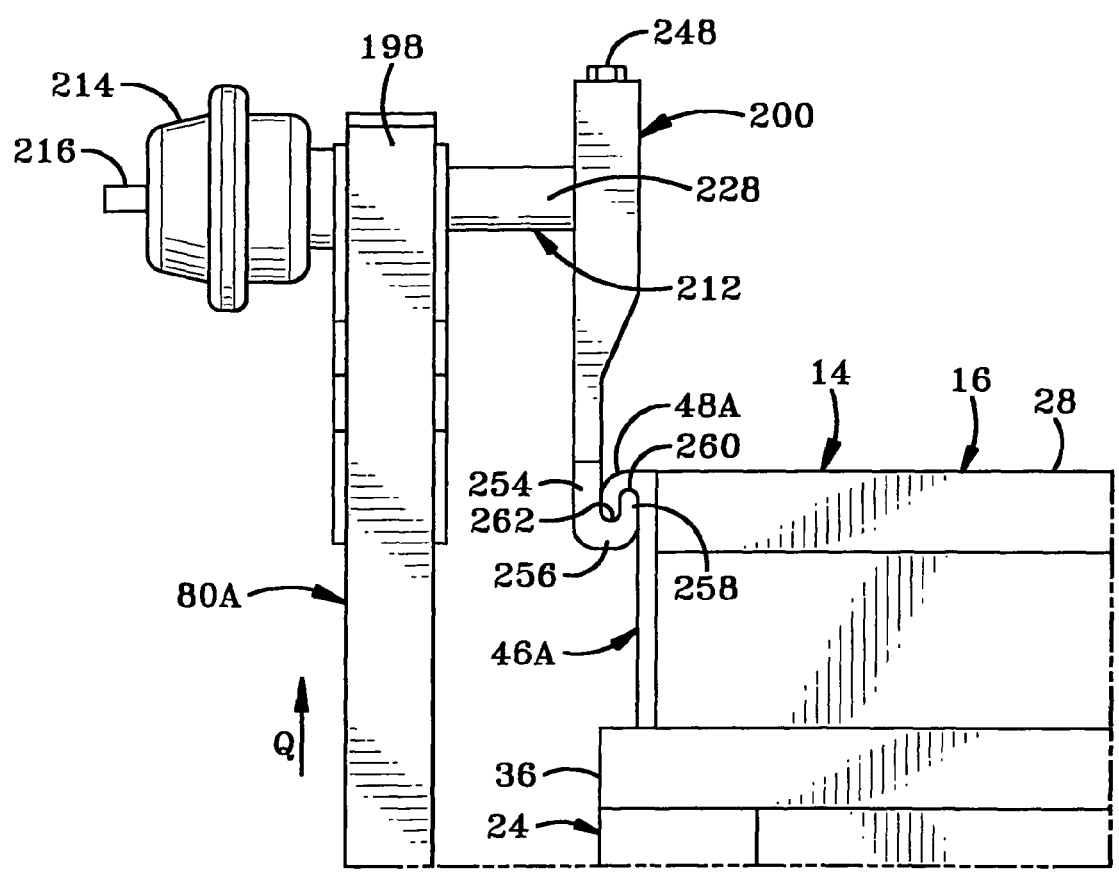
FIG. 19 is similar to FIG. 17 and shows the container lift support hook engaging the container support rail and representing the same stage as FIG. 18.

Once the support platform has been lowered, actuators 170 are operated to extend (arrow K in FIG. 14) to pivot the feet of stabilizers 168 about pivots 144 into contact with ground 12 (arrow L) to provide stability to vehicle 10 during the unloading and loading process. Lifts 80 are then operated as shown in FIG. 15 to move hook members 200 into position adjacent respective rails 46 of container 14. More particularly, actuators 166 are operated to extend (arrow M) to cause the pivotal movement of pivot arms 196 about pivots 142 (arrow N) along with arms 198, hook members 200 and associated structures. In addition, actuators 208 are operated to extend (arrow O) to move telescoping arms 198 linearly with respect to pivot arms 196. During this pivotal and telescoping movement, hook member 200 rotates in a free fashion (arrow P) about the axis passing through post 228 (FIGS. 9, 10) so that the bottom of hook member 200 remains substantially horizontal throughout the movement of lifts 80. FIG. 16 shows hook member 200 from the rear in the same position as that of FIG. 15, wherein inner leg 258 of the hook member 200 is below and axially outward of hook 48A of rail 46A. Actuator 214 may be operated to move hook member 200 axially inwardly (arrow P2 in FIG. 17) so that inner leg 258 is disposed directly below the downwardly opening channel defined by hook 48A and so that channel 262 is directly below hook 48A. FIGS. 18 and 19 show actuators 208 operated to extend (arrow Q) telescoping arms 198 and hook member 200 upwardly so that inner leg 258 is received within the channel of respective rail 46 and hooks 48 are received within channel 262. Alternately or in combination with the extension of arms 198, actuators 166 may be extended to pivot each lift 80 to move hook member 200 upwardly into engagement with rails 46. Hook members 200 provide the sole engagement between lifts 80 and container 14 for supporting container 14 during the loading and unloading operation. The use of hook members 200 to support container 14 only along rails 46 adjacent the top of container 14 thus eliminates the need for or use of cables, chains, straps or other flexible elongated suspension members from which a container might be suspended in certain other lift systems. The use of actuators 214 and other actuators of lifts 80 also allows hook members 200 to engage container rails 46 without the manual maneuvering of hook members 200 or other portions of lifts 80. The present system also eliminates bottom support configurations in which the container is supported with lift members which engage the container on or adjacent its bottom.

Figure 20:
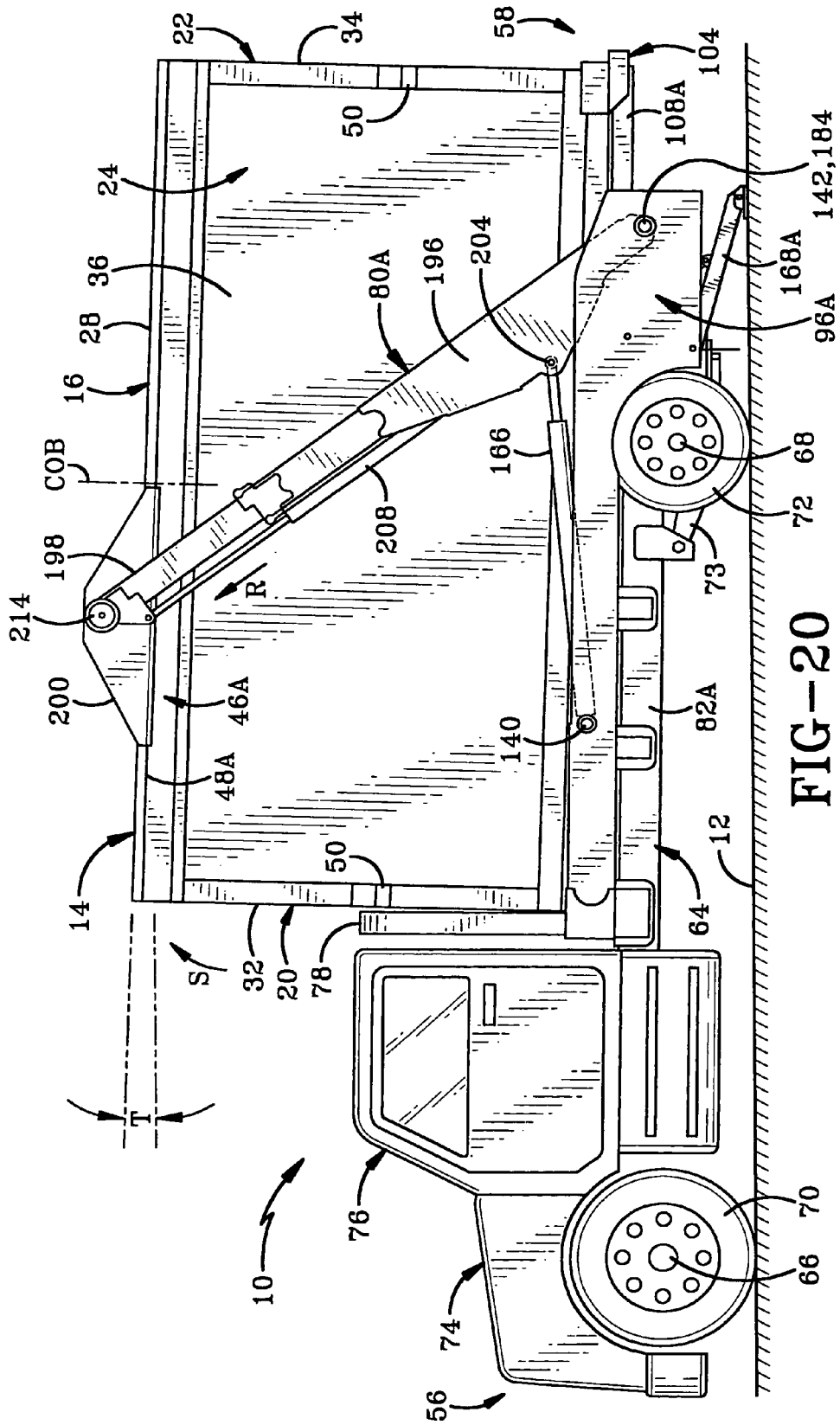
FIG. 20 is similar to FIG. 18 and shows the container lift support hook engaging the container forward of the center of balance and lifting the container in an off balance orientation.
Figure 21:
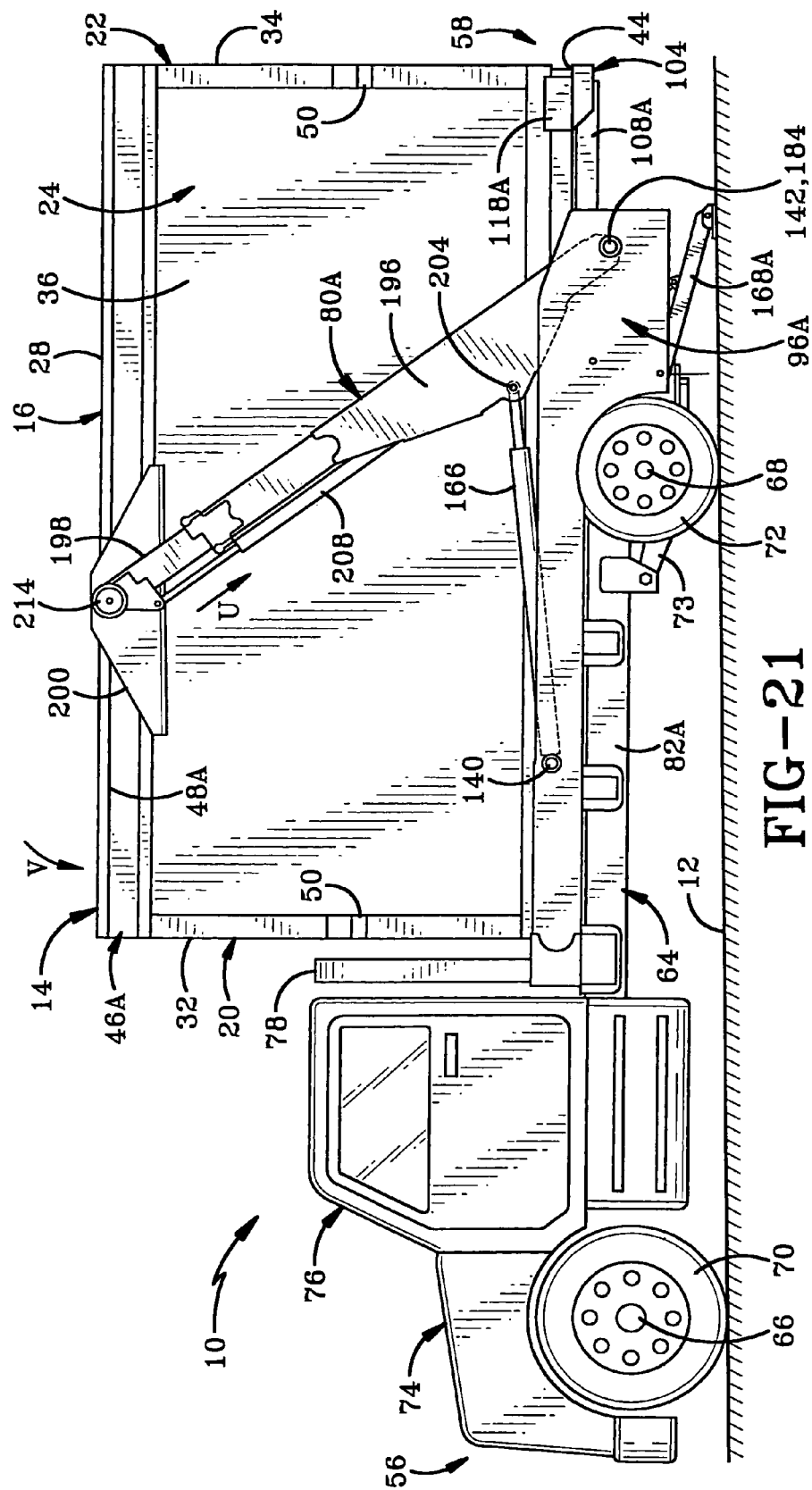
FIG. 21 is similar to FIG. 20 and shows the lift having been lowered to lower the container back onto the support platform of the vehicle.
Figure 22:
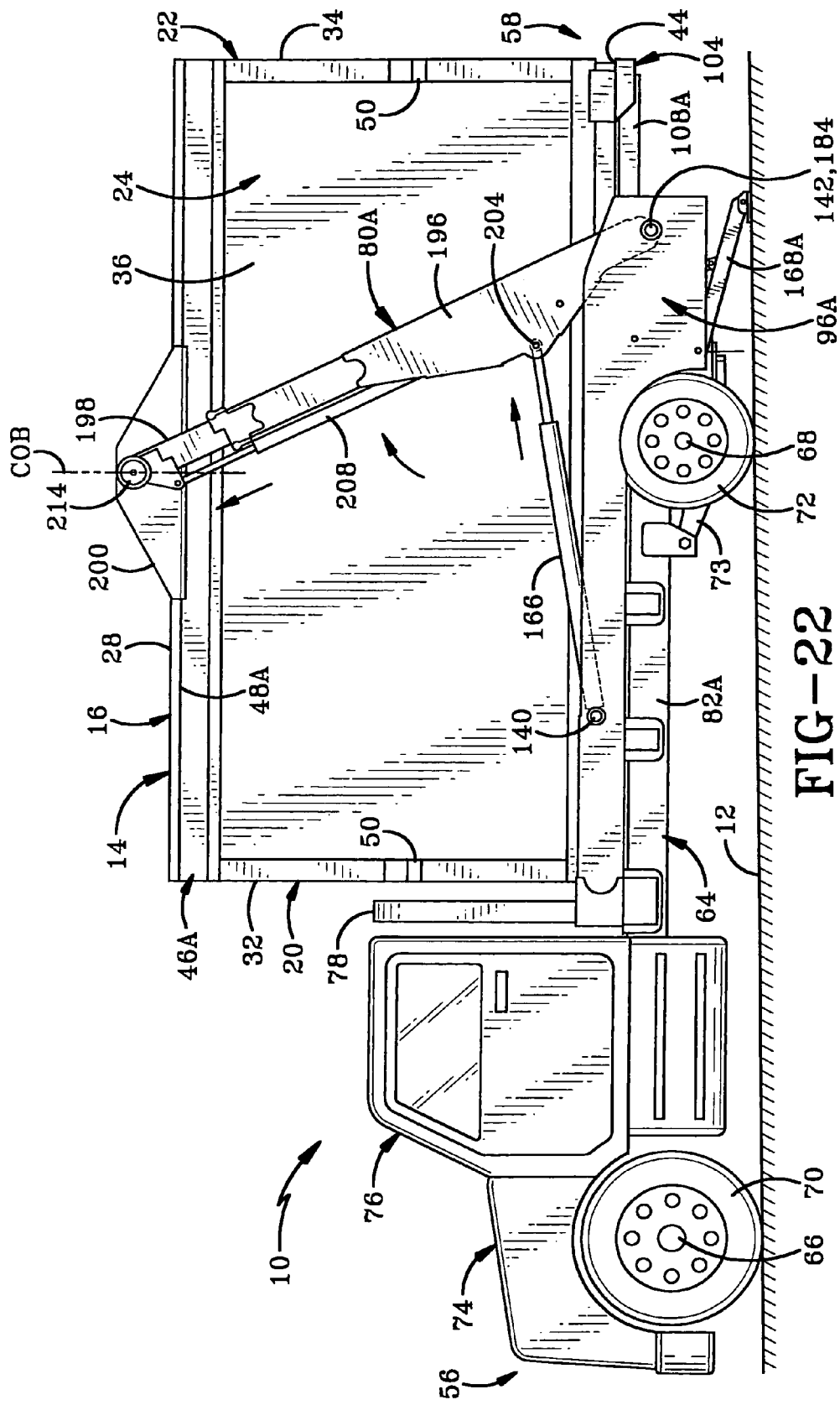
FIG. 22 is similar to FIG. 21 and shows the container lift support hook having been repositioned to a suitable lifting position relative to the center of gravity of the container.
Figure 23:
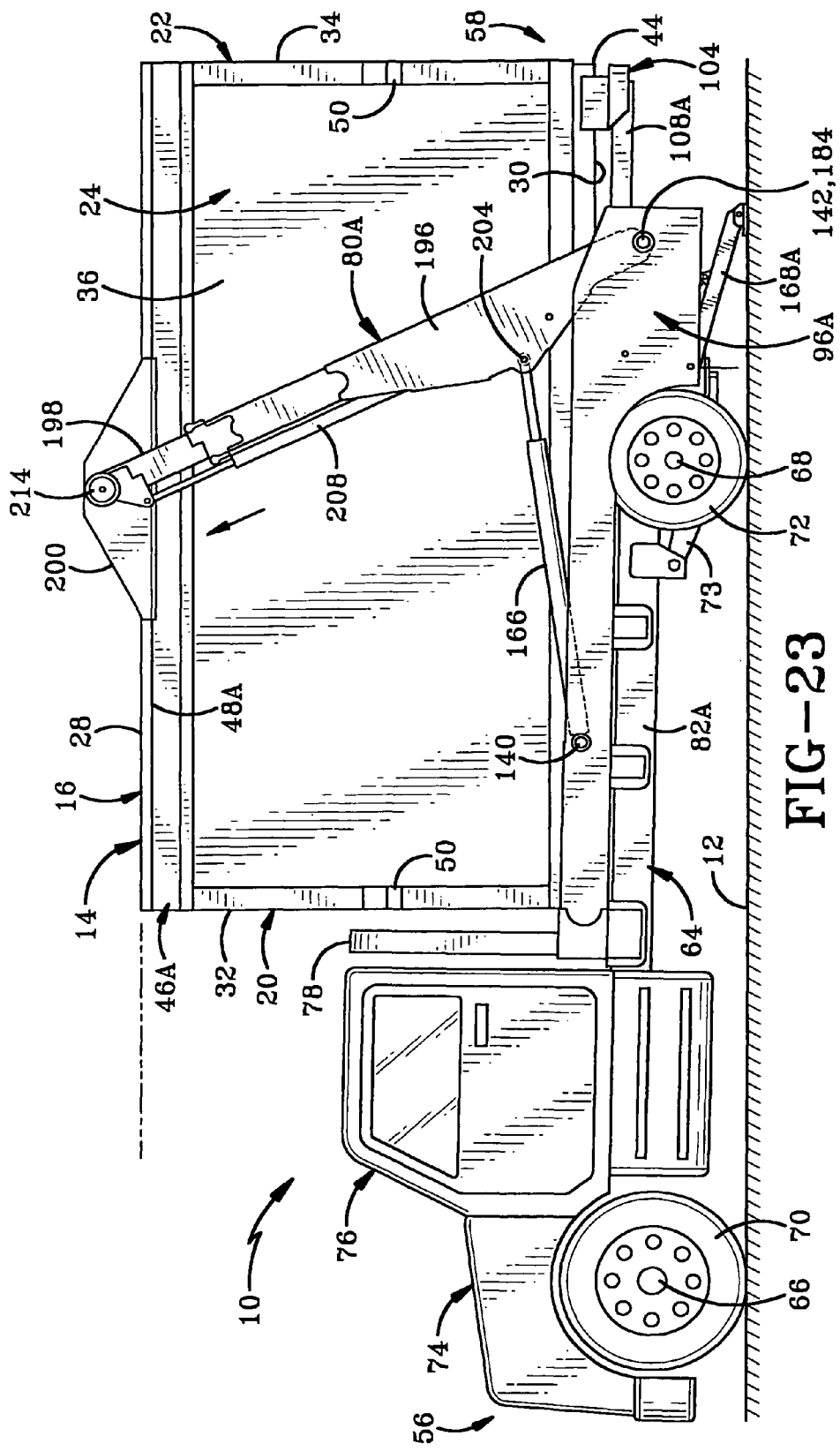
FIG. 23 is similar to FIG. 22 and shows the lift being operated to lift the container in a level orientation.

FIG. 20 illustrates the scenario in which hook members 200 engage rails 46 in an out of balance fashion so that container 14 is not properly balanced when lifted. More particularly, hook members 200 are disposed forward of the longitudinal center of balance COB, as shown in an exaggerated form in FIG. 20. More particularly, when actuators 208 and/or actuator 166 are operated to move hook member 200 upwardly (arrow R) to lift container 14 upwardly from the support platform, container 14 pivots (arrow S) so that the top and bottom of container 14 are angled from the horizontal as represented at angle T. To remedy this imbalance as shown in FIG. 21, lifts 80 may be operated to lower hook member 200 (arrow U) so that container 14 is tilted (arrow V) into a substantially horizontal orientation seated atop the support platform of vehicle 10. As shown in FIG. 22, actuators 166 and 208 are then operated to reposition hook member 200 so that the longitudinal center of hook member 200 is substantially aligned with the center of balance COB whereby the further operations of lifts 80 lifts container 14 in a substantially horizontal orientation as shown in FIG. 23. Hook members 200 may thus be repositioned either forward or rearward of their out-of-balance engagement positions depending on which direction they need to move to engage rails 46 to create a balanced lifting operation to maintain container 14 upright and substantially level throughout unloading and loading.

Figure 25A:
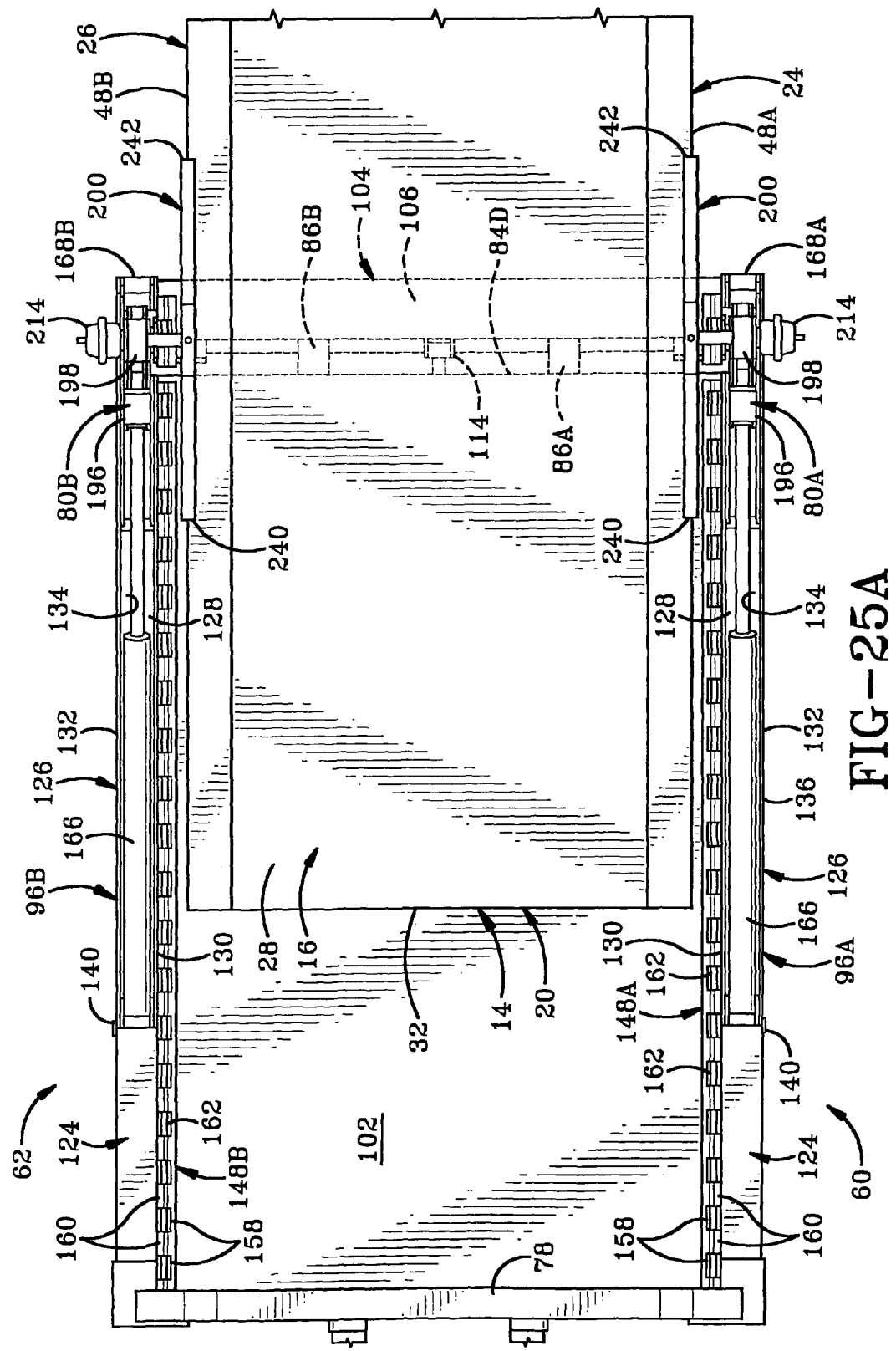
FIG. 25A is a top plan view of the support platform and lifts unloading the container at the same stage as FIG. 25.
Figure 26:
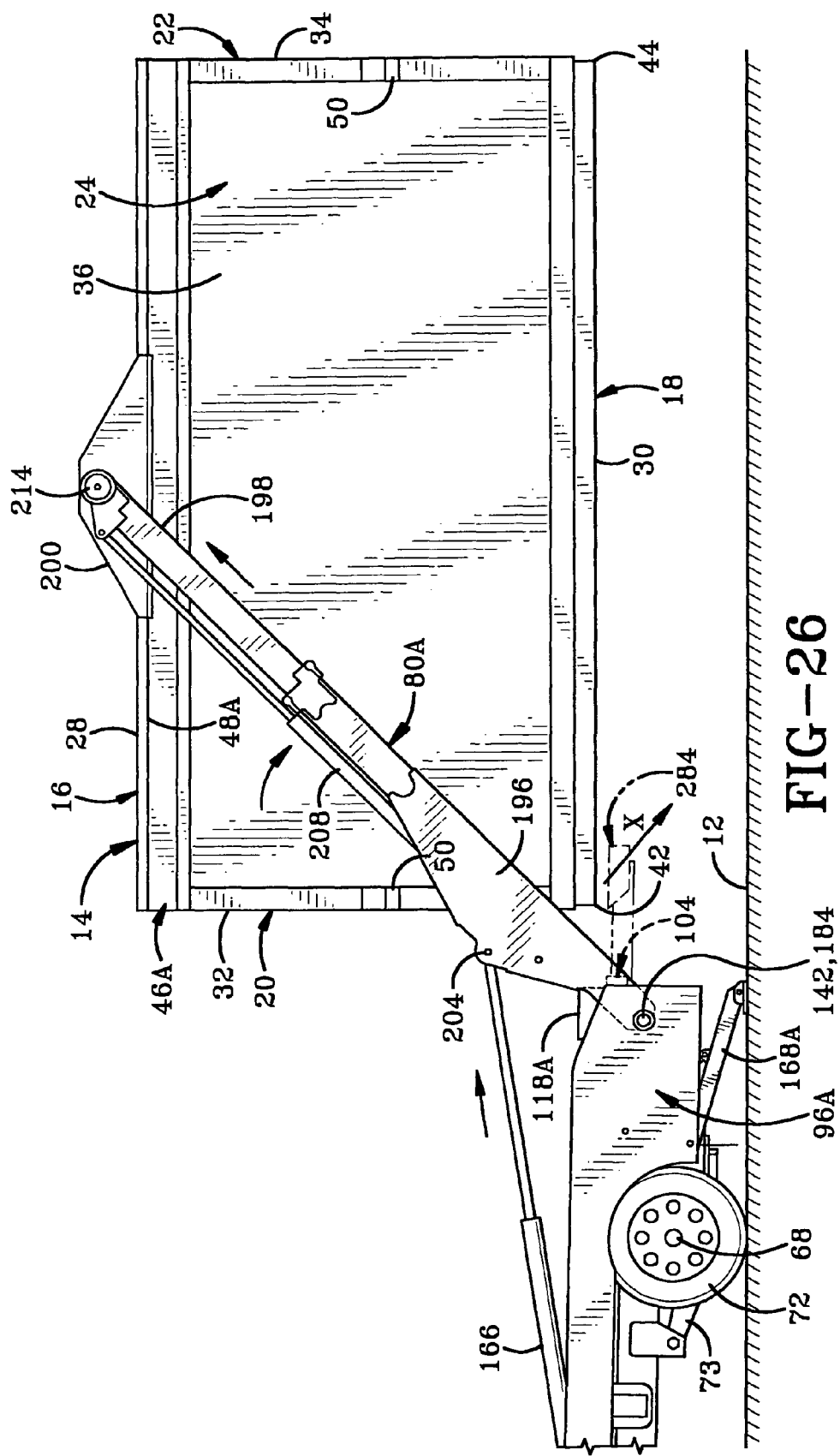
FIG. 26 is similar to FIG. 25 and shows a further stage of unloading in which the container is rearward of the vehicle.

Once container 14 is lifted a short distance out of contact with the support platform of vehicle 10, actuator 110 is retracted to move tail section 104 forward (arrow W in FIG. 24), thus shortening or reducing the length of the container support platform as well as the length of vehicle 10 overall. The movement of tail section 104 from its rearmost home position shown in dashed lines in FIG. 24 to its forward most position shown in solid lines in FIG. 24 opens up a home position space 284 extending from the rear end of tail section 104 in the home position to the rear end of tail section 104 in the forward most position or other non-home position of the tail section 104 which is forward of the home position. As illustrated hereafter, the opening of space 284 facilitates the removal of container 14 to its unloaded position and also opens up a space directly below space 284 in which a front portion of container 14 may be seated on ground 12. With tail section 104 in its forward position, lifts 80 are then operated as shown in FIG. 25 to move container 14 rearwardly in the unloading direction. FIG. 25A shows the unloading operation from above at the same stage as shown in FIG. 25, and illustrates various relationships which are discussed further below. FIG. 26 shows a further stage of moving lifts 80 and container 14 in the unloading direction and shows the lower front corner 42 of container 14 adjacent home position space 284, through which corner 42 and the front lower portion of container 14 move (arrow X) as container 14 is lowered towards ground 12.

FIG. 27 shows lifts 80 pivoted further rearwardly so that container 14 is placed on ground 12 in an unloaded position with hook members 200 having moved downwardly to a position in which they are no longer supporting container 14. The position of hook member 200 at this stage is shown in FIG. 28, wherein the downward movement of hook member 200 has removed inner leg 258 from within the channel of rail 46A to a position directly there below, and channel 262 is moved downwardly to a position directly below hook 48A, which has been removed from channel 262. FIG. 29 further shows actuator 214 retracting to move member 200 axially outwardly so that the lower end of hook member 200 is spaced axially outwardly from the side of container 14. This allows lifts 80 to pivot forward without re-engaging hooks 48 of container 14 back to the home position shown in FIG. 30, in which pivot arm 196 is pivoted fully forward and telescoping arm 198 is fully retracted. FIG. 30 also shows that stabilizers 168 have pivoted back to their raised position (arrow Y) via the retraction of actuators 170 (FIG. 14) and that air springs 190 have been inflated to pivot the container support platform about axle 66, thus raising the rear end of the support platform and chassis 64 upwardly (arrow Z) relative to ground 12, axle 68, wheels 72, pivot arm 73 and associated structure.

The movement of lifts 80 during operation and associated relationships are now provided in further detail with reference to the various figures showing the unloading process as described. As shown in FIG. 12, each hook member in the home position of lift 80 is spaced upwardly from the support platform and side rails 96 and also substantially below the top of container 14, a short distance above the midway point between the top and bottom of container 14. In this home position, the bottom of hook member 200 is at about the same height as the top of cab 76 and is out of contact with container 14. In the home position, pivot arms 196, telescoping arms 198 and actuators 208 angle upwardly and forward from pivots 142 at an angle of about 45° relative to horizontal. In the home position, hook member 200, actuator 214, telescoping arm 198, actuator 208 and actuator 166 are in their entirety forward of pivot 142, while substantially all of each pivot arm 196 is also forward of pivot 142. Likewise, pivots 204 and 206 (FIG. 6) and pivot 210 are also forward of pivot 142 in the home position. As actuators 166 are operated to extend so that hook members 200 engage rails 46 of container 14 (FIG. 22) and lift container 14 upwardly and rearwardly so that pivot arms 196 are substantially vertical (FIG. 25), various components including each hook member 200, actuator 214, telescoping arm 198, the free end of pivot arm 196, actuator 208 and pivots 204, 206 and 210 all move upwardly and rearwardly in a pivoting fashion. As lifts 80 move container 14 rearward of vehicle 10 (FIG. 26) and to its unloaded position (FIG. 27), these various components all move to a position entirely rearward of pivots 142, with the minor exception of pivot arm 196, substantially all of which is rearward of pivots 142 in the unloaded position. FIGS. 26 and 27 further show that a portion of the piston of actuator 166 extends reward of pivots 142. As illustrated in FIG. 27, pivot arms 196, telescoping arms 198 and actuators 208 in the unloaded position angle upwardly and rearwardly from pivots 142 at an angle relative to horizontal which may be 45° or less.

Various relationships and movement related to lifts 80 and container 14 are now described with reference to FIG. 25A. The movement of each pivot arm 196 and the corresponding telescoping arm 198 occurs within a common longitudinal vertical plane which is parallel to the sides of vehicle 10, container 14 and guide walls 148, for example. Although hook members 200 are able to move axially via the operation of pneumatic actuators 214 and may limit other movement, they also travel during the unloading movement in a longitudinal vertical plane parallel to the plane discussed above. Lifts 80A and 80B during the pivotal movement of pivot arm 196 thus travel along parallel longitudinal vertical planes so that the axial dimension of the lift assembly during this pivotal movement is constant and in the exemplary embodiment is no more than 8.5 feet. As shown in FIG. 25A, hook members 200 during loading and unloading are disposed directly above the opposed sides of the container support platform, including floor 102 and cross bar 106 of tail section 104. Thus, as viewed from above, most of floor 102 and tail section 104 are disposed between hook members 200, and all of floor 102 and tail section 104 are disposed between pivot arms 196 and between telescoping arms 198 during the movement of hook members 200 between the loading and unloading positions. In addition, cross bar 106 in its forward position is disposed directly between the lower portions of pivot arms 196 during the movement of pivot arms between the loading and unloading positions. Crossbar 106 extends axially in either direction no further than the inner wall 130 of the respective side rail 46, and thus axially no further than the respective pivot arm 196, telescoping arm 198, stabilizer 168 and actuators 166, 170 and 208. Container 14 during the unloading operation thus is lifted from a loaded position atop the support platform in which 75% or more of container 14 is seated on floor 102 forward of tail section 104, and moves directly over tail section 104 to the unloaded position in which container 14 is disposed entirely rearwardly of tail section 104.

Figure 33:
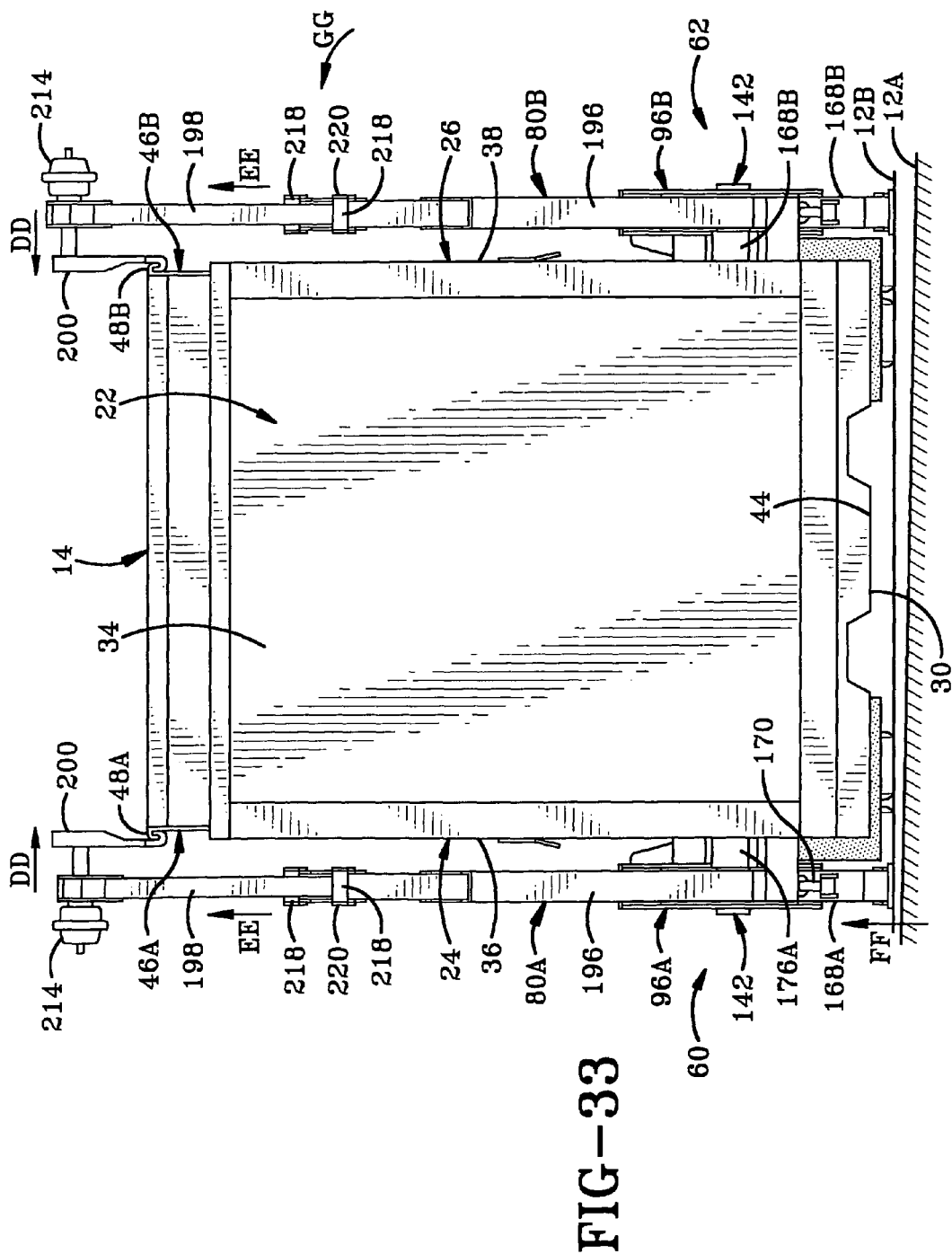
FIG. 33 is similar to FIG. 32 and shows the support hooks having moved into engaging with the container support rails to lift the container, and the left stabilizer having been raised to re-level the vehicle.

The loading operation of vehicle 10 is now described with reference FIG. 31-39. FIG. 31 shows container 14 from the rear seated on ground 12 behind vehicle 10 with vehicle 10 in a position similar to that shown in FIG. 27 except that hook members 200 are generally axially outward of rails 46. FIG. 31 more particularly shows that container 14 is seated on a portion 12A of the ground which is inclined relative to a portion 12B of the ground upon which the wheels of vehicle 10 are seated. Thus, container 14 is tilted to its right side relative to horizontal as represented by angle AA and also relative to vehicle 10. Rail 46B of container 14 is thus positioned closer to hook member 200 of lift 80B than is rail 46A relative to hook member 200 of lift 80A. This may cause difficulty in properly attaching hook members 200 to rails 46A and 46B. For example, it may be that the inward axial movement of hook member 200 of lift 80A via operation of actuator 214 may be insufficient to overcome the distance between hook member 200 and rail 46A so that hook member 200 can properly engage hook 48A to lift container 14. In order to properly align hook member 200 for engagement with rails 46, left actuator 170, serving as a tilting actuator, is then further extended to further lower the foot of left stabilizer 168A (arrow BB in FIG. 32), which thus raises the left side of vehicle 10 (including left side rail 96A, the left side of the container support platform and left lift 80A) relative to its right side to tilt vehicle 10 to the right (arrow CC) so that the upper end of lift 80A moves closer to rail 46A and the upper end of lift 80B moves away from rail 46B until they are substantially equally spaced from rails 46A and 46B and each lift 80 is substantially parallel to left and right sidewalls 36 and 38 of container 14. Then, as shown in FIG. 33, actuators 214 are operated to move hook member 200 axially inwardly (arrows DD) into engagement with rails 46A and 46B, lifts 80 are operated to move hook member 200 upwardly as indicated at arrows EE, and left actuator 170 is retracted to raise stabilizer 168A as indicated at arrow FF in order to return the frame of vehicle 10 to a substantially horizontal orientation whereby container 14 hangs from hook member 200 in a substantially horizontal orientation.

Figure 34:
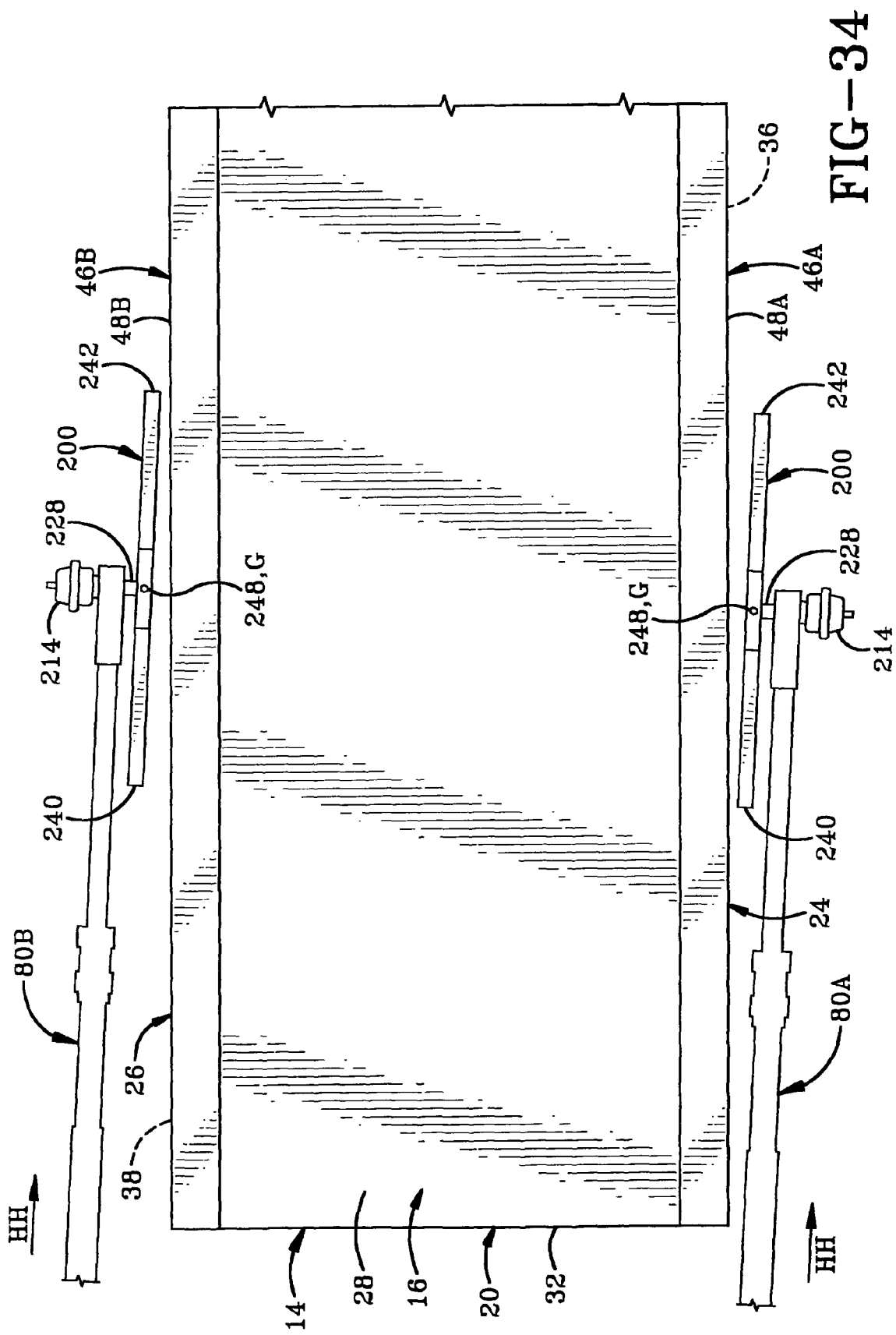
FIG. 34 is a to plan view of a portion of the container and the container lift support hooks representing a condition in which the vehicle is backed up to the container at an angle to the container which is not quite parallel to its container support rails.
Figure 35:
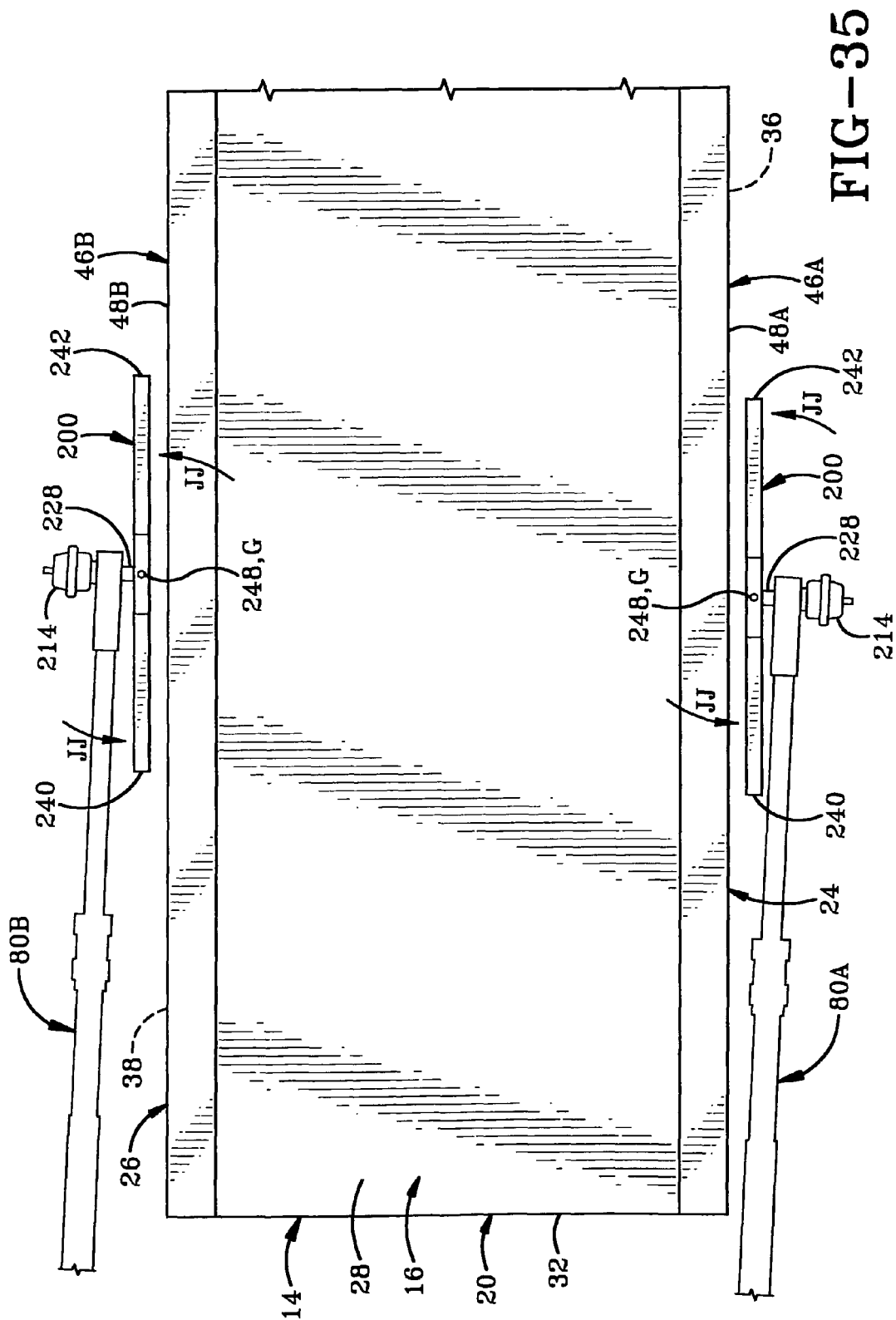
FIG. 35 is similar to FIG. 34 and shows the container lift support hooks pivoting into a parallel orientation with the support rails of the container.
Figure 36:
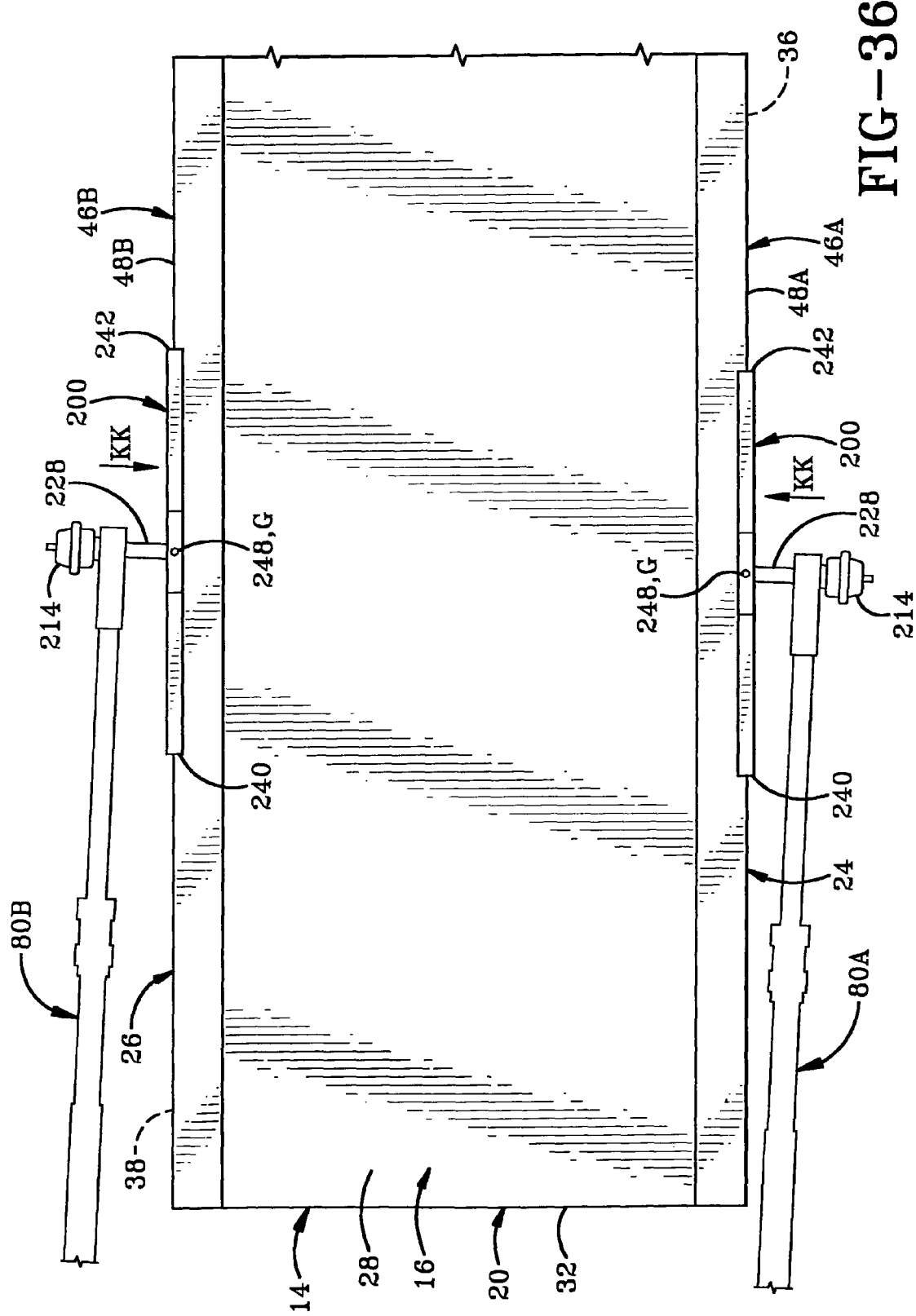
FIG. 36 is similar to FIG. 35 and shows the container lift support hooks having moved inwardly into engagement with the container support rails.
Figure 37:
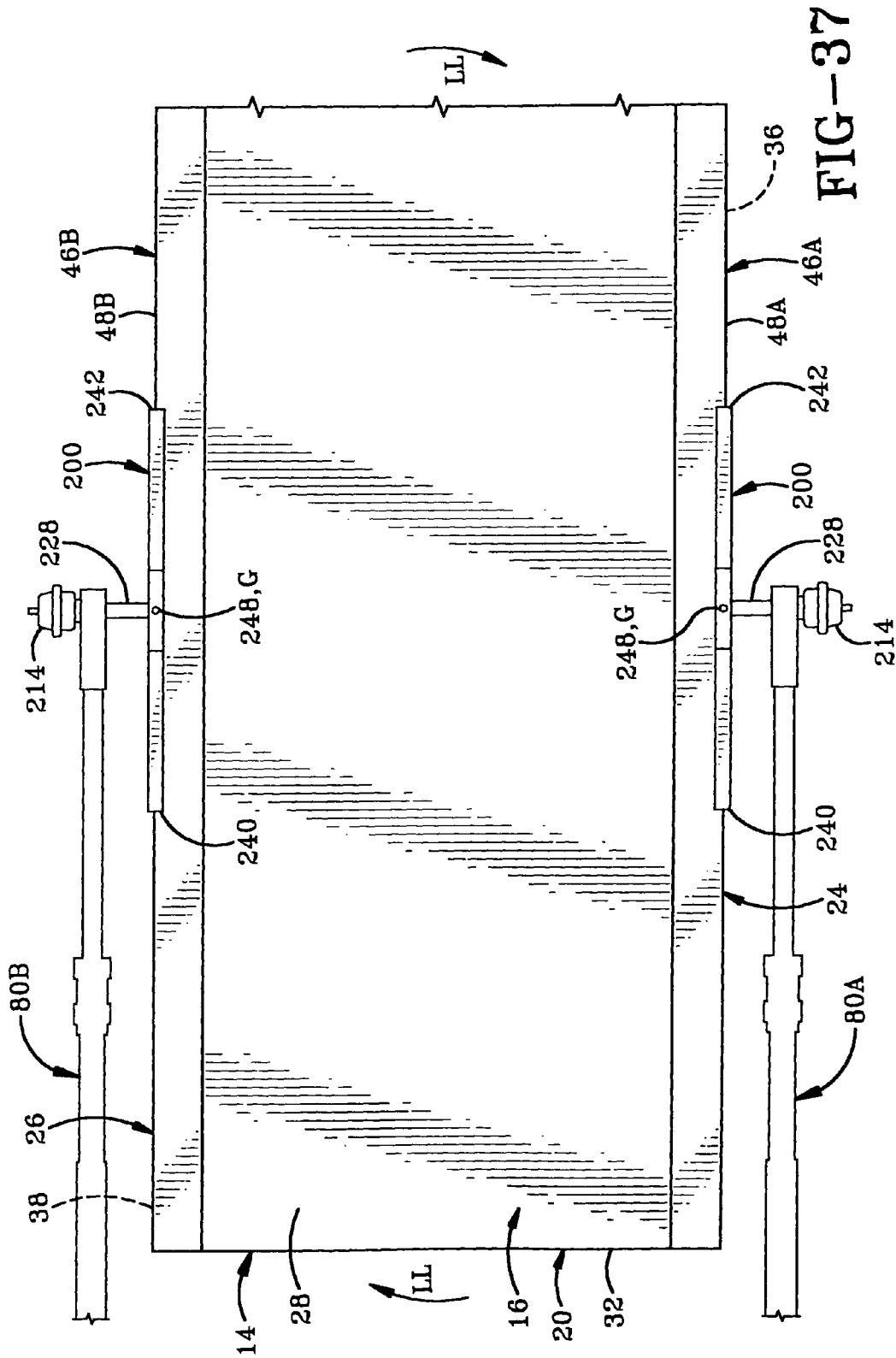
FIG. 37 is similar to FIG. 36 and shows the container having rotated to a position where the pivot arms are substantially parallel to the sidewall of the container.

Another alignment feature which may be used during the picking up of container 14 is described now with reference to FIGS. 34-37. FIG. 34 represents a scenario in which vehicle has backed up (arrow HH) to a container 14 so that vehicle 10 and lifts 80A and 80B are not quite parallel to sidewalls 36 and 38 of container 14. Thus, the hook member 200 of lift 80A is positioned with its front end 240 closer to sidewall 36 than is its rear end 242 while hook member 200 of lift 80B is positioned with its rear end 242 closer to sidewall 38 than is its front end 240. In order to properly align hook members 200 with sidewalls 36 and 38 and rails 46A and 46B, hook members 200 are rotated (arrows JJ in FIG. 35) about vertical axis G passing through pivots 248 so that the front and rear ends 240 and 242 of each hook member is a substantially equal distance from the respective sidewall and rail of container 14, whereby hook member 200 is substantially parallel thereto. The rotation of hook member 200 about axis G may be done by hand. Alternately, this rotation may occur automatically when actuators 214 are operated to move hook member 200 axially inwardly, as shown in arrows KK in FIG. 36. In the latter case, the inward movement of hook member 200 of lift 80A would cause its front end 240 to engage rail 46A to cause the rotation about the corresponding axis G. Likewise, the inward movement of hook member 200 of lift 80B would cause its rear end 242 to engage rail 46B to cause the rotation and corresponding alignment of hook member 200 with the support rail of container 14. FIG. 37 further shows that container 14 once lifted may be rotated (arrows LL) via rotation of hook member 200 about axis G so that sidewalls 36 and 38 are substantially parallel to lifts 80. However, this rotation is not necessary as long as container 14 will not detrimentally engage lifts 80 during the loading process such that the loading would not be possible.

Figure 38:
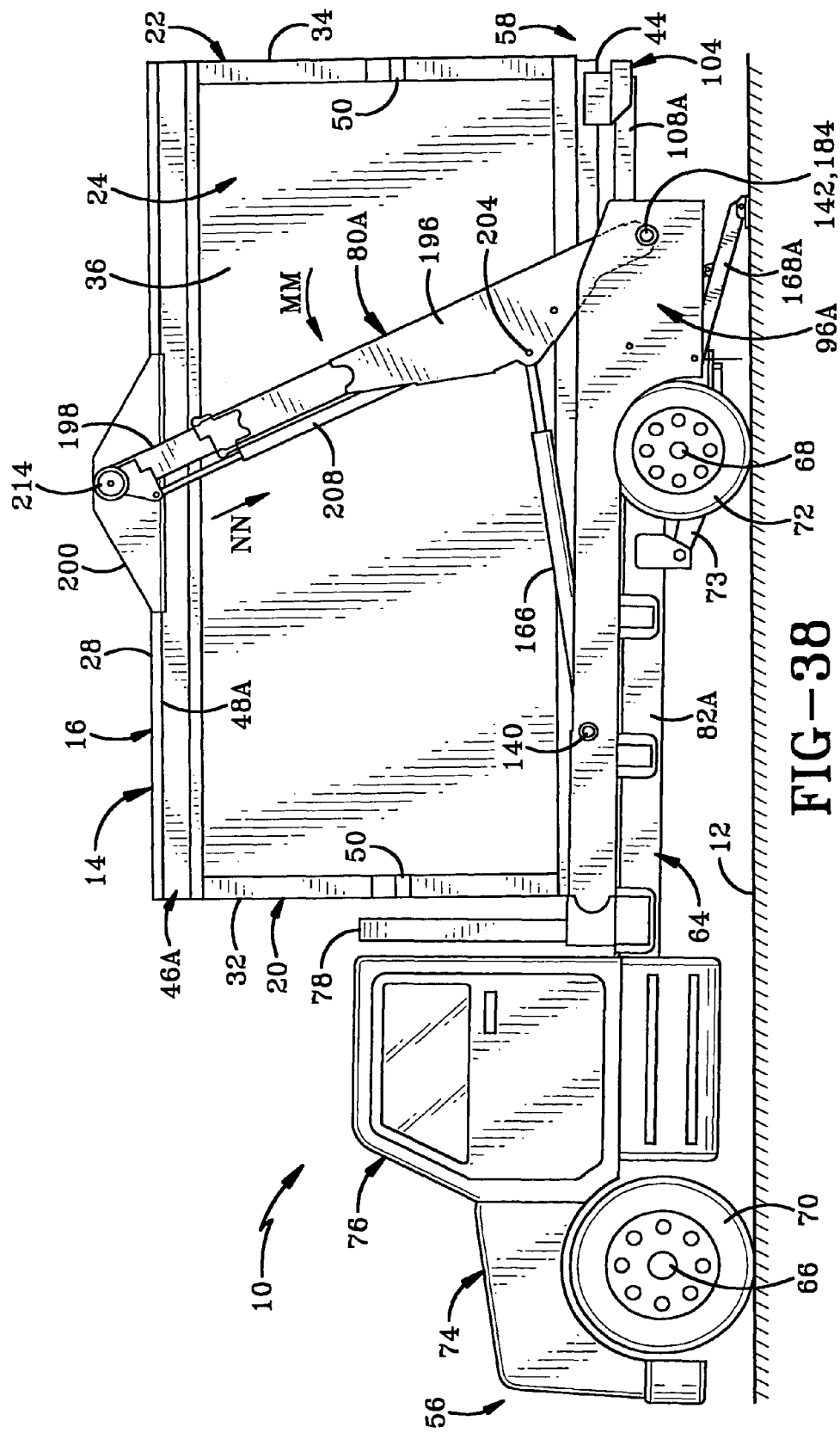
FIG. 38 is a side elevational view of the vehicle showing the container lift being operated in the loading mode to lift the trailer onto the support platform of the vehicle.
Figure 39A:
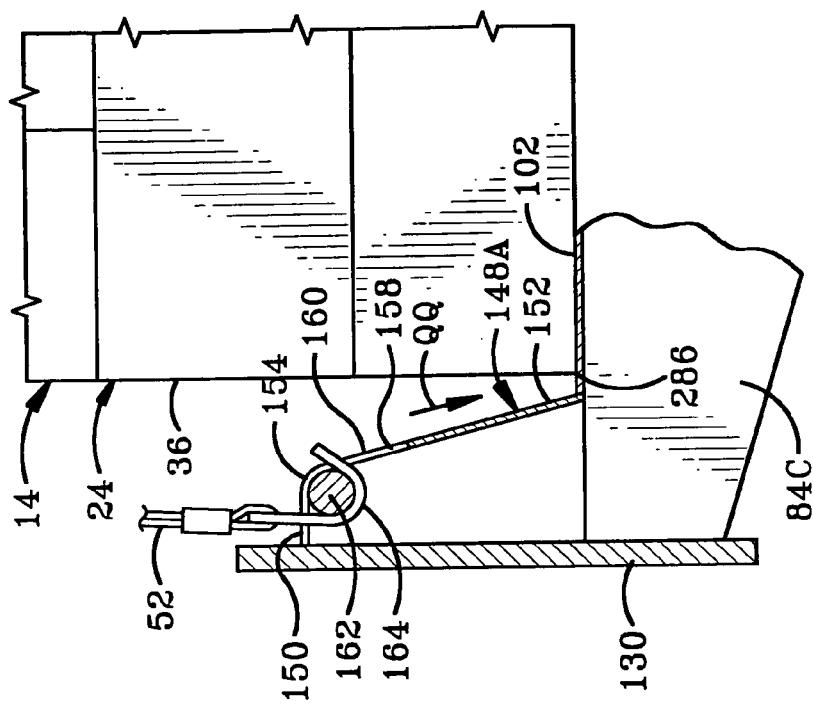
FIG. 39A is similar to FIG. 39 and shows the left lower corner of the container having slid down the guide wall into position atop of the support platform, and the tie down strap connected to the tie down bar.
Figure 39:
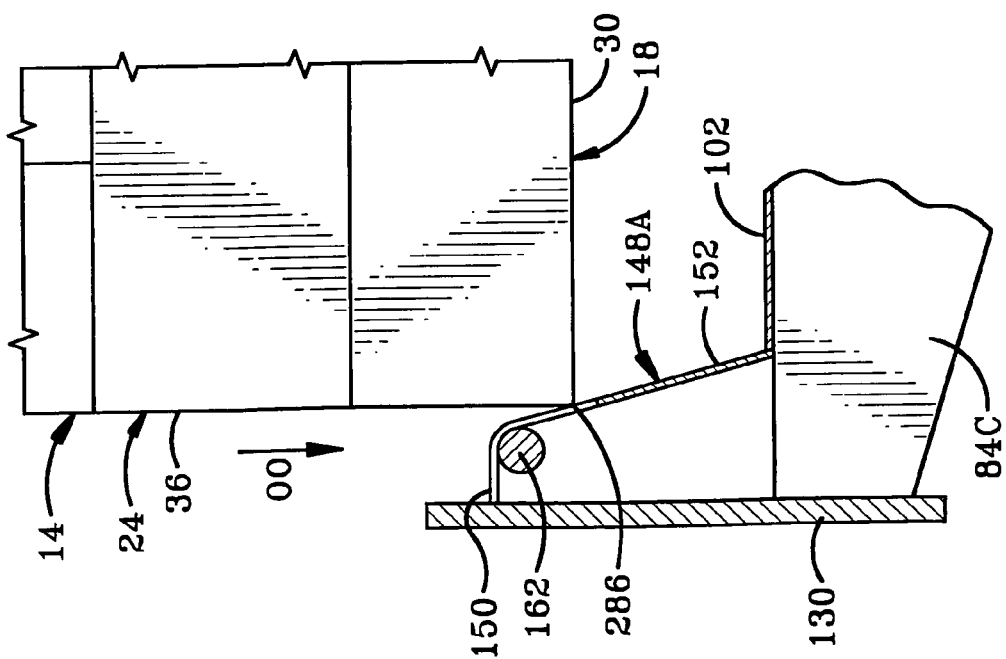
FIG. 39 is an enlarged view showing the left tapered guide wall and tie down bar in section with the left lower corner of the container moving downwardly and engaging the guide wall.

FIGS. 38-39A illustrate another feature of the invention which facilitates loading container 14 onto the support platform of vehicle 10 when the container is not axially aligned to move vertically downwardly onto floor 102 and crossbar 106 of tail section 104. FIG. 38 shows lifts 80 having been operated in the loading direction to position container 14 above the container support platform a short distance. More particularly, each of actuators 166 and 208 has been retracted to respectively pivotally move each container lift 80 forward (arrow MM) and to retract telescoping arm 196 and lower hook member 200 (arrow NN). FIG. 39 shows the lower left portion of container 14 and indicates that container 14 is being lowered vertically downwardly as indicated at arrow OO by lifts 80. More particularly, the bottom of sidewall 36 and the left side of bottom wall 30 of container 14 intersect to form a lower left corner 286 of container 14 which is shown in FIG. 39 as initially engaging tapered sidewall 152 of guide wall 148A. As shown in FIG. 39A, the continued lowering of container 14 causes all or a portion of corner 286 to slidably engage wall 152 so that the engaging portion is forced to slide downwardly and axially inwardly along wall 152 until the bottom of container 14 is seated atop floor 102 of the support platform. Thus, tapered guide walls 148 provide an alignment mechanism which is able to guide container 14 when it is not properly aligned with the support platform into a position which is aligned with the support platform. This alignment occurs automatically as lifts 80 lower container 14 onto the support platform. Once container 14 is seated on the support platform, a hook 164 of one of tie down straps 52 is hooked onto one of the segments of tie down bar 162 so that strap 52 may be tightened to tie container 14 down to the support platform of vehicle 10 in preparation for transporting container 14.

FIGS. 40-44 illustrate the ability of vehicle 10 to load and unload multiple containers. FIG. 40 shows a medium size container 288 and a smaller container 290 each of which is smaller than container 14. Thus, container 288 has a length L2 which is substantially shorter than length L1 (FIG. 1) of container 14, and container 290 has a length L3 which is substantially shorter than length L2. In the exemplary embodiment, length L2 is about 10.5 feet and usually from 10 to 11 feet and thus about ⅔ that of length L1. Typically, length L3 is about 5 feet and usually from 4.5 to 5.5 feet, and thus about ⅓ of length L1 and about ½ of length L2. Other than the difference in length and the corresponding shorter side walls, top walls and bottom walls, containers 288 and 290 are very similar to container 14. Containers 288 and 290 have the same height as container 14 and also the same width W1 (FIG. 2) of container 14. The rear walls of containers 288 and 290 also include a door which is typically in the rollup style door previously noted with respect to container 14. Container 288 has a pair of support rails 292 on either side which extend from the front to the back of container 288 and are the same as rails 46 of container 14 other than the shorter length. Likewise, container 290 has a pair of support rails 294 on either side which extend from its front to its rear and are identical to rails 46 and 292 except for their shorter length.

Figure 41:
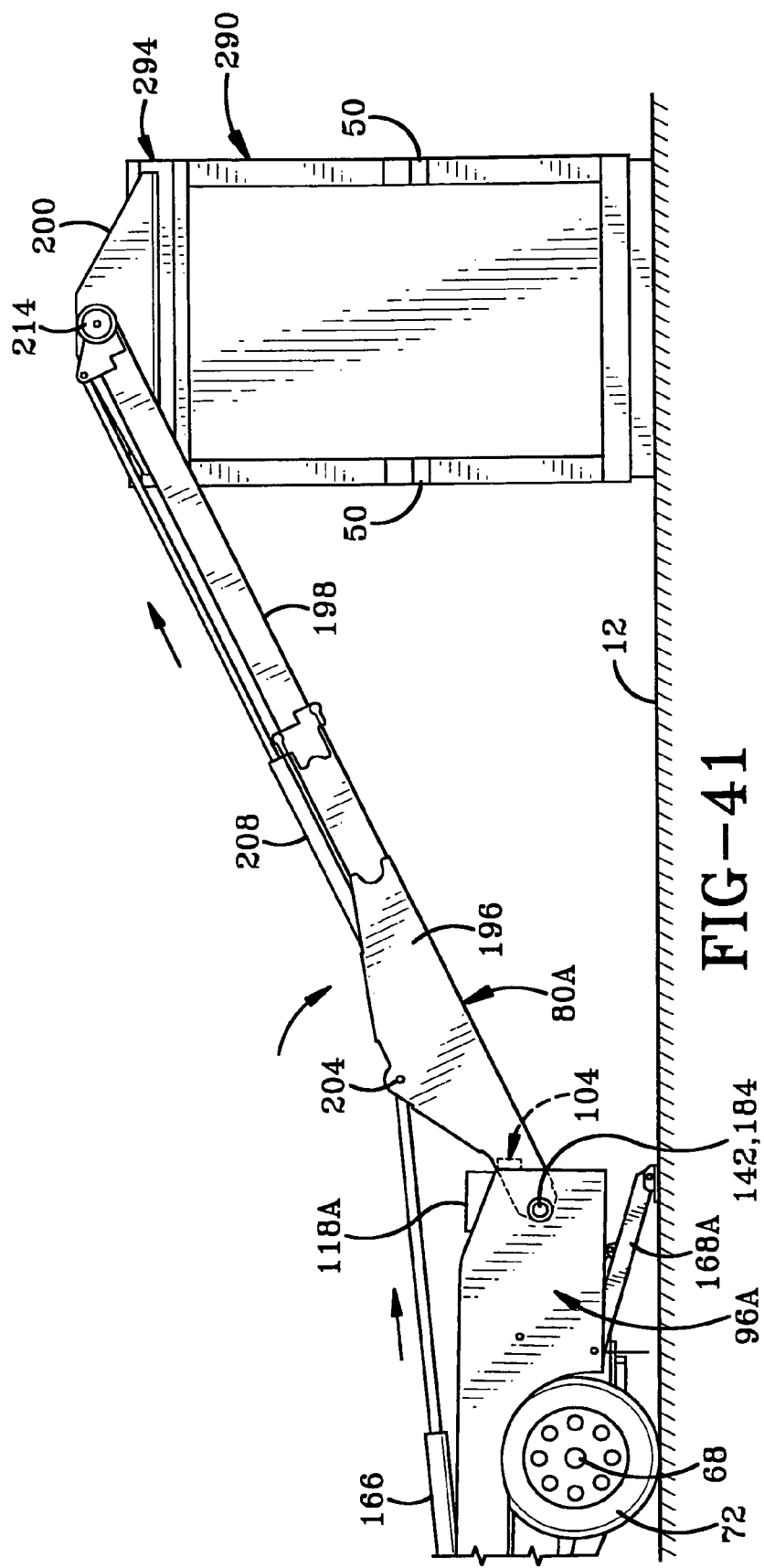
FIG. 41 is a side elevational view showing the smaller of the containers having been removed to a first unloaded position.
Figure 42:
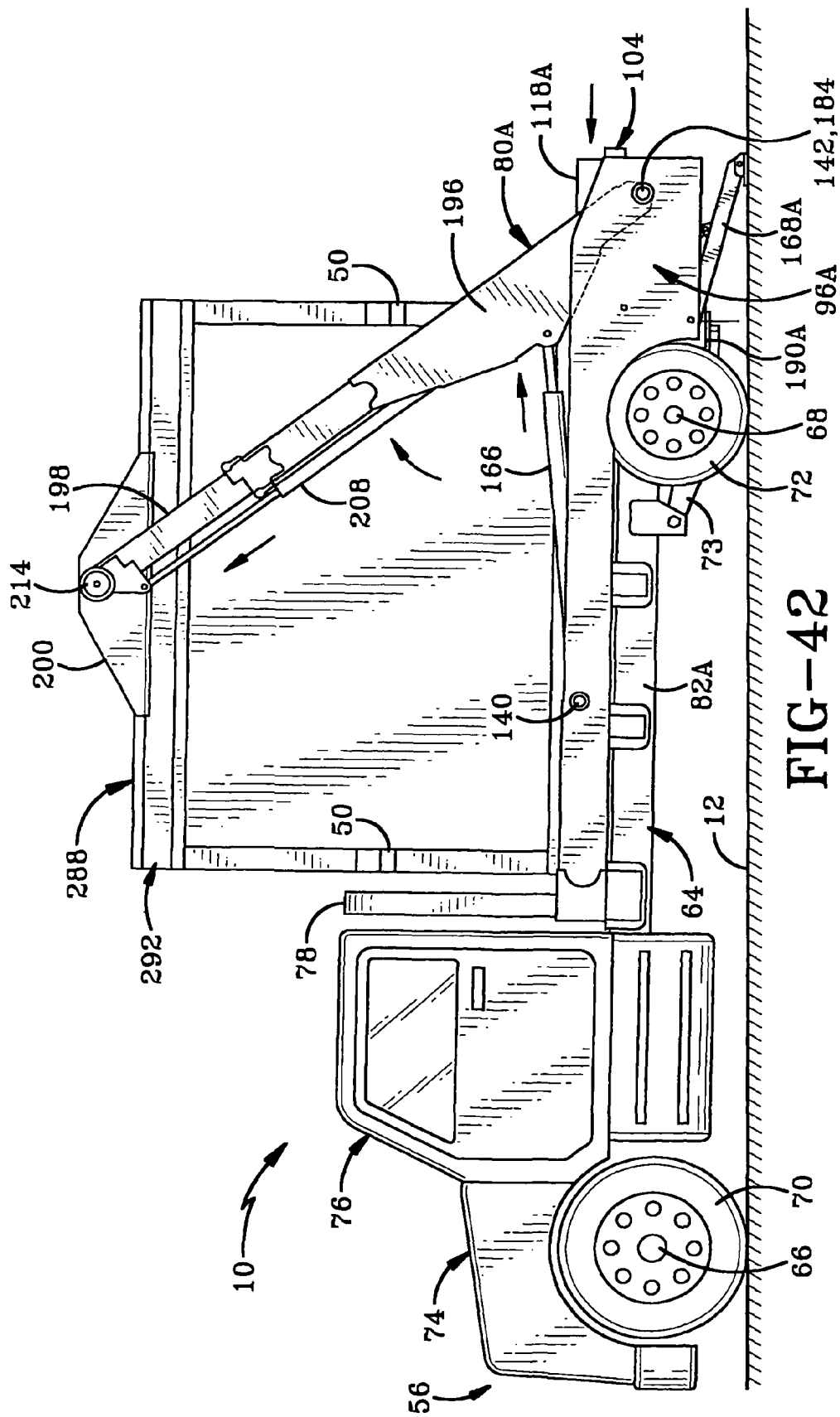
FIG. 42 is a side elevational view of the vehicle with the lift prior to lifting the second container from the vehicle.
Figure 43:
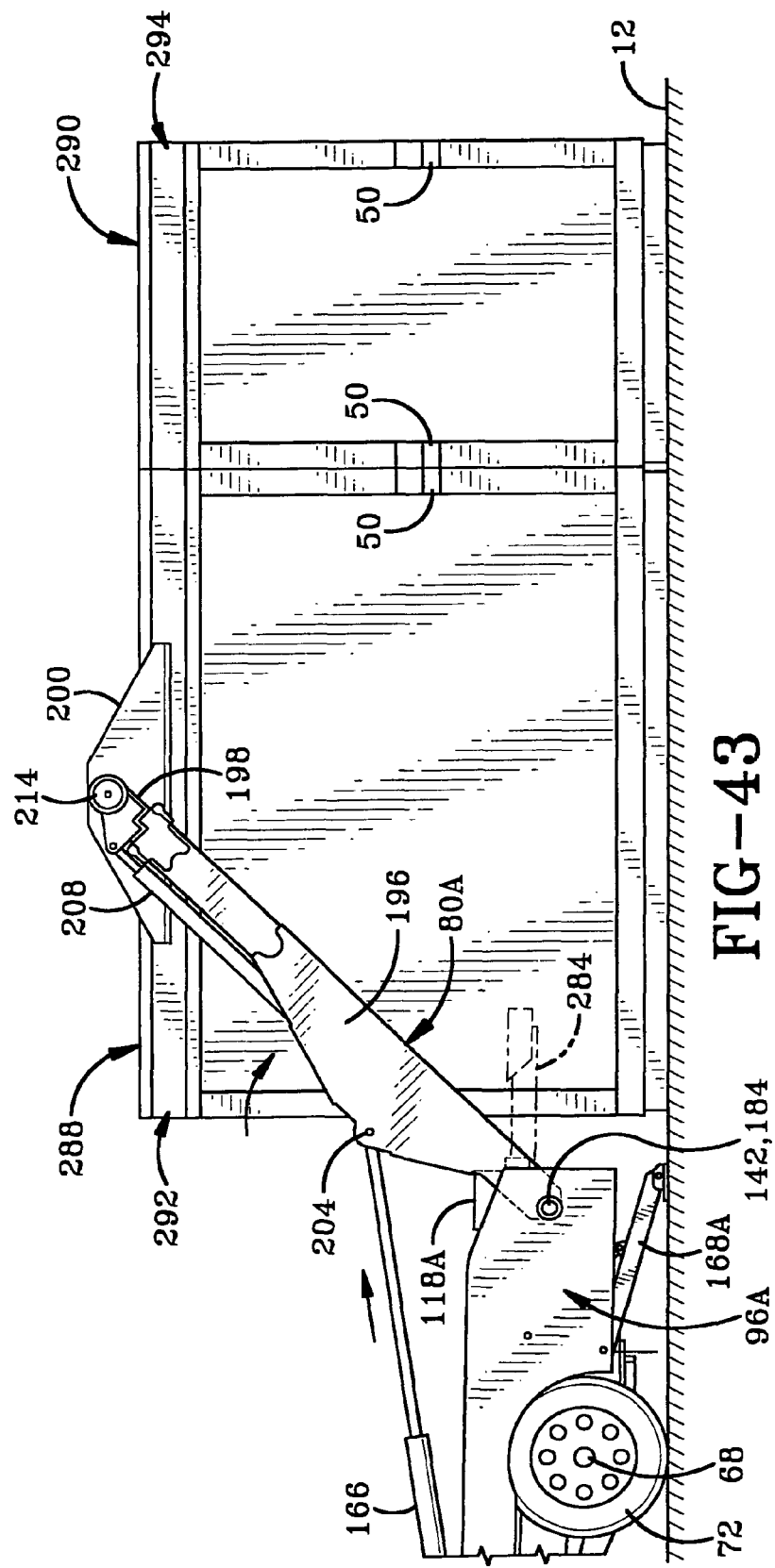
FIG. 43 is a side elevational view showing the second container having been removed from the vehicle and placed in front of the first container.
Figure 44:
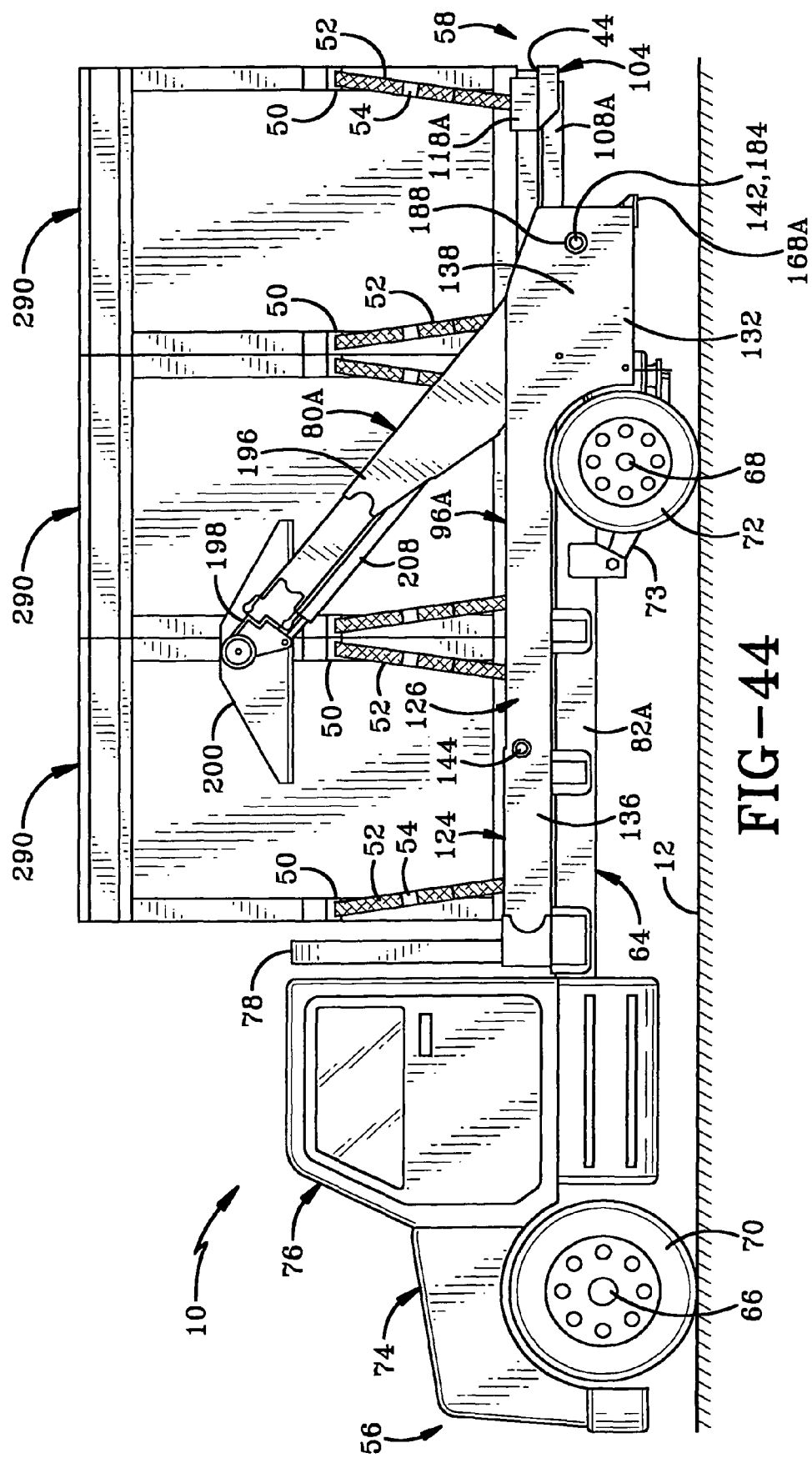
FIG. 44 is a side elevational view of the vehicle with three smaller containers seated thereon.

Containers 288 and 290 are seated on the container support platform of vehicle 10 with the front of container 290 abutting or closely adjacent the rear of container 288. Container 288 is seated entirely on the forward section of the support platform while container 290 is seated partially on the forward section and partially on tail section 104 of the support platform. FIG. 40 shows vehicle 10 in an orientation similar to FIG. 15, in which air springs 190 have been operated to lower the rear of the vehicle and stabilizers 168 have been lowered into contact with ground 12. FIG. 40 also shows that lifts 80 have been operated to pivot rearwardly so that hook members 200 are engaged with the hooks of rails 294 in the manner previously described with reference to container 14, so that lifts 80 are ready to lift container 290 from the support platform of vehicle 10. FIG. 41 shows tail section 104 moved to its forward most position and actuators 166 and 208 extended to pivot the lifts 80 rearwardly and extend telescoping arms 198 upwardly and rearwardly to position container 290 on ground 12 at an unloaded position which is spaced a fair distance from the rear end of vehicle 10. FIG. 41 also shows hook members 200 disengaged from rails 294 so that lifts 80 may be moved forward to the position shown in FIG. 42 in order to engage rails 292 of container 288 in preparation to lift container 288 from the forward section of the support platform. FIG. 43 shows lifts 80 having been operated to lift container 288 from the support platform and move it rearwardly and downwardly to an unloaded position just in front of container 290, and thus between the rear of vehicle 10 and the front of container 290. FIG. 43 further shows that a portion of container 288 moved through home position space 284 of tail section 104. In addition, container 288 is shown seated on ground 12 with a portion thereof within space 284 and also in the space which is above ground 12 and directly below space 284. Containers 288 and 290 can also be loaded back onto vehicle 10 by reversing the steps shown in FIGS. 40-43. FIG. 44 shows three smaller containers 290 loaded onto vehicle 10 one front of the other via lifts 80 and further illustrates the versatility of using vehicle 10 either with a single large container 14 or with the plurality of smaller containers 288 and/or 290. Use of smaller containers thus allows vehicle 10 to retrieve containers such as containers 288 and 290 from two or more different locations and deliver them to yet another remote location without the need for a separate loading and unloading mechanism at any of the locations. Thus, while the loading and unloading of containers from vehicle 10 may occur at any suitable location, one advantage of using vehicle 10 is the ability to drive it to a first pick up location within a certain municipality to load a container thereon, drive it to another remote location which may be in a separate municipality or somewhere within the region of the first location to pick up a second container and load it onto the vehicle with the first container. The operator may also pick up a third container at another remote location and then drive to yet another remote location with the two or three containers loaded thereon in order to unload one or more of the containers, for instance at a cross country location, either at a single location or at two or three separate locations. The loading and unloading procedure, whether performed with a single container such as container 14 or multiple containers such as containers 288 and 290, may also be performed while vehicle 10 is parked at a single location. Thus, during the loading and unloading operations, vehicle 10 neither rolls forward nor backward and is substantially stationary other than the movements described above with relation to the loading and unloading process.

Vehicle 300 is now described with reference to FIGS. 45-49. Vehicle 300 is similar to vehicle 10 with the primary distinctions being adjacent the rear of the vehicle. Vehicle 300 still utilizes lifts 80A and 80B although they may be independently operated. In keeping with this independent operation of lifts 80, they may be configured with linear transducers or the like in order to track the amount of extension of actuators 166 and 208 so that for the most part lifts 80A and 80B will operate in unison while allowing for independent operation if it is necessary to perform movement of only one of lifts 82, for example, to position its hook member at a different height from the other hook member. For instance, this may be useful when container 14 is tilted to one side whereby one hook member 200 may be moved independently of the other to properly engage the corresponding rail 46 of container 14. Vehicle 300 does not include a pivot tube which connects pivot arms 196 like pivot tube 174 of vehicle 10 nor the associated mounting structure. In addition, vehicle 300 includes left and right stabilizers 302A and 302B which serve essentially the same purpose as the stabilizers of vehicle 10 but which are vertically slidably instead of pivotally movable. Vehicle 10 further includes a tail section 304 which is different than the tail section of vehicle 10 and pivots between raised and lower positions. Vehicle 300 includes left and right side rails 306A and 306B which are very similar to side rails 96 of vehicle 10 and include a vertically narrower section 308 and a vertically wider section 310 which is spaced rearwardly further than is wider section 138 of side rails 96. While the additional structure of wider section 138 on vehicle 10 provides mounting locations for the stabilizer pivot and stabilizer actuator pivot, this additional structure is not required with side rails 306 inasmuch as no such pivots are used with vehicle 300. Due to the fact that tail section 304 is pivotally mounted on the frame of vehicle 300, vehicle 300 does not include slide tubes such as slide tubes 86 nor an actuator which is positioned like actuator 110.

Figure 45:
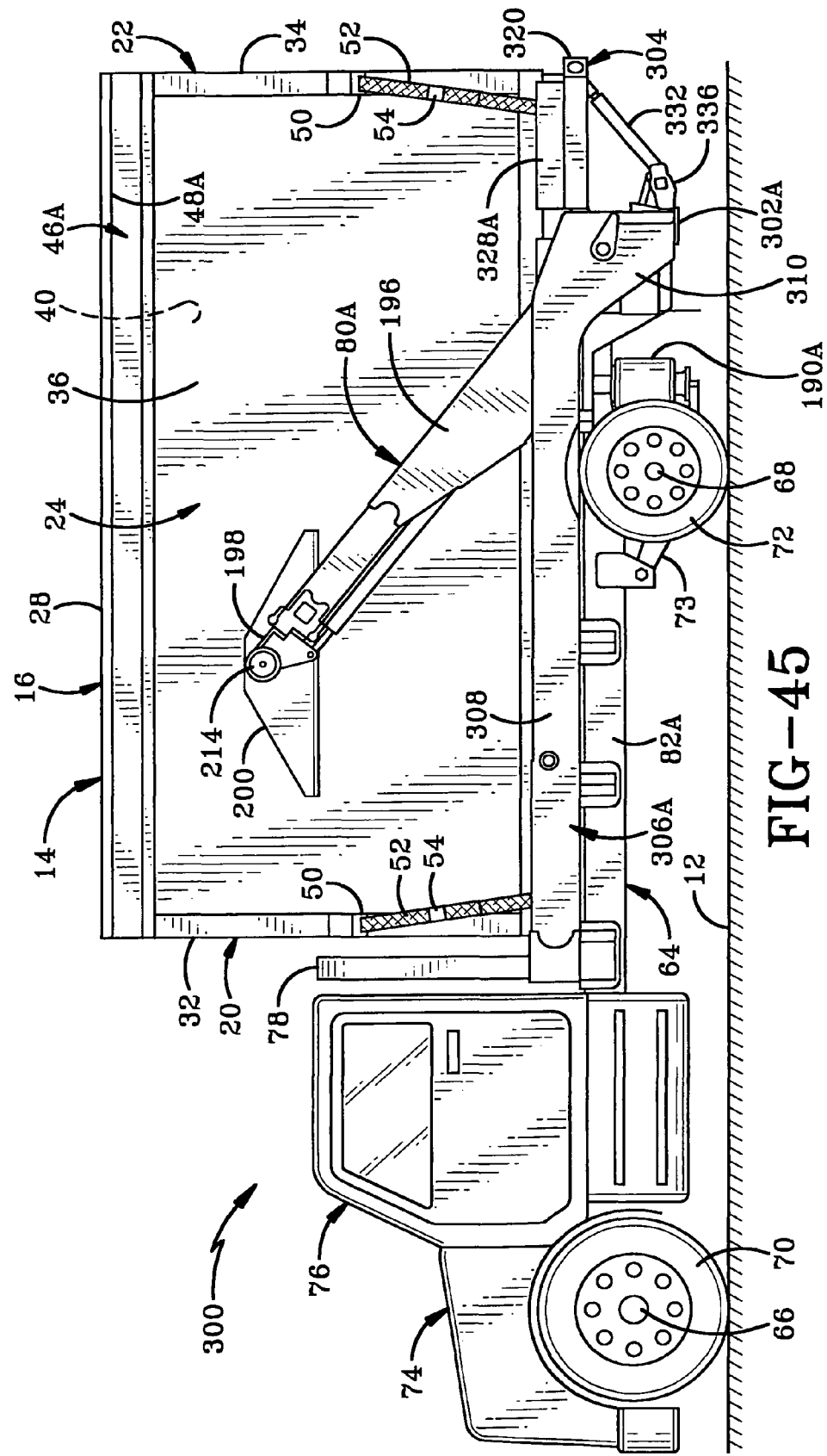
FIG. 45 is a side elevational view of a second embodiment of the vehicle of the present invention showing the container tied down to the support platform, the left container lift in its home position and the second embodiment of the tail section of the support platform and the alternate stabilizers.
Figure 46:
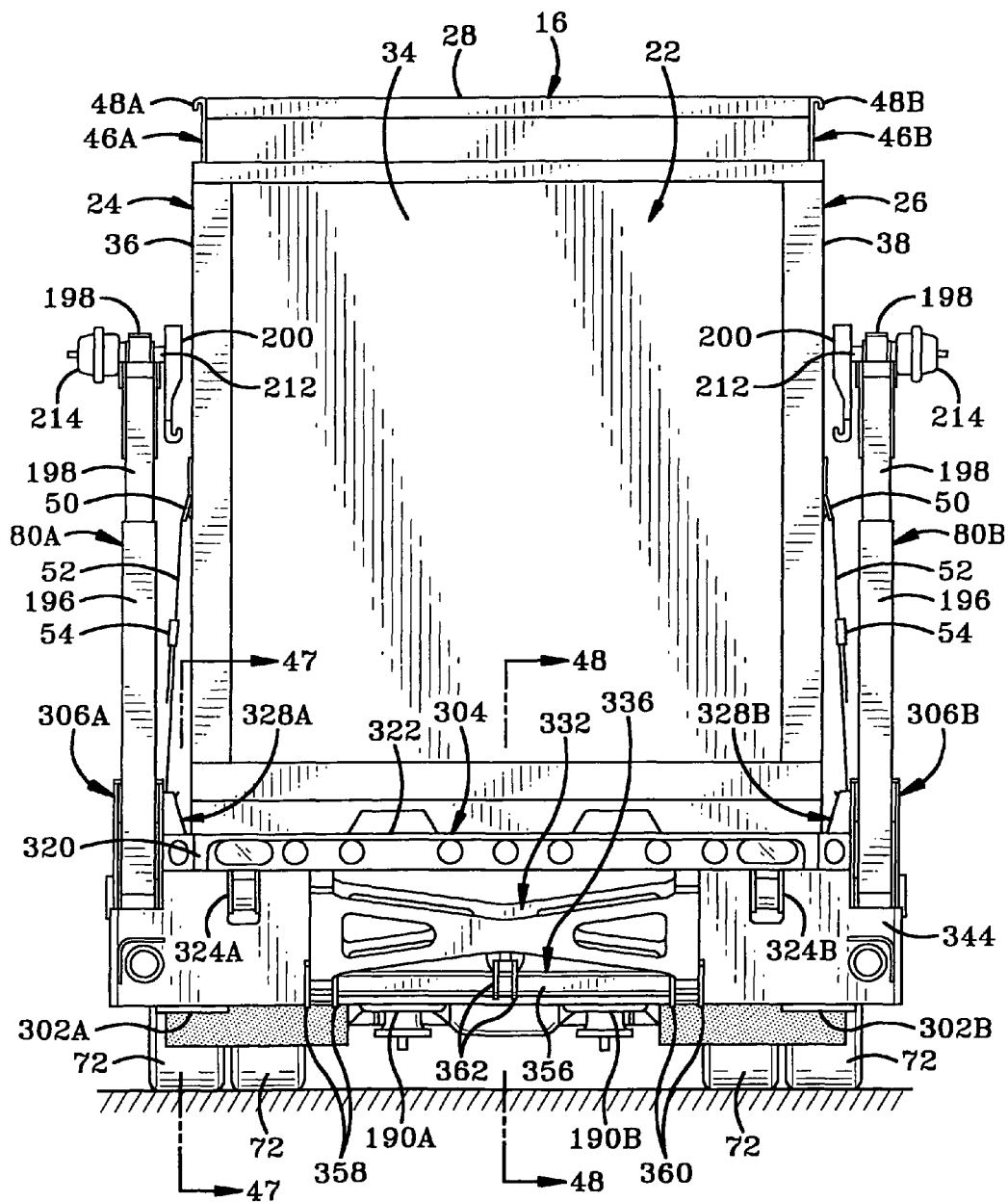
FIG. 46 is a rear elevational view of the second embodiment of the vehicle.
Figure 47:
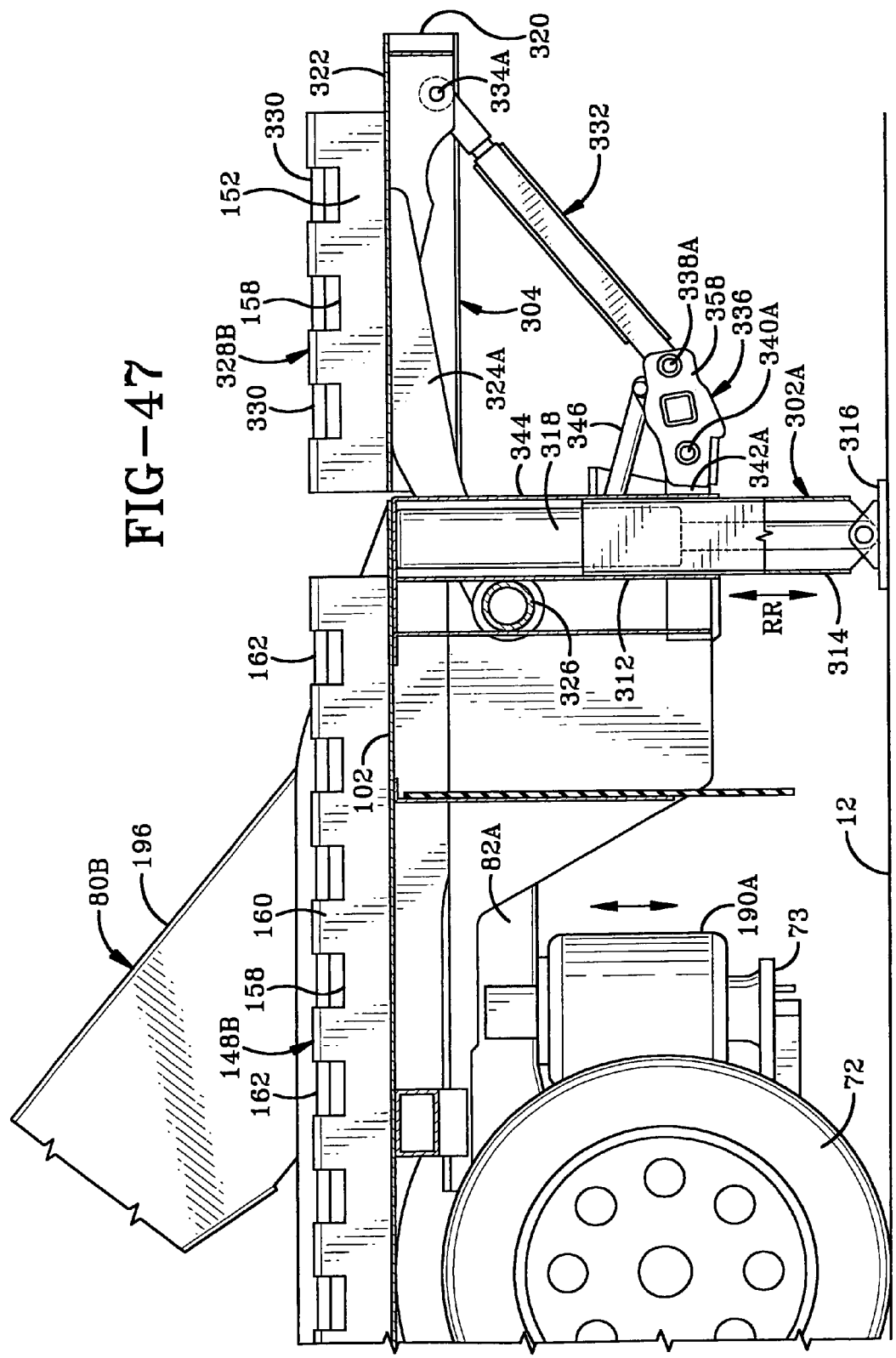
FIG. 47 is a sectional view taken along line 47-47 of FIG. 46 showing the air springs lowering the rear of the vehicle, the stabilizer moving into its lowered position and the tail section in its raised position.

As shown in FIG. 47, each stabilizer 302 includes an outer sleeve 312 and an inner sleeve 314 which is slidably received within outer sleeve 312 and linearly movable as indicated at arrow RR between the raised position shown in FIG. 45 and a lowered position shown in FIG. 47. A foot 316 is pivotally mounted at the lower end of inner sleeve 314 and abuts ground 12 in the lowered position. A hydraulic stabilizer actuator 318 is disposed within outer and inner sleeves 312 and 314 and in the exemplary embodiment is a piston cylinder combination which serves as a linear actuator for sliding inner sleeve 314 and foot 316 relative to outer sleeve 312.

With reference to FIGS. 45-48, tail section 304 and associated structure is now described. Tail section 304 includes a substantially rectangular support platform 320 which is elongated in the axial direction and has a flat upper surface 322 which is substantially coplanar with the upper surface of floor 102 of the forward section of the container support platform of vehicle 300. Left and right pivot arms 324 are rigidly secured to platform 320 and extend forward and downwardly therefrom and are pivotally connected adjacent their front ends to pivots 326 whereby platform 320 is pivotable about an axially extending horizontal axis. Left and right guide walls 328A and 328B are secured to platform 320 adjacent its opposed sides and extend upwardly from upper surface 322. Guide walls 328 are essentially the same as guide walls 148 other than being substantially shorter and thus include cutouts 158, tapered wall 152 and so forth. A tie down bar 330 is secured to each guide wall 328 in the same manner as guide bar 162 is secured to guide walls 148. Guide walls 328 are respectively aligned with guide walls 148 when tail section 304 is in its raised position, similar to the alignment of guide walls 118 with guide walls 148 of vehicle 10.

Figure 48:
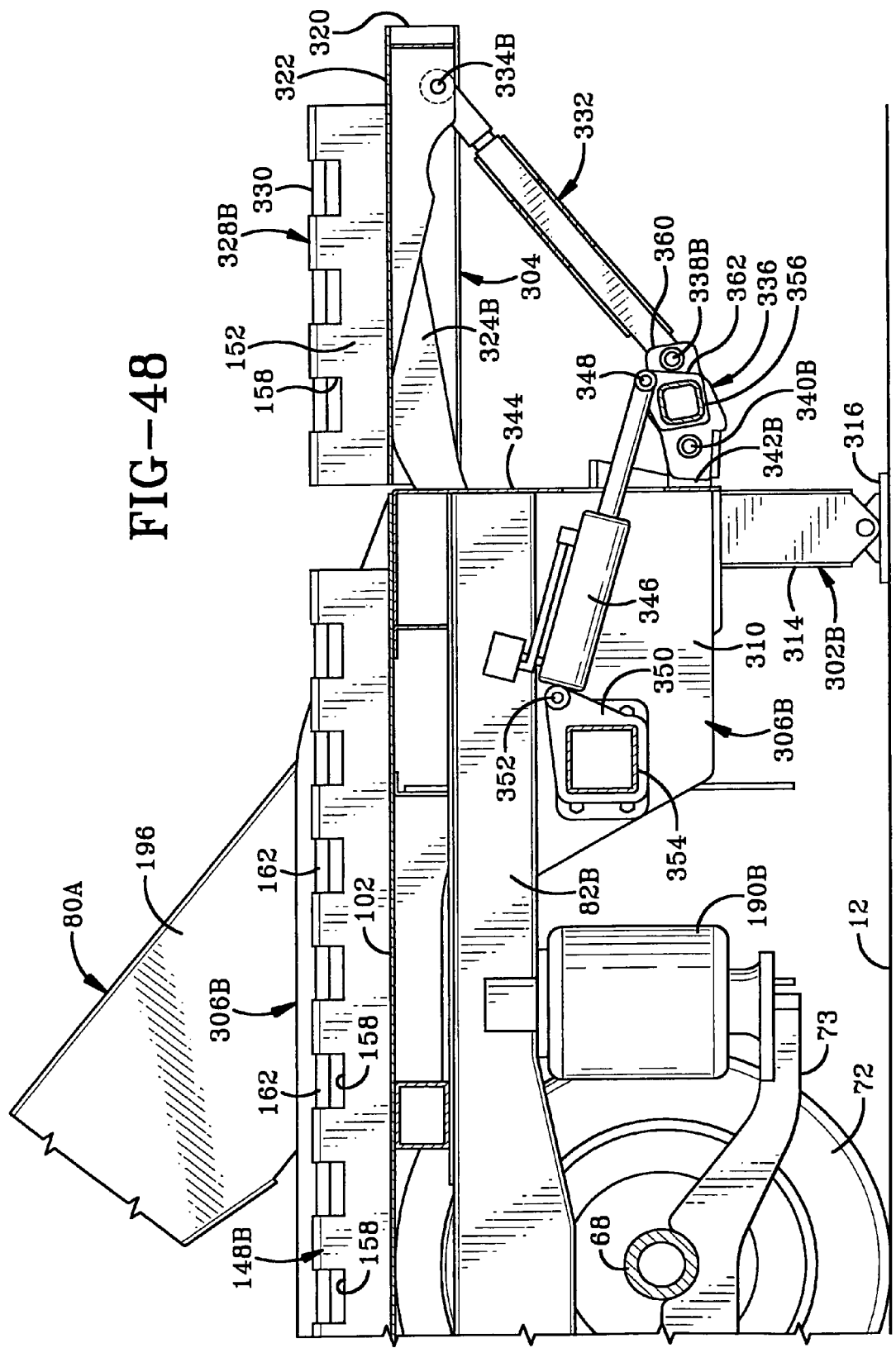
FIG. 48 is a section view taken along line 48-48 of FIG. 46 showing the tail section actuator.

A pivotable brace 332 is pivotally connected adjacent its rear end to platform 320 via a pair of spaced pivots 334A and 334B (FIGS. 47-48). A pivotable member 336 adjacent its rear end is pivotally connected to brace 332 adjacent its front end by a pair of axially spaced pivots 338A and 338B (FIGS. 47-48). Pivotable member 336 is pivotally connected at respective pivots 340A and 340B to pivot mounts 342A and 342B which are rigidly secured to extend rearwardly from a rear wall 344 which extends between and is connected the rear ends of side rails 306A and 306B. Thus, brace 332 and member 336 pivot relative to one another about an axially extending horizontal axis passing through pivots 338, while member 336 pivots about a parallel axis passing through pivots 340 relative to mounts 342 and wall 344. The pivotal movement of platform 320, brace 332 and pivotable member 336 is driven by a tail section actuator 346 (FIG. 48) which is pivotally connected adjacent its front end to pivotable member 336 via a pivot 348 and adjacent its rear end to a pivot mount 350 via a pivot 352. Mount 350 is secured to a crossbar 354 which extends between and is rigidly secured to the wider sections 310 of side rails 306A and 306B.

Figure 49:
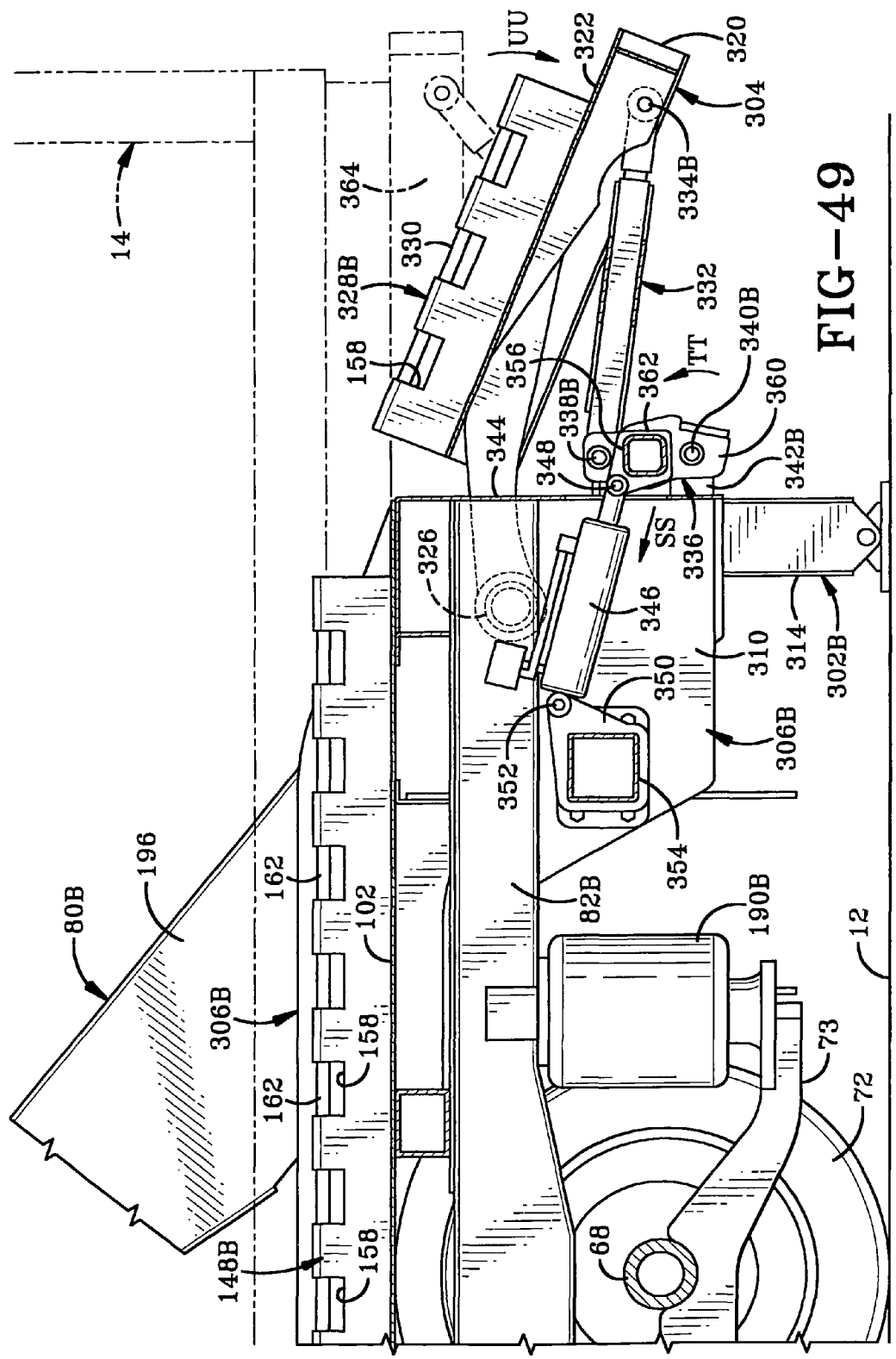
FIG. 49 is similar to FIG. 48 and shows the tail section actuator having been actuated to lower the tail section.

Referring to FIGS. 46-49, pivotable member 336 includes a straight axial crossbar 356 with a pair of left mounting flanges 358 and a pair of right mounting flanges 360 extending radially outwardly therefrom respectively adjacent its opposed ends. Centered between flanges 358 and 360 is another pair of central mounting flanges 362 which are also rigidly connect to and extend radially outwardly from crossbar 356. Thus, pivots 338 and 340 are carried by flanges 358 and 360 while pivot 348 is carried by central flanges 362. As may be discerned from FIGS. 47 and 48, pivot 348 is adjacent and offset from the plane defined by pivots 338 and 340. As may also be discerned from FIGS. 47 and 48, brace 332 and pivotable member 336 provide an over-center locking mechanism to help secure tail section 304 in its raised position. More particularly, pivots 338 in the raised and locked position of tail section 304 are adjacent and offset from the plane defined by pivots 334 and 340 and during movement to the lowered position, pivots 338 cross through said plane, as may be discerned from FIG. 49. To lower platform 320 as shown in FIG. 49, actuator 346 is retracted (arrow SS) to pivot the rearward end of pivotable member 336 upwardly and forward about pivots 340 (arrow TT) whereby the front end of brace 332 pivots upwardly and forward therewith as it pivots about pivots 338. The retraction of actuator 346 also causes the rear end of brace 332 and support platform 320 to pivot downwardly about pivot 326 (arrow UU) via the linkage formed by pivotable member 336 and brace 332. FIG. 49 also shows that platform 320 pivots out of contact with the bottom of container 14 and out of a home position space 364 during its lowering movement although tail section 304 in its lowered position preferably remains out of contact with ground 12. While the rear end of platform 320 moves primarily downwardly when moving from the raised to the lowered position, it also moves forward a relatively small amount, thereby shortening or reducing the length of the container support platform and vehicle 300. Once space 364 is opened by the lowering movement of tail section 304, lifts 80 are operated to remove container 14 from the container support platform of vehicle 300 so that the front lower corner of container 14 passes through space 364, which allows for the unloading of the container without the lifts having to support the container at the greater height which would be required for the container to pass beyond platform 320 in its raised position.

Figure 50:
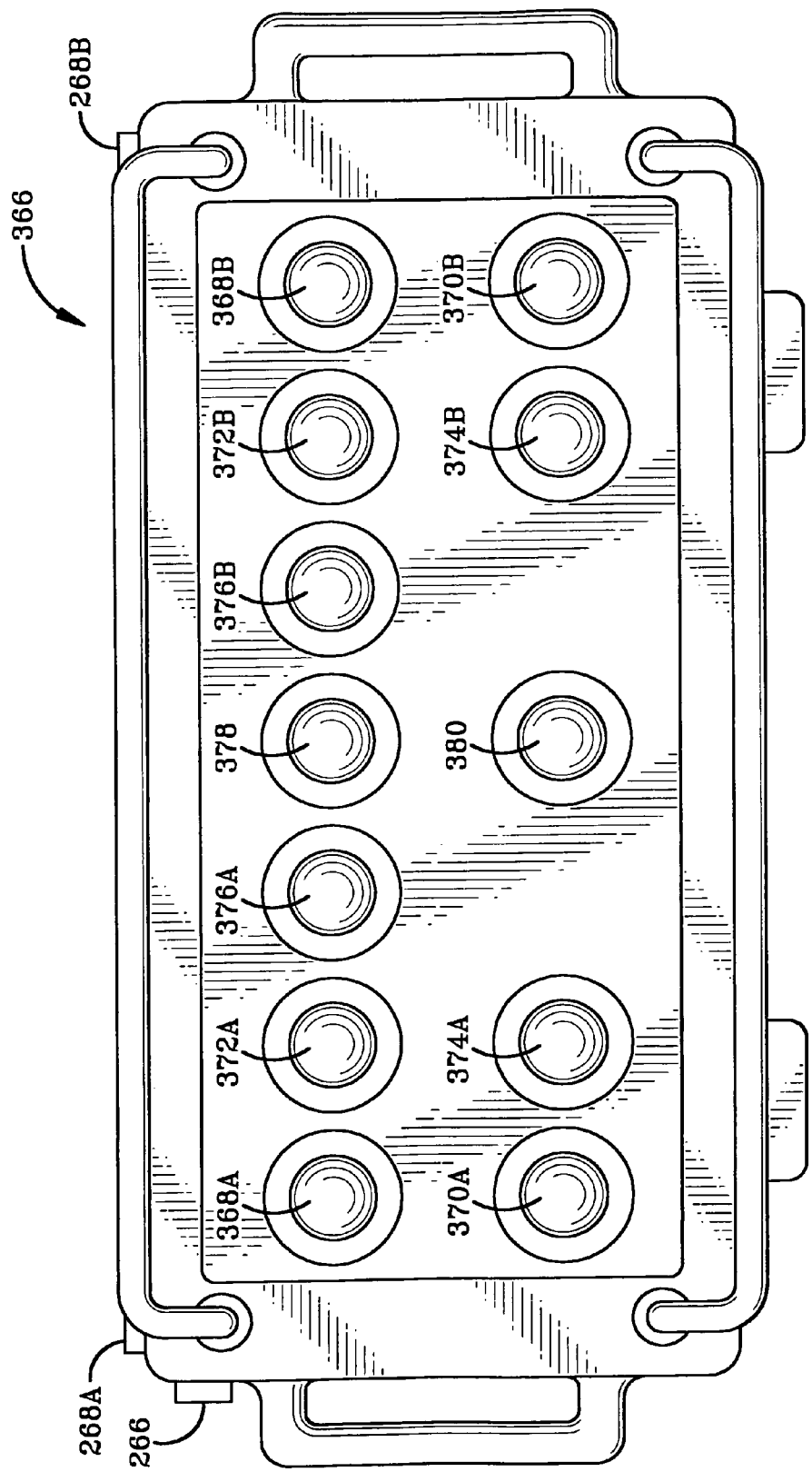
FIG. 50 is a top view of the second embodiment of the remote control.

FIG. 50 shows another embodiment of a remote control 366 in which the various controls may be operated independently. Remote control 366 is similar to remote control 264 except that it has additional switches allowing for the independent control of various actuators on vehicle 300. These various switches include left and right telescoping arm switches 368A and 368B, left and right pivot arm switches 370A and 370B, left and right stabilizer switches 372A and 372B, left and right air spring switches 374A and 374B, left and right hook member switches 376A and 376B and tail section switch 378, all of which may be independently operated to independently control the various associated actuators. An independent control switch 380 may also be included which may be used to select the independent control of a pair of associated actuators or to turn off such independent control. Thus, for example, switch 380 may be used to select the independent control of the telescoping arm actuators or to operate them in tandem. Switch 380 might also be used to allow for the independent or tandem use of the pivot arms and so forth.

The operation of vehicle 300 is very similar to that of vehicle 10 except for the distinctions noted above with regard to the stabilizers, the tail section and the ability to independently operate various actuators. Thus, the rear end of the container support platform of vehicle 10 may be lowered via the control of the air springs. In addition, the stabilizers 302 may be lowered and raised to provide stability and other features analogous to those discussed with regard to stabilizers 168 of vehicle 10. The lowering of tail section 304 may easily be accomplished without first raising the container from vehicle 300 due to its pivoting configuration. It will of course be readily recognized that tail section 304 should not be lowered under certain circumstances prior to the container being supported by lifts 80, such as when a smaller container such as container 290 (FIG. 44) is seated on tail section 304 and largely supported thereby.

Vehicles 10 and 300 thus provide rear loading capability with an onboard loading and unloading mechanism which allows for the loading and unloading of containers within a relatively tight space. In addition, these vehicles conveniently allow for the loading and unloading of a plurality of containers onto and from the same support platform. Furthermore, these vehicles in the exemplary embodiment have a gross vehicle weight of no more than 26,000 pounds whereby holders of a driver's license for passenger vehicles may operate vehicles 10 and 300.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:
1. A method comprising the steps of:
lifting with a container lift assembly mounted on a wheeled vehicle a first container from one of a first loaded position atop a container support platform of the wheeled vehicle and a first unloaded position behind the vehicle such the first container is hanging in air from the container lift assembly;
moving the first container with the container lift assembly from the one of the first loaded position and the first unloaded position to the other of the first loaded position and the first unloaded position while the first container is hanging in air from the container lift assembly and maintained in a substantially horizontal position;

lifting with the container lift assembly a second container from one of a second loaded position atop the platform forward of the first loaded position and a second unloaded position behind the vehicle such the second container is hanging in air from the container lift assembly;

moving the second container with the container lift assembly from the one of the second loaded position and the second unloaded position to the other of the second loaded position and the second unloaded position while the first container is hanging in air from the container lift assembly and maintained in a substantially horizontal position;

seating one of the first and second containers atop forward and tail sections of the platform wherein the tail section is movable relative to the forward section between a home position space wherein the tail section is a rearward extension of the forward section and a non-home position space wherein the tail section is at least one of forward of the home position space and lower than the home position space; and wherein seating one of the first and second containers atop the forward and tail sections includes the steps of moving the one of the first and second containers with the container lift assembly directly over the tail section while the tail section is in the non-home position space, moving the tail section to the home position space after the one of the first and second containers is directly over the tail section, lowering the one of the first and second containers atop the forward and tail sections after the tail section is moved to the home position space.

2. The method of claim 1 further comprising the step of controlling operation of the container lift assembly with a remote control.

3. The method of claim 1 further comprising the steps of moving the tail section of the platform relative to the forward section of the platform from the home position space to the non-home position space; and moving one of the first and second containers with the container lift assembly through the home position space while the tail section is in the non-home position space.

4. The method of claim 1 wherein the steps of moving the first container and moving the second container each comprise the step of pivoting a pivot arm of the container lift assembly which is pivotably mounted to the vehicle.

5. The method of claim 4 wherein the steps of moving the first container and moving the second container each comprise the step of extending a telescoping arm telescopically mounted on the pivot arm.

6. The method of claim 5 further comprising the steps of operating an axial actuator on the container lift assembly to move a container engaging support member of the container lift assembly in an axial direction defined between opposed sides of the vehicle into engagement with the first container; and operating the axial actuator to move the container engaging support member in the axial direction into engagement with the second container.

7. The method of claim 4 wherein the step of pivoting comprises the step of pivoting the pivot arm about a fixed-position pivot which is lower than an upwardly facing container support surface of the platform.

8. The method of claim 1 further comprising the step of rotating first and second container engaging support members of the lift assembly about respective vertical axes to align the support members respectively with first and second container lift support rails on opposed sides of the container.

9. The method of claim 1 further comprising the steps of engaging a first container support rail of one of the containers along a first side of said one container adjacent its top with a first container engaging support member of the lift assembly; and engaging a second container support rail of said one container along a second opposed side of said one container adjacent its top with a second container engaging support member of the lift assembly.

10. The method of claim 1 further comprising the step of lowering the platform with an onboard platform lift.

11. The method of claim 10 wherein the step of lowering comprises the step of reducing the vertical distance between the platform and a rear axle of the vehicle on which a plurality of wheels are rotatably mounted.

12. The method of claim 10 wherein the step of lowering comprises the step of pivoting the platform downwardly about an axis which is forward of the platform.

13. The method of claim 1 further comprising the step of lowering one of the first and second containers with the container lift assembly into a sliding engagement with a guide wall on the vehicle to guide the container onto the platform.

14. The method of claim 13 wherein the step of lowering one of the first and second containers comprises the step of lowering one of the first and second containers with the container lift assembly into a sliding engagement with a guide wall on the vehicle which is adjacent and above the platform and which is angled relative to vertical to guide the container onto the platform.

15. The method of claim 1 further comprising the step of operating an onboard tilting device to tilt the vehicle to one side to align first and second container engaging support members of the lift assembly respectively with first and second container support rails of one of the containers on opposed sides thereof.

16. A method comprising the steps of:
lifting with a container lift assembly mounted on a wheeled vehicle a first container from one of a first loaded position atop a container support platform of the wheeled vehicle and a first unloaded position behind the vehicle;

moving the first container with the container lift assembly from the one of the first loaded position and the first unloaded position to the other of the first loaded position and the first unloaded position;

lifting with the container lift assembly a second container from one of a second loaded position atop the platform forward of the first loaded position and a second unloaded position behind the vehicle;

moving the second container with the container lift assembly from the one of the second loaded position and the second unloaded position to the other of the second loaded position and the second unloaded position;

engaging one of the first and second containers with a container engaging support member of a first lift of the lift assembly;

engaging said one container with a container engaging support member of a second lift of the lift assembly at a second engaging position;

raising the said one container with the support members engaging the container respectively at the first and second engaging positions;

repositioning the support members to engage the lowered container respectively at third and fourth engaging positions which are one of (a) respectively forward of the first and second engaging positions and (b) respectively rearward of the first and second engaging positions; and lifting the lowered container with the first and second lifts with the support members at the third and fourth engaging positions.

17. A method comprising the steps of:

moving a tail section of a container support platform of a wheeled vehicle relative to a forward section of the container support platform from a home position space wherein the tail section is a rearward extension of the forward section to a non-home position space wherein the tail section is at least one of forward of the home position space and lower than the home position space;

lifting with a container lift assembly mounted on a wheeled vehicle a container from one of a loaded position atop a container support platform of the wheeled vehicle and an unloaded position behind the vehicle such the container is hanging in air from the container lift assembly; and moving the container with the onboard container lift assembly from the one of the loaded position and the unloaded position to the other of the loaded position and the unloaded position through the home position space while the tail section is in the non-home position space and while the first container is hanging in air from the container lift assembly and maintained in a substantially horizontal position.

* * * * *